(12) United States Patent  
Mihal et al.

(10) Patent No.: US 8,984,464 B1
(45) Date of Patent: Mar. 17, 2015

(54) DETAILED PLACEMENT WITH SEARCH AND REPAIR

(71) Applicant: Tabula, Inc., Santa Clara, CA (US)

(72) Inventors: Andrew C. Mihal, San Jose, CA (US); Steven Teig, Menlo Park, CA (US)

(73) Assignee: Tabula, Inc., Mountain View, CA (US)

( * ) Notice: Subject to any disclaimer, the term of this patent is extended or adjusted under 35 U.S.C. 154(b) by 0 days.

(21) Appl. No.: 13/681,179

(22) Filed: Nov. 19, 2012

Related U.S. Application Data

(60) Provisional application No. 61/562,305, filed on Nov. 21, 2011, provisional application No. 61/641,306, filed on May 2, 2012, provisional application No. 61/646,509, filed on May 14, 2012.

(51) Int. Cl.
*G06F 17/50* (2006.01)

(52) U.S. Cl.
CPC ........ *G06F 17/5072* (2013.01); *G06F 17/5031* (2013.01); *G06F 17/504* (2013.01); *G06F 17/5009* (2013.01); *G06F 17/5077* (2013.01); *G06F 17/5045* (2013.01)
USPC ........... 716/122; 716/118; 716/119; 716/132; 716/136

(58) Field of Classification Search
None
See application file for complete search history.

(56) References Cited

U.S. PATENT DOCUMENTS

| | | | |
|---|---|---|---|
| 4,980,577 A | 12/1990 | Baxter | |
| 5,208,768 A | 5/1993 | Simoudis | |
| 5,357,153 A | 10/1994 | Chiang et al. | |
| 5,426,591 A | 6/1995 | Ginetti et al. | |
| 5,600,263 A | 2/1997 | Trimberger et al. | |
| 5,640,107 A | 6/1997 | Kruse | |
| 5,659,484 A | 8/1997 | Bennett et al. | |
| 5,732,246 A | 3/1998 | Gould et al. | |
| 5,737,235 A | 4/1998 | Kean et al. | |
| 5,764,525 A | 6/1998 | Mahmood et al. | |
| 5,764,954 A | 6/1998 | Fuller et al. | |
| 5,822,217 A | 10/1998 | Shenoy | |
| 5,825,662 A | 10/1998 | Trimberger | |
| 5,847,577 A | 12/1998 | Trimberger | |
| 5,889,677 A | 3/1999 | Yasuda et al. | |
| 6,038,392 A | 3/2000 | Ashar et al. | |

(Continued)

OTHER PUBLICATIONS

U.S. Appl. No. 12/027,260, filed Feb. 6, 2008, Caldwell, Andrew, et al.

(Continued)

*Primary Examiner* — A. M. Thompson
(74) *Attorney, Agent, or Firm* — Adeli LLP

(57) ABSTRACT

A method of detailed placement for ICs is provided. The method receives an initial placement and iteratively builds sets of constraints for placement of different groups of cells in the IC design and uses a satisfiability solver to resolve placement violations. In some embodiments, the constraints include mathematical expressions that express timing requirements. The method in some embodiments converts the mathematical expressions into Boolean clauses and sends the clauses to a satisfiability solver that is only capable of solving Boolean clauses. In some embodiments, the method groups several cells in the user design and several sites on the IC fabric and uses the satisfiability solver to resolve all placement issues in the group. The satisfiability solver informs placer after each cell is moved to a different site. The method then dynamically builds more constraints based on the new cell placement and sends the constraints to the satisfiability solver.

18 Claims, 47 Drawing Sheets

(56) References Cited

U.S. PATENT DOCUMENTS

| | | | |
|---|---|---|---|
| 6,066,178 A | 5/2000 | Bair et al. | |
| 6,086,628 A | 7/2000 | Dave et al. | |
| 6,086,631 A | 7/2000 | Chaudhary et al. | |
| 6,088,519 A | 7/2000 | Koford | |
| 6,140,836 A | 10/2000 | Fujii et al. | |
| 6,140,839 A | 10/2000 | Kaviani et al. | |
| 6,229,337 B1 | 5/2001 | Xiao et al. | |
| 6,326,807 B1 | 12/2001 | Veenstra et al. | |
| 6,460,166 B1 | 10/2002 | Reddy et al. | |
| 6,483,343 B1 | 11/2002 | Faith et al. | |
| 6,484,292 B1 | 11/2002 | Jain et al. | |
| 6,487,709 B1 | 11/2002 | Keller et al. | |
| 6,501,297 B1 | 12/2002 | Kong | |
| 6,515,509 B1 | 2/2003 | Baxter | |
| 6,545,505 B1 | 4/2003 | Chan et al. | |
| 6,557,145 B2 | 4/2003 | Boyle et al. | |
| 6,614,703 B2 | 9/2003 | Pitts et al. | |
| 6,674,303 B1 | 1/2004 | Morse et al. | |
| 6,675,309 B1 | 1/2004 | Baxter | |
| 6,686,769 B1 | 2/2004 | Nguyen et al. | |
| 6,691,301 B2 | 2/2004 | Bowen | |
| 6,711,729 B1 | 3/2004 | McElvain et al. | |
| 6,807,660 B1 | 10/2004 | Frenkil | |
| 6,851,101 B1 | 2/2005 | Kong et al. | |
| 6,892,369 B2 | 5/2005 | Teig et al. | |
| 6,894,527 B1 | 5/2005 | Donlin et al. | |
| 6,920,625 B2 * | 7/2005 | Gass | 716/113 |
| 6,931,616 B2 | 8/2005 | Teig et al. | |
| 6,964,029 B2 | 11/2005 | Poznanovic et al. | |
| 6,992,505 B1 | 1/2006 | Zhou | |
| 7,003,745 B2 | 2/2006 | Subasic et al. | |
| 7,073,158 B2 | 7/2006 | McCubbrey | |
| 7,088,134 B1 | 8/2006 | Agrawal et al. | |
| 7,088,136 B1 | 8/2006 | Lewis | |
| 7,107,568 B2 | 9/2006 | Cronquist | |
| 7,116,131 B1 | 10/2006 | Chirania et al. | |
| 7,120,883 B1 | 10/2006 | van Antwerpen et al. | |
| 7,143,377 B1 | 11/2006 | Kudlugi et al. | |
| 7,143,388 B1 | 11/2006 | Miller et al. | |
| 7,154,299 B2 | 12/2006 | Swami et al. | |
| 7,236,009 B1 | 6/2007 | Rohe et al. | |
| 7,350,173 B1 | 3/2008 | Ang et al. | |
| 7,353,489 B2 | 4/2008 | Dowling | |
| 7,383,529 B2 | 6/2008 | Gupta et al. | |
| 7,480,885 B2 | 1/2009 | Frankle et al. | |
| 7,496,879 B2 | 2/2009 | Rohe et al. | |
| 7,532,030 B2 | 5/2009 | Redgrave | |
| 7,624,364 B2 | 11/2009 | Albrecht et al. | |
| 7,644,377 B1 * | 1/2010 | Saxe et al. | 716/106 |
| 7,653,884 B2 * | 1/2010 | Furnish et al. | 716/103 |
| 7,657,855 B1 | 2/2010 | Manaker, Jr. et al. | |
| 7,743,354 B2 | 6/2010 | Albrecht et al. | |
| 7,746,111 B1 | 6/2010 | Gaide et al. | |
| 7,779,380 B2 | 8/2010 | Honda | |
| 7,831,943 B1 * | 11/2010 | Das | 716/106 |
| 7,904,867 B2 * | 3/2011 | Burch et al. | 716/130 |
| 7,941,776 B2 | 5/2011 | Majumder et al. | |
| 8,024,696 B1 | 9/2011 | Srinivasan et al. | |
| 8,089,882 B2 | 1/2012 | Guntur et al. | |
| 8,112,731 B1 | 2/2012 | Shen et al. | |
| 8,136,077 B2 * | 3/2012 | McMurchie et al. | 716/129 |
| 8,166,435 B2 | 4/2012 | Teig et al. | |
| 8,555,218 B2 | 10/2013 | Caldwell et al. | |
| 2003/0079192 A1 | 4/2003 | Cheong et al. | |
| 2003/0182638 A1 | 9/2003 | Gupta et al. | |
| 2004/0225970 A1 | 11/2004 | Oktem | |
| 2005/0132316 A1 | 6/2005 | Suaris et al. | |
| 2005/0193359 A1 | 9/2005 | Gupta et al. | |
| 2006/0010415 A1 | 1/2006 | Curtin et al. | |
| 2006/0220678 A1 | 10/2006 | Rozas et al. | |
| 2006/0225002 A1 | 10/2006 | Hassoun et al. | |
| 2007/0016881 A1 | 1/2007 | Gregory et al. | |
| 2007/0192752 A1 | 8/2007 | Bhattacharya et al. | |
| 2007/0214445 A1 | 9/2007 | Dehon et al. | |
| 2008/0028347 A1 | 1/2008 | Hiraoglu et al. | |
| 2008/0127000 A1 | 5/2008 | Majumder et al. | |
| 2008/0216040 A1 | 9/2008 | Furnish et al. | |
| 2008/0276208 A1 | 11/2008 | Albrecht et al. | |
| 2009/0249276 A1 | 10/2009 | Wu et al. | |
| 2009/0254874 A1 | 10/2009 | Bose | |
| 2009/0293028 A1 | 11/2009 | Hiraoglu et al. | |
| 2010/0281448 A1 * | 11/2010 | He | 716/6 |
| 2012/0185809 A1 | 7/2012 | Kadiyala et al. | |
| 2013/0099821 A1 | 4/2013 | Huang et al. | |
| 2013/0308468 A1 | 11/2013 | Cowie | |

OTHER PUBLICATIONS

Alexander, Michael J., et al., "Placement and Routing for Performance-Oriented FPGA Layout," VLSI Design: an International Journal of Custom-Chip Design, Simulation, and Testing, Month Unknown, 1998, vol. 7, No. 1, pp. 1-23.

Author Unknown, "Adapt2000 ACM System Platform," Apr. 2004, pp. 1-39, QuickSilver Technology, Inc., San Jose, California, USA.

Author Unknown, "M2000, FlexEOS Embedded FPGA Cores," Month Unknown, 2003, 2 pages, M2000, France.

Butts, Michael, "Future Direction of Dynamically Reprogrammable Systems," IEEE 1995 Custom Intergrated Circuits Conference, May 1995, pp. 487-494.

Ciemat, Juan De Vicente, et al., "Annealing Placement by Thermodynamic Combinatorial Optimization," ACM Transactions on Design Automation of Electronic Systems, Jul. 2004, pp. 310-332, vol. 9, No. 3, ACM, New York, NY.

Compton, Katherine, et al., "Reconfigurable Computing: A Survey of Systems and Software," ACM Computing Surveys, Jun. 2002, pp. 171-210, vol. 34, No. 2, ACM, New York, NY.

Cong, Jason, et al., "Combinational Logic Synthesis for LUT Based Field Programmable Gate Arrays," ACM Transactions on Design Automation of Electronic Systems, Apr. 1996, pp. 145-204, vol. 1, No. 2, ACM, Inc.

Cong, Jason, et al., "Large-Scale Circuit Placement," ACM Transactions on Design Automation of Electronic Systems, Apr. 2005, pp. 389-430, vol. 10, No. 2, ACM Inc., Broadway, New York, NY.

Cong, Jason, et al., "Optimality and Stability Study of Timing-Driven Placement Algorithms," ICCAD-2003: International Conference on Computer Aided Design, Nov. 2003, 7 pages.

Davare, Abhijit, et al., "The Best of Both Worlds: The Efficient Asynchronous Implementation of Synchronous Specifications," DAC '04, Jun. 7-11, 2004, 4 pages, ACM, San Diego, California, USA.

Dehon, Andre, "Balancing Interconnect and Computation in a Reconfigurable Computing Array (or, why don't you really want 100% LUT utilization)," Proceedings of the International Symposium on Field Programmable Gate Arrays, Feb. 1999, pp. 1-10.

Dehon, Andre, et al., "Reconfigurable Computing: What, Why, and Implications for Design Automation," DAC 1999, Jun. 1999, 6 pages, ACM, New Orleans, Louisiana.

Deokar, Rahul B., et al., "A Graph-theoretic Approach to Clock Skew Optimization," In Proc. International Symp. on Circuits and Systems, Month Unknown, 1994, 4 pages.

Hurst, Aaron P., et al., "Physical Placement Driven by Sequential Timing Analysis," Proc. ICCAD '04, Month Unknown, 2004, pp. 1-8.

Hurst, Aaron P., et al., "Physical Placement Driven by Sequential Timing Analysis," Proc. ICCAD '04, Month Unknown, 2004, slides 1-21.

Hutchings, Brad L., et al., "Unifying Simulation and Execution in a Design Environment for FPGA Systems," IEEE Transactions on Very Large Scale Integration (VLSI) Systems, Feb. 2001, pp. 201-205, vol. 9, No. 1.

Hutchings, Brad, et al., "A CAD Suite for High-Performance FPGA Design," Proceedings of the Seventh Annual IEEE Symposium on Field-Programmable Custom Computing Machines, Apr. 1999. 13 pages.

Hutchings, Brad, et al., "Designing and Debugging Custom Computing Applications," IEEE Design & Test of Computers, Jan. 2000, pp. 20-28.

(56) References Cited

OTHER PUBLICATIONS

Kocan, Faith, et al., "Logic Modules with Shared SRAM Tables for Field-Programmable Gate Arrays," FPL 2004, Aug./Sep. 2004, pp. 289-300, Springer-Verlag, Berlin Heidelberg.
Leiserson, Charles, et al., "Retiming Synchronous Circuitry," Digital Systems Research Center; Aug. 20, 1986, pp. 1-42, Palo Alto, CA.
Lewis, David, et al., "The Stratix-II Routing and Logic Architecture," Proceedings of the 2005 ACM/SIGDA 13th International Symposium on Field-Programmable Gate Arrays, Feb. 20-22, 2005, pp. 1-22, Monterey, California, USA.
Lin, Joey Y., et al., "Placement-Driven Technology Mapping for LUT-Based FPGAs," FPGA '03, Feb. 23-25, 2003, pp. 121-126, ACM, Monterey, California, USA.
Luk, Wayne, et al., "Compilation Tools for Run-Time Reconfigurable Designs," FPGAs for Custom Computing Machines, 1997 Proceedings., The 5th Annual IEEE Symposium on FPGA-Based Custom Computing Machines, Apr. 16-18, 1997, pp. 56-65.
Markovskiy, Yury, et al., "Analysis of Quasi-Static Scheduling Techniques in a Virtualized Reconfigurable Machine," FPGA '02, Feb. 24-26, 2002, 10 pages, ACM, Monterey, California, USA.
Niedzielski, David, "An Overview of Reconfigurable Computing," Date Unknown, 26 pages.
Sankar, Yaska, "Ultra-Fast Automatic Placement for FPGAs," A Thesis Submitted in Conformity with the Requirements for the Degree of Master of Applied Science Graduate Dept. of Electrical and Computer Engineering, University of Toronto, Month Unknown, 1999, pp. ii-73.
Schmit, Herman, "Incremental Reconfiguration for Pipelined Applications," Proceedings of the 5th IEEE Symposium on FPGA-Based Custom Computing Machines, Apr. 16-18, 1997, 9 pages.
Schmit, Herman., et al., "PipeRench: A Virtualized Programmable Datapath in 0.18 Micron Technology," Proceedings of the IEEE 2002 Custom Integrated Circuits Conference, May 12-15, 2002, pp. 63-66.
Sharma, Akshay, et al., "Accelerating FPGA Routing Using Architecture-Adaptive A* Techniques," Proceedings of the IEEE Conference on Field-Programmable Technology 2005, Dec. 11-14, 2005, 10 pages.
Singh, Amit, et al., "Interconnect Resource-Aware Placement for Hierarchical FPGAs," Proceedings of the 2001 IEEE/ACM International Conference on Computer-Aided Design, Nov. 2001, 5 pages.
Singh, Amit., et al., "PITIA: An FPGA for Throughput-Intensive Applications," IEEE Transactions on Very Large Scale Integration (VLSI) Systems, Jun. 2003, pp. 354-363, vol. 11, No. 3, IEEE.
Snider, Greg, "Performance-Constrained Pipelining of Software Loops onto Reconfigurable Hardware," FPGA '02, Feb. 24-26, 2002, pp. 177-186, ACM, Monterey, California, USA.
Soviani, Cristian, et al., "Optimizing Sequential Cycles through Shannon Decomposition and Retiming", Design, Automation, and Test in Europe, Mar. 10, 2006, pp. 1085-1090.
Tau, Edward, et al., "A First Generation DPGA Implementation," Proceedings of the Third Canadian Workshop on Field-Programmable Devices, May 1995, pp. 138-143.
Tau, Edward, et al., "Transit Note #114: A First Generation DPGA Implementation," M.I.T. Transit Project, Jan. 1995, pp. 1-8.
Teifel, John, et al., "Highly Pipelined Asynchronous FPGAs," Proceedings of the 2004 ACM/SIGDA 12th International Symposium on Field Programmable Gate Arrays, Feb. 22-24, 2004, 10 pages, Monterey, California, USA.
Tom, Marvin, et al., "Clustering of Large Designs for Channel-Width Constrained FPGAs," Univeristy of British Columbia, Department of Electrical and Computer Engineering, Jun. 2005, slides 1-39, Vancouver, British Columbia, Canada.
Tom, Marvin, et al., "Logic Block Clustering of Large Designs for Channel-Width Constrained FPGAs" DAC 2005, Jun. 13-17, 2005, pp. 726-731, ACM, Anaheim, California, USA.
Tong, K.Y., et al., "Regular Logic Fabrics for a Via Patterned Gate Array (VPGA)," Proceedings of the IEEE 2003 Custom Integrated Circuits Conference 2003, Sep. 21-24, 2003, 4 pages.
Trimberger, Stephen, "Effects of FPGA Architecture on FPGA Routing," 32nd ACM/IEEE Design Automation Conference, Jun. 1995, 5 pages, ACM.
Tsu, William, et al., "HSRA: High-Speed, Hierarchical Synchronous Reconfigurable Array," Proceedings of the International Symposium on Field Programmable Gate Arrays, Feb. 1999, pp. 1-10.
Weaver, Nicholas, et al., "The SFRA: A Corner-Turn FPGA Architecture," FPGA '04, Feb. 22-24, 2004, 10 pages, ACM, Monterey, California, USA.
Zuchowski, Paul S., et al., "A Hybrid ASIC and FPGA Architecture," Proceedings of the 2002 IEEE/ACM International Conference on Computer-Aided Design, Nov. 10-14, 2002, pp. 187-194, San Jose, California, USA.
Albrecht, C., "Provably Good Global Routing by a New Approximation Algorithm for Multicommodity Flow," ISPD 2000, Month Unknown, 2000, pp. 19, 2-7, ACM, San Diego, CA.
Albrecht, C., "Sequential Logic Synthesis with Retiming in Encounter RTL Compiler (RC)," CDNLive!, 2006 Month N/A, pp. 1-16, Silicon Valley, CA.
Alpert, C., et al., "A Semi-Persistent Clustering Technique for VLSI Circuit Placement," ISPD '05, Apr. 3-6, 2005, pp. 200-207, ACM, San Francisco, California, USA.
Axelsson, E., et al., "Wired: Wire-aware Circuit Design," Month Unknown, 2005, pp. 1-15.
Boyer, F-R., et al., "Minimizing Sensitivity to Clock Skew Variations Using Level Sensitive Latches," Month Unknown, 2001, 4 pages.
Braunstein, L.A., et al., "Optimal Paths in Disordered Complex Networks," Physical Review Letters, Oct. 17, 2003, pp. 168701-(1)-168701-(4), vol. 91, No. 16, The American Physical Society.
Braunstein, L.A., et al., "Threat Networks and Threatened Networks: Basic Principles and Practical Applications," Apr. 4, 2005, pp. 1-31.
Brenner, U., et al., "An Effective Congestion Driven Placement Framework," ISPD '02, Apr. 7-10, 2002, pp. 6-11, ACM, San Diego, California, USA.
Cancho, R.F., et al., "The Topology of Technology Graphs: Small World Patterns in Electronic Circuits," Month Unknown, 2001, pp. 1-6.
Cancho, R.F., et al., "Topology of Technology Graphs: Small World Patterns in Electronic Circuits," Physical Review E, Month Unknown, 2001, pp. 046119-(1)-046119-(5), vol. 64, 046119, The American Physical Society.
Chantrapornchai, S.T.C., et al., "Probabilistic Retiming: A Circuit Optimization Technique," Month Unknown, 1996, pp. 1-15.
Chen, H., et al., "An Algebraic Multigrid Solver for Analytical Placement with Layout Based Clustering," DAC 2003, Jun. 2-6, 2003, 6 pages, ACM, Anaheim, California, USA.
Cong, J., et al., "A New Enhanced SPFD Rewiring Algorithm," Dec. 2002, 7 pages.
Deokar, R.B., et al., "A Fresh Look at Retiming via Clock Skew Optimization," 32nd ACM/IEEE Design Automation Conference, 1995, 6 pages, ACM.
Devgan, A., et al., "Block-based Static Timing Analysis with Uncertainty," Proceedings of the International Conference on Computer Aided Design '03, Nov. 11-13, 2003, pp. 607-614, ACM, San Jose, California, USA.
Eckl, K. et al., "A Practical Approach to Multiple-Class Retiming," DAC 99, 1999, 6 pages, ACM, New Orleans, Louisiana.
Eisenmann, H., et al., "Generic Global Placement and Floorplanning," DAC 98, Jun. 15-19, 1998, pp. 269-274, San Francisco, CA, USA.
Ernst, D., et al., "Razor: A Low-Power Pipeline Based on Circuit-Level Timing Speculation," MICRO-36 Submission, Jun. 6, 2003, pp. 1-23.
Fleischer, L.K., "Approximating Fractional Multicommodity Flow Independent of the Number of Commodities," Proceedings of the 40th Annual Symposium on Foundations of Computer Science, 1999, pp. 1-16.
Kong, T., "A Novel Net Weighting Algorithm for Timing-Driven Placement," 2002, pp. 172-176, IEEE.
Lam, W.K.C., et al., "Valid Clock Frequencies and Their Computation in Wavepipelined Circuits," Aug. 1996, pp. 1-3, 1-33, Palo Alto, California, USA.

(56) References Cited

OTHER PUBLICATIONS

Li, C., et al., "Routability-Driven Placement and White Space Allocation," Mar. 2010, 8 pages.

O'Neil, T.W., et al., "Extended Retiming: A Graph Transformation Technique for Optimal Scheduling of Data-Flow Graphs," Month Unknown, pp. 1-28.

Papaefthymiou, M.C., Understanding Retiming Through Maximum Average-Weight Cycles, 1991, pp. 338-348, ACM.

Ramachandaran, P., et al., "Optimal Placement by Branch-and-Price," Month Unknown, 2005, 6 pages.

Ranjan, R.K., et al., "On the Optimization Power of Retiming and Resynthesis Transformations," ICCAD98, 1998, pp. 402-407, ACM, San Jose, CA, USA.

Ren, H., et al., "Sensitivity Guided Net Weighting for Placement Driven Synthesis," ISPD '04, Apr. 18-21, 2004, 8 pages, ACM, Phoenix, Arizona, USA.

Scholl, C., "Multi-output Functional Decomposition with Exploitation of Don't Cares," May 19-21, 1997, 6 pages, Tahoe City, California, USA.

Shenoy, N., et al., "Efficient Implementation of Retiming," 1994, pp. 226-233, ACM.

Tsay, R.-S., et al., "An Analytic Net Weighting Approach for Performance Optimization in Circuit Placement," 28th ACM/IEEE Design Automation Conference, 1991, pp. 620-625, Paper 37.2, ACM.

Vemuri, N., et al., "BDD-Based Logic Synthesis for LUT-Based FPGAs," ACM Transactions on Design Automation of Electronic Systems, Oct. 2002, pp. 501-525, vol. 7, No. 4, ACM.

\* cited by examiner

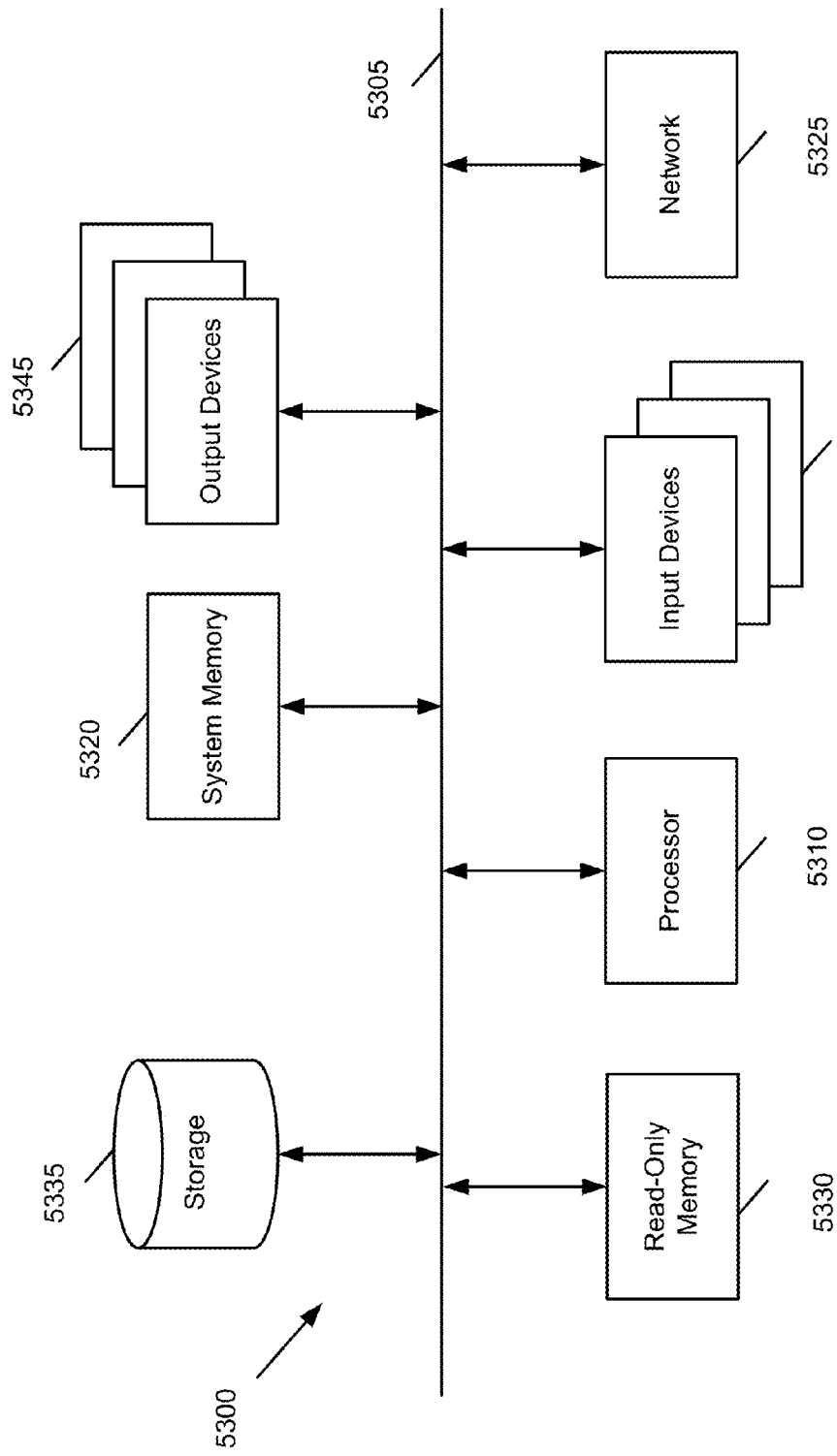

DETAILED PLACEMENT WITH SEARCH AND REPAIR

CLAIM OF BENEFIT TO PRIOR APPLICATIONS

The present Application claims the benefit of U.S. Provisional Patent Application 61/562,305, entitled, "Detailed Placement with Search and Repair," filed Nov. 21, 2011; U.S. Provisional Patent Application 61/641,306, entitled, "Detailed Placement with Search and Repair," filed May 2, 2012; and U.S. Provisional Patent Application 61/646,509, entitled, "Detailed Placement with Search and Repair," filed May 14, 2012. The contents of U.S. Provisional applications 61/562,305, 61/641,306, and 61/646,509 are hereby incorporated by reference.

BACKGROUND

Placement is a step in physical design flow of an integrated circuit (IC) where the locations of cells or circuit modules of the user design are assigned within the chip's core area. The electronic design automation (EDA) tool that is used for placement is referred to as a placer. The placer receives a netlist that describes the circuit design and produces a placement layout. In programmable ICs such as field-programmable gate arrays (FPGAs), placement maps the cells of the user design into FPGA's existing logic blocks sites.

Placement in ICs is usually performed in two stages, global and detailed placement. Global placement distributes the cells over the placement region with the goal to reduce the global congestion, global timing, and wirelength. Detailed placer uses a better timing model than global placement with the goal of resolving local congestion and local timing problems.

Placers might use one or more objectives such as minimizing wire lengths, meeting user design timing objectives, reducing wiring congestions, and minimizing power consumption. A mathematical function (usually referred to as cost function or objective function) that expresses these objectives is defined. The cost function is used to find an optimized solution for the placement. A classic example of a combinatorial optimization problem is the travelling salesman problem. Given a group of cities and a function for calculating the cost of travelling between any two cities, the goal is to plan the salesman's optimal route which passes through each city once and returns to the starting point, minimizing the total cost.

Travelling salesman problem belongs to the class of non-deterministic polynomial time complete (NP-complete) problems where there are no known efficient algorithms that find the exact solution for the problem. The computing cost for finding an exact optimal solution increases exponentially with the number of variables (in this example, number of cites) in the cost functions. An iterative improvement strategy for optimizing the cost function is to start with a known configuration, rearrange the configuration (e.g., change the path of the salesman through different cities) until the cost is improved. The rearranged configuration is then used as a new configuration and the process continues until no further improvements can be achieved.

Different optimization methods such as simulated annealing have been used in the past for placing IC components. Simulated annealing is inspired by annealing in metallurgy where a solid state metal is heated to a high temperature to ensure a random state for the atoms followed by a gradual cooling to allow the atoms to place themselves in a pattern that corresponds to a global minimum for a perfect crystal.

Simulated annealing (i) starts with a given initial placement and a global parameter (referred to as temperature) that is gradually decreased, (ii) calculates a score for the placement, (iii) moves a cell to a new location, (iv) calculates the change in the score due to the move made, (v) depending on the change and the value of the global parameter, accepts or rejects the move and decreases the global parameter. The technique repeats steps (ii) to (v) until the global parameter becomes zero.

In accepting a move, simulating annealing techniques initially allow "uphill" moves that worsen the score but gradually decrease the chance of allowing such moves and select better or "downhill" moves. The initial allowance for "uphill" moves avoids being stuck at local minimum points. FIG. 1 illustrates a graph 100 that shows the results of a prior art simulated annealing after many iterations. As shown, the process starts with an initial cost function value 105. The cost function value is gradually decreased during iterations until a final cost function value 110 is reached. However, several times during the iterations, the value of the cost function worsens to local maximums 115-120 to allow hill climbing in order to avoid local minimums 125-130.

Without accepting the worsen solutions, the process would be stuck at local minimums 125-130. Simulated annealing requires many iterations, gradually reduces the probability of accepting worse solutions, and continues to optimize the cost function until the global parameter reaches zero.

BRIEF SUMMARY

Some embodiments provide a method of detailed placement for ICs. The detailed placer receives an initial placement (e.g., from a global placer) and iteratively builds sets of constraints for placement of different groups of cells in the IC design and uses a satisfiability solver to resolve placement violations. In some embodiments, the constraints include mathematical expressions that express timing requirements by using mathematical operators and inequalities. The detailed placer in some embodiments converts these mathematical expressions into Boolean clauses that express timing requirements and sends the clauses to a satisfiability solver that is only capable of solving Boolean clauses. The method is applicable to ICs with configurable circuits as well as ICs without configurable circuits.

In some embodiments, the detailed placer groups several cells in the user design and several sites on the IC fabric and uses the satisfiability solver to resolve all placement issues in the group. Such a group of cells and sites is similar to a conceptual window or region that is built around a placement violation. The placer builds a set of initial constraints for the window and sends them to the satisfiability solver. The satisfiability solver informs placer after each cell is moved to a different site. The placer then dynamically builds more constraints based on the new cell placement and sends the constraints to the satisfiability solver.

The dynamic generation of constraints requires the placer to generate a constraint only when the satisfiability solver enters a part of the solution space where the constraint is meaningful. Such an on-demand creation of clauses avoids examination of unnecessary clauses by the satisfiability solver and significantly reduces the number of clauses the satisfiability solver has to examine in order to resolve placement violations of the selected group of cells.

Once the satisfiability solver resolves all placement violations in a particular window, the placer updates the list of cells that still have placement violations and repeats the selection of a failed violation, selection of a window, and dynamic building of constraints for the satisfiability solver until all placement issues are resolved.

The detailed placer in some embodiments has several stages. In a first stage, the placer repairs the legalization issues of the placement. In this stage, the placer is not concerned with meeting the timing goals sets for the user design and instead attempts to resolve all legalization issues such as overlaps, unroutes, pin placement violations, etc.

In the second and third stages, the placer increases the target frequencies of different clock domains in order to meet the timing goals set by the user for each clock domain. As the clock frequencies are increased, the placer uses the satisfiability solver to resolve placement violations in different windows.

In the second stage, the placer increases all clock domain frequencies in a synchronized fashion while in the third stage the placer separately increases frequencies of each clock domain. During these stages, the placer conceptually performs two different loops, an outer loop and an inner loop. The outer loop in the second stage gradually increases the common multiplier to improve clock domain frequencies. Similarly, the outer loop in the third stage gradually increases the frequency of individual clock domains. The inner loop attempts to solve all timing violations at the current clock frequencies. Once the clock frequency goals set in the user design are reached and all placement violations are resolved, the placement results are sent to the router for determining routes for connections between different cells.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 53 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. TERMS AND DEFINITIONS

A. Integrated Circuits (ICs)

Some embodiments of the invention perform placement for an IC. An IC is a device that includes numerous electronic components (e.g., transistors, resistors, capacitors, diodes, etc.) that are typically embedded on the same substrate, such as a single piece of semiconductor wafer. These components are connected with one or more layers of wiring to form multiple circuits, such as Boolean gates, memory cells, arithmetic units, controllers, decoders, etc. An IC is often packaged as one chip in a single IC package, although some IC packages can include multiple pieces of substrate or wafer. Different types of IC in some embodiments of the invention include very large-scale integration (VLSI), ultra-large-scale integration (ULSI), wafer-scale integration (WSI), three-dimensional ICs, system-on-chip, application-specific integrated circuit (ASIC), field-programmable gate array (FPGA), etc.

A design layout is a geometric description of the circuit components included in an IC's design. An IC's design layout is often obtained by using a set of computer-based electronic design automation tools (EDAs) to transform a code representation (e.g., a register transfer level (RTL) representation) or circuit representation of the design into a geometric description.

A circuit representation of an IC design refers to all cells (or circuit modules) of the IC design and the connections between these modules. The modules at one stage of the design process represent abstract computation or sets of abstract computations (e.g., add, left shift, AND, etc.) within the netlist. At a later stage within the design process, the modules represent primitives within the fabric or instance in a technology library that correspond to physical components of an IC.

Figure 1:
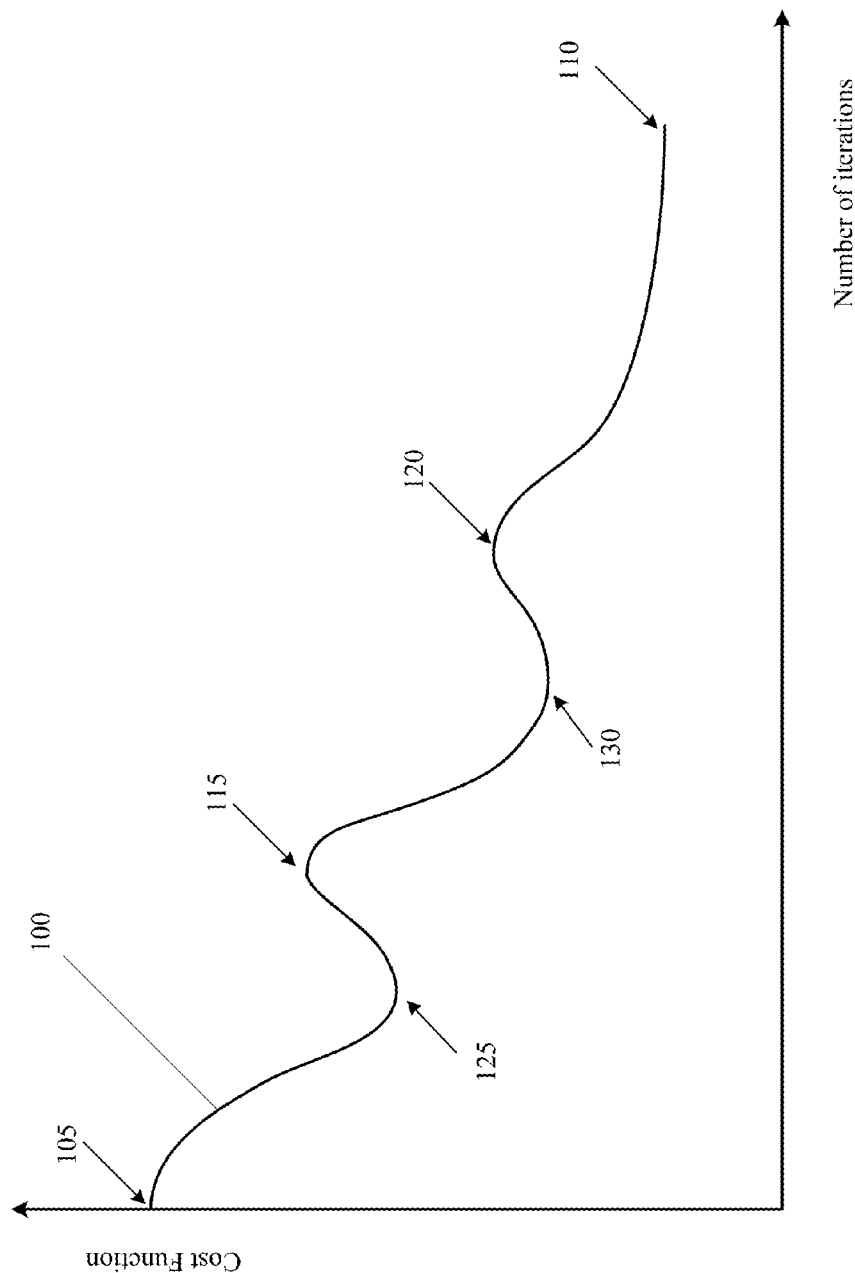
FIG. 1 conceptually illustrates a graph that shows the results of a prior art simulated annealing after many iterations.
Figure 2:
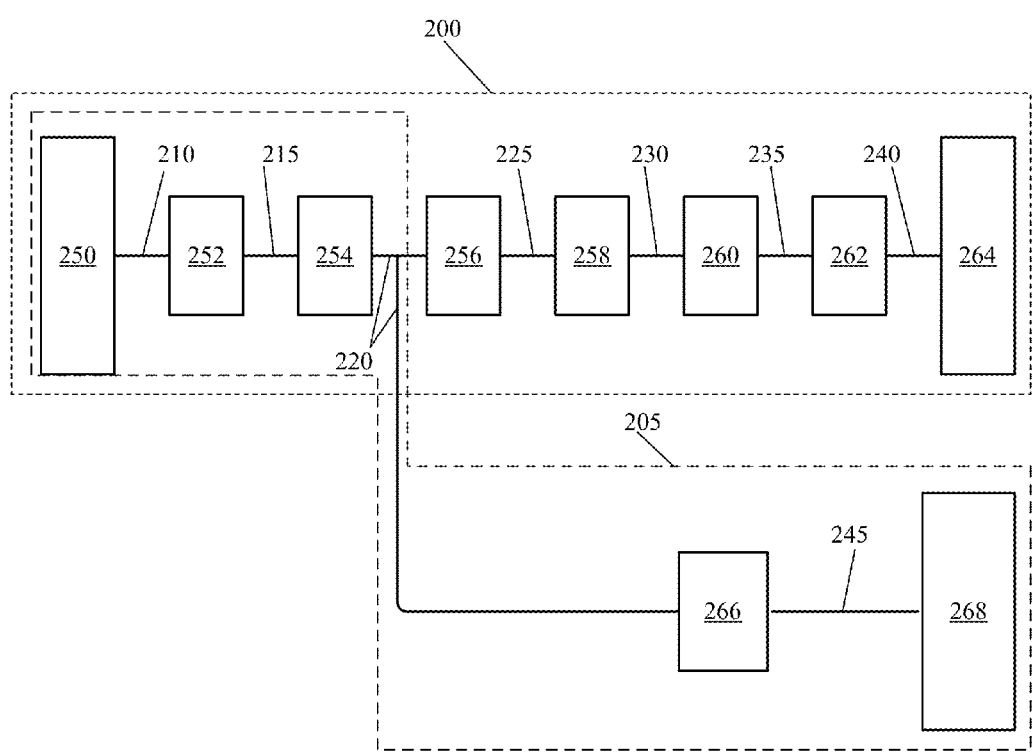
FIG. 2 conceptually illustrates a conceptual example of two netlists that are established by eight nets that include one or more circuit modules in some embodiments.

In this specification, the phrase "cell" refers to circuit in a user design that has to be assigned to a physical location on the physical IC and the term site refers to a physical location on the IC where a cell can be placed. Also, as used in this specification, a netlist is a list of cells and connections between them. For instance, FIG. 2 illustrates a conceptual example of two netlists 200 and 205 that are established by eight nets 210-245 that include one or more cells. Seven nets 210-240 establish the netlist 200 through user register 250, components 252-262, and user register 264. Four nets 210-220 and 245 establish the netlist 205 through user register 250, components 252, 254, and 266, and user register 268. Aside from net 220, all nets are two terminal nets (i.e., connect two terminals). Net 220 is a three terminal net (i.e., connects three terminals).

The design process entails various operations. Some conceptual representations for some of the various physical-design operations that EDA applications perform to obtain the IC layouts include: (1) circuit partitioning, which partitions a circuit if the circuit is too large for a single chip; (2) floor planning, which finds the alignment and relative orientation of the circuit modules; (3) synthesis, which transforms an RTL or circuit representation to another circuit representation that is mapped to a particular technology of a particular IC; (4) layout, which generates the physical design (or layout) of the IC which includes placement and routing for defining the positions of the circuit modules and the interconnects between the circuit modules; and (5) verification, which checks the layout to ensure that it meets design and functional requirements. It should be apparent to one of ordinary skill in the art that in some embodiments the order in which the various EDA operations are performed need not adhere to the presentation order of the conceptual representations above.

B. Configurable IC Architecture

Some embodiments of the invention perform placement for an IC with configurable circuits. A configurable circuit is a circuit that can "configurably" perform a set of operations. Specifically, a configurable circuit receives a configuration data set that specifies the operation that the configurable circuit must perform from the set of operations that it can perform. In some embodiments, configuration data is generated outside of the IC. In these embodiments, a set of software tools typically converts a high-level IC design (e.g., a circuit representation or a hardware description language design) into a set of configuration data bits that can configure the configurable circuits of the IC to implement the IC design.

Examples of configurable circuits include configurable interconnect circuits and configurable logic circuits. A logic circuit is a circuit that can perform a function on a set of input data that it receives. A configurable logic circuit is a logic circuit that can be configured to perform different functions on its input data set.

A configurable interconnect circuit is a circuit that can configurably connect an input set to an output set in a variety of ways. An interconnect circuit can connect two terminals or pass a signal from one terminal to another by establishing an electrical path between the terminals. Alternatively, an interconnect circuit can establish a connection or pass a signal between two terminals by having the value of a signal that appears at one terminal appear at the other terminal. In connecting two terminals or passing a signal between two terminals, an interconnect circuit in some embodiments might invert the signal (i.e., might have the signal appearing at one terminal inverted by the time it appears at the other terminal). In other words, the interconnect circuit of some embodiments implements a logic inversion operation in conjunction to its connection operation. Other embodiments, however, do not build such an inversion operation in any or all of their interconnect circuits.

The IC of some embodiments includes configurable logic circuits and configurable interconnect circuits for routing the signals to and from the configurable logic circuits. An IC with configurable circuits is sometimes referred to a configurable IC. However, in addition to configurable circuits, the IC also typically includes non-configurable circuits (e.g., non-configurable logic circuits, interconnect circuits, memories, etc.).

Figure 3:
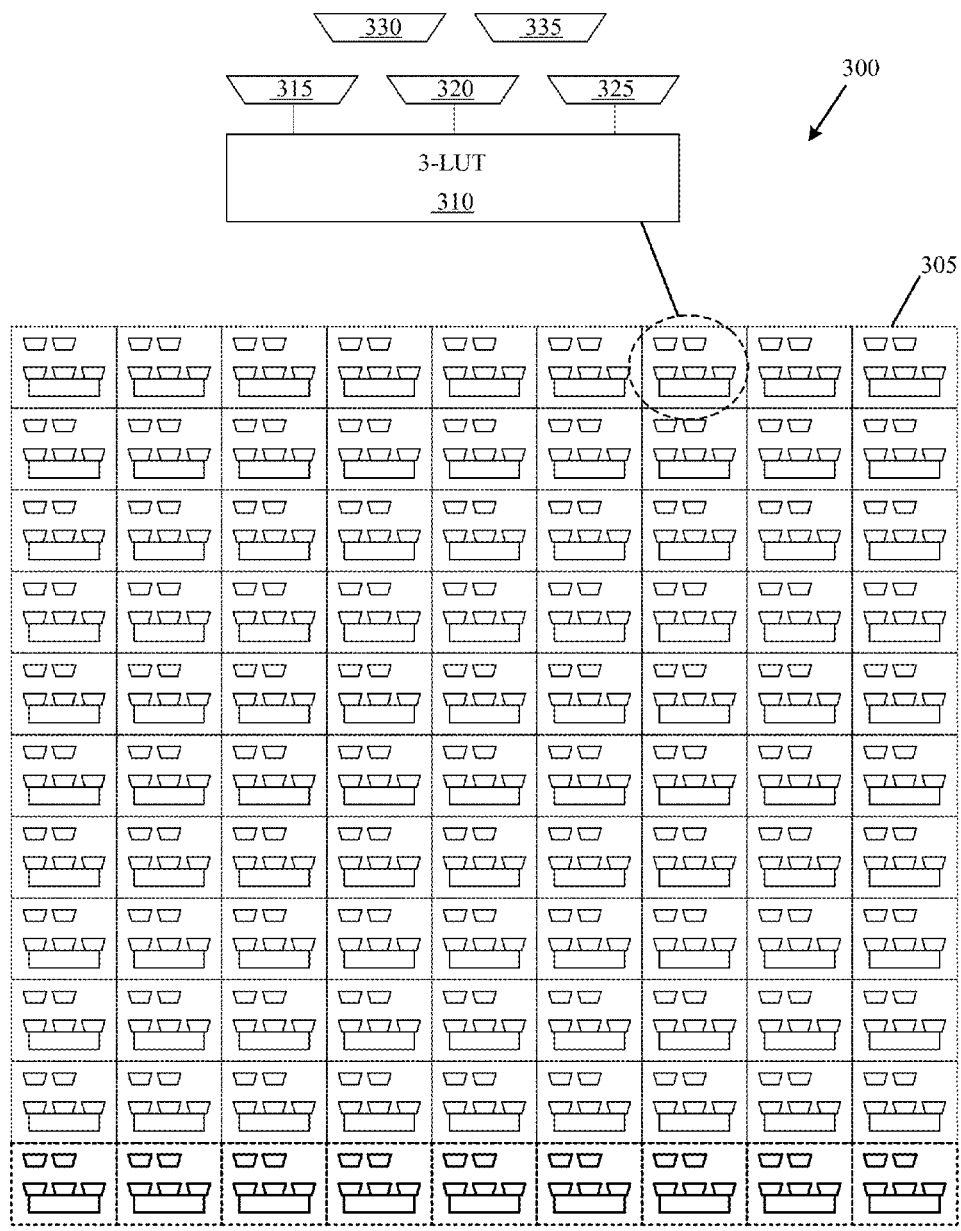
FIG. 3 conceptually illustrates an architecture that is formed by numerous configurable tiles that are arranged in an array with multiple rows and columns in some embodiments.
Figure 4:
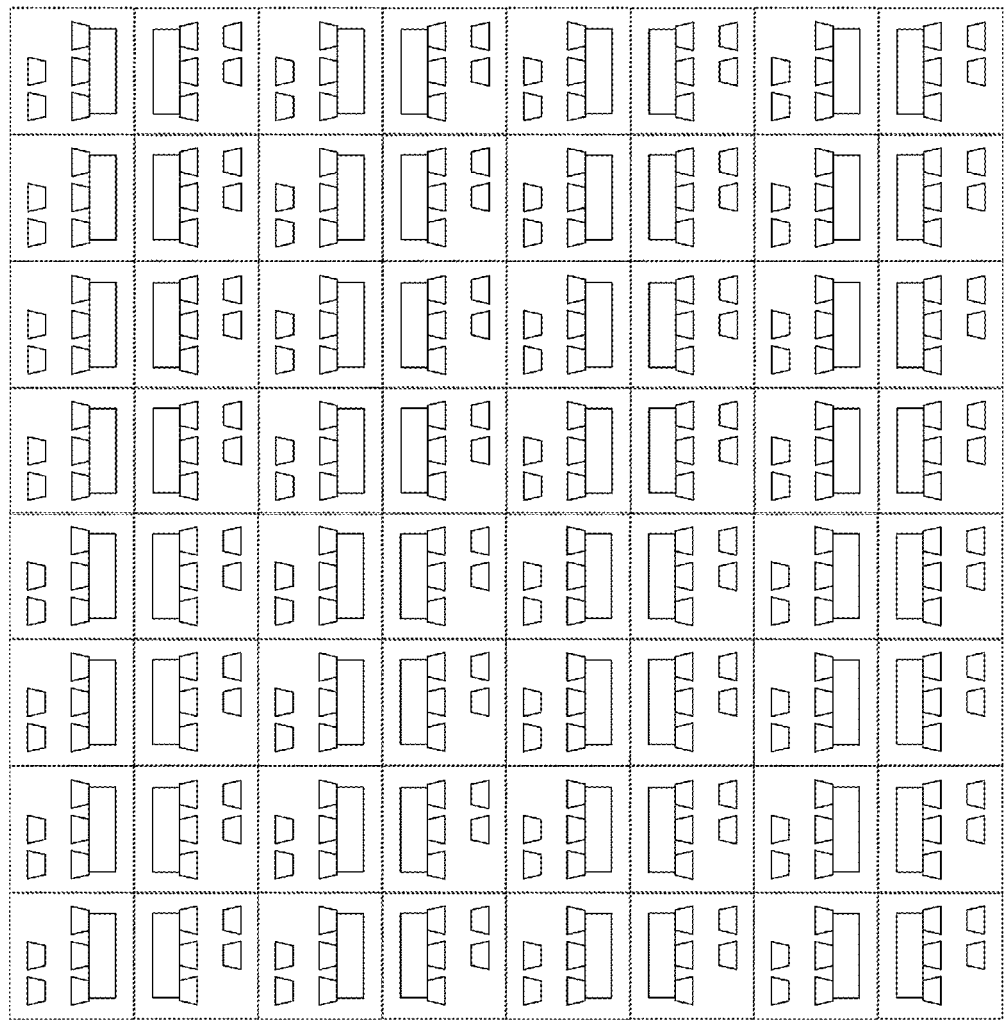
FIG. 4 conceptually illustrates one possible physical architecture of an IC with configurable circuits illustrated in FIG. 3 in some embodiments of the invention.
Figure 5:
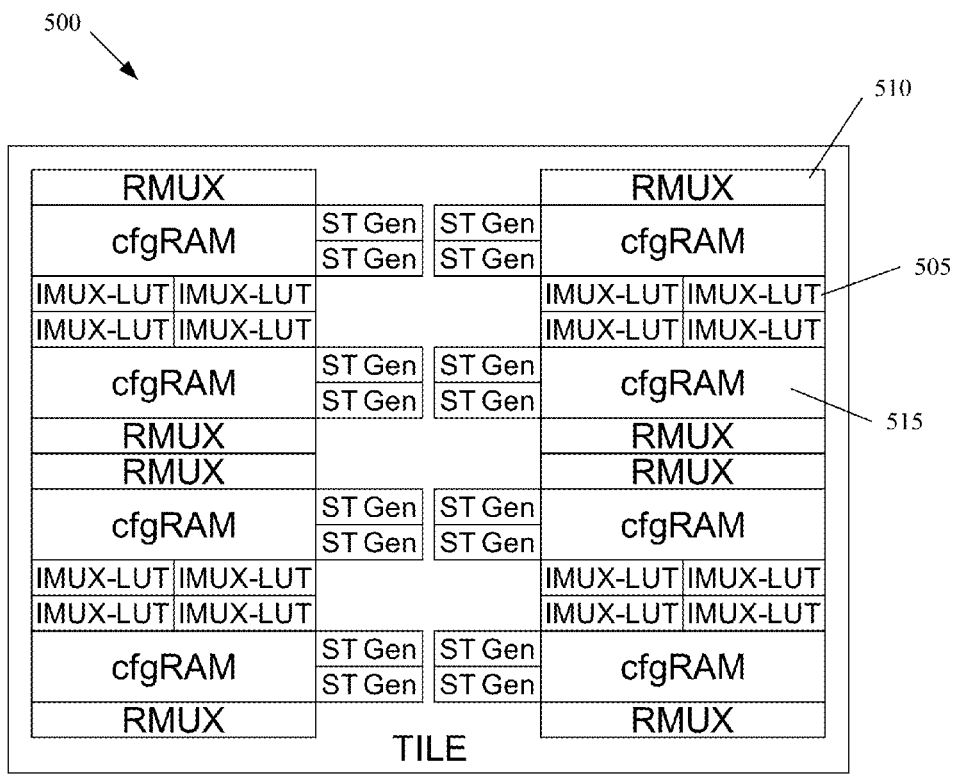
FIG. 5 conceptually illustrates an alternative tile structure that is used in some embodiments of the invention.

In some embodiments, the configurable circuits might be organized in an arrangement that has all the circuits organized in an array with several aligned rows and columns. In addition, within such a circuit array, some embodiments disperse other circuits (e.g., memory blocks, processors, macro blocks, IP blocks, controllers, clock management units, etc.). FIGS. 3-5 illustrate several configurable circuit arrangements/architectures in some embodiments of the invention. One such architecture is illustrated in FIG. 3.

The architecture of FIG. 3 is formed by numerous configurable tiles 305 that are arranged in an array with multiple rows and columns. In FIG. 3, each configurable tile includes a configurable three-input look-up table (LUT) 310, three configurable input-select multiplexers 315, 320, and 325, and two configurable routing multiplexers 330 and 335. Different embodiments have different numbers of configurable interconnect circuits 315-335. For instance, some embodiments may have eight configurable interconnect circuits while others may have more or less such circuits. For each configurable circuit, the IC 300 includes a set of storage elements (e.g., a set of SRAM cells) for storing a set of configuration data bits. Storage elements may alternatively be referred to as storage circuits.

In some embodiments, the logic circuits are look-up tables while the interconnect circuits are multiplexers. Other configurable tiles can include other types of circuits, such as memory arrays instead of logic circuits.

In FIG. 3, an input-select multiplexer (also referred to as an "IMUX") 315 is an interconnect circuit associated with the LUT 310 that is in the same tile as the input select multiplexer. One such input select multiplexer receives several input signals for its associated LUT and passes one of these input signals to its associated LUT. In some embodiments, some of the input-select multiplexers are hybrid input-select/logic circuits (referred to as "HMUXs") capable of performing logic operations as well as functioning as input select multiplexers. An HMUX is a multiplexer that can receive "user-design signals" along its select lines.

A user-design signal within the IC with configurable circuits is a signal that is generated by a circuit (e.g., logic circuit) of the IC. The word "user" in the term "user-design signal" connotes that the signal is a signal that the IC generates for a particular application that a user has configured the IC to perform. User-design signal is abbreviated to user signal or signal in some of the discussion in this specification.

In FIG. 3, a routing multiplexer (also referred to as an RMUX) 330 is an interconnect circuit that at a macro level connects other logic and/or interconnect circuits. In other words, unlike an input select multiplexer in these figures that only provides its output to a single logic circuit (i.e., that only has a fan out of 1), a routing multiplexer in some embodiments either provides its output to several logic and/or interconnect circuits (i.e., has a fan out greater than 1), or provides its output to at least one other interconnect circuit.

In some embodiments, the RMUXs depicted in FIG. 3 form the routing fabric along with the wire-segments that connect to the RMUXs, and the vias that connect to these wire segments and/or to the RMUXs. In some embodiments, the routing fabric further includes buffers for achieving one or more objectives (e.g., to maintain the signal strength, reduce noise, alter signal delay, etc.) with respect to the signals passing along the wire segments.

Various wiring architectures can be used to connect the RMUXs, IMUXs, and LUTs. Several examples of the wire connection scheme are described in U.S. Pat. No. 7,295,037, entitled "Configurable IC with Routing Circuits with Offset Connections", issued on Nov. 13, 2007.

In some embodiments, a direct connection is established through a combination of one or more wire segments, and potentially one or more vias, but no intervening circuit. In some embodiments, a direct connection might, however, include one or more intervening buffer circuits but no other type of intervening circuits. In some of these embodiments, the intervening non-configurable circuits include interconnect circuits, while in other embodiments they do not include interconnect circuits.

In some embodiments, the examples illustrated in FIG. 3 represent the actual physical architecture of an IC with configurable circuits. However, in other embodiments, the examples illustrated in FIG. 3 topologically illustrate the architecture of a IC (i.e., they conceptually show the IC without specifying a particular geometric layout for the position of the circuits).

In some embodiments, the position and orientation of the circuits in the actual physical architecture of an IC with configurable circuits are different from the position and orientation of the circuits in the topological architecture of the IC. Accordingly, in these embodiments, the physical architecture of the IC appears quite different than its topological architecture. FIG. 4 provides one such possible physical architecture of the IC 300 illustrated in FIG. 3.

Having the aligned tile layout with the same circuit elements of FIG. 4 simplifies the process for designing and fabricating the IC, as it allows the same circuit designs and mask patterns to be repetitively used to design and fabricate the IC. In some embodiments, the similar aligned tile layout not only has the same circuit elements but also has the exact same internal wiring between their circuit elements. Having such a layout further simplifies the design and fabrication processes by further simplifying the design and mask making processes.

Some embodiments might organize the configurable circuits in an arrangement that does not have all the circuits organized in an array with several aligned rows and columns. Therefore, some arrangements may have configurable circuits arranged in one or more arrays, while other arrangements may not have the configurable circuits arranged in an array.

Some embodiments might utilize alternative tile structures. For instance, FIG. 5 illustrates an alternative tile structure that is used in some embodiments. This tile 500 has four sets 505 of 4-aligned LUTs along with their associated IMUXs. It also includes eight sets 510 of RMUXs and eight banks 515 of configuration RAM storage. Each 4-aligned LUT tile shares one carry chain. One example of which is described in U.S. Pat. No. 7,295,037, entitled "Configurable IC with Routing Circuits with Offset Connections", issued on Nov. 13, 2007. One of ordinary skill in the art would appreciate that other organizations of LUT tiles may also be used in conjunction with the invention and that these organizations might have fewer or additional tiles.

C. Reconfigurable IC Architecture

Some embodiments of the invention perform placement for an IC that has reconfigurable circuits that reconfigure (i.e., base their operation on different sets of configuration data) one or more times during the operation of the IC. Specifically, these ICs are configurable ICs that can reconfigure one or more circuits during runtime. These IC typically includes reconfigurable logic circuits and/or reconfigurable interconnect circuits, where the reconfigurable logic and/or interconnect circuits are configurable logic and/or interconnect circuits that can "reconfigure" more than once at runtime. A configurable logic or interconnect circuit reconfigures when it bases its operation on a different set of configuration data. An IC with reconfigurable circuits is sometimes referred to as a reconfigurable IC. However, in addition to reconfigurable circuits, the IC also typically includes non-configurable circuits (e.g., non-configurable logic circuits, interconnect circuits, memories, configurable circuits that are not sub-cycle reconfigurable, etc.).

In some embodiments, the logic circuits are look-up tables while the interconnect circuits are multiplexers. Also, in some embodiments, the LUTs and the multiplexers are sub-cycle reconfigurable circuits (sub-cycles of reconfigurable circuits may be alternatively referred to as "reconfiguration cycles"). In some of these embodiments, the IC with configurable circuits stores multiple sets of configuration data for a sub-cycle reconfigurable circuit, so that the reconfigurable circuit can use a different set of configuration data in different sub-cycles. A reconfigurable circuit of some embodiments that operates on four sets of configuration data receives its four configuration data sets sequentially in an order that loops from the first configuration data set to the last configuration data set. Such a sequential reconfiguration scheme is referred to as a 4 "loopered" scheme. Other embodiments, however, might be implemented as six or eight loopered sub-cycle reconfigurable circuits. In a six or eight loopered reconfigurable circuit, a reconfigurable circuit receives six or eight configuration data sets in an order that loops from the last configuration data set to the first configuration data set. Sub-cycle reconfigurable circuits are also referred to as spacetime reconfigurable while reconfigurable circuits that are not sub-cycle reconfigurable are referred to as spatial reconfigurable circuits.

Figure 6:
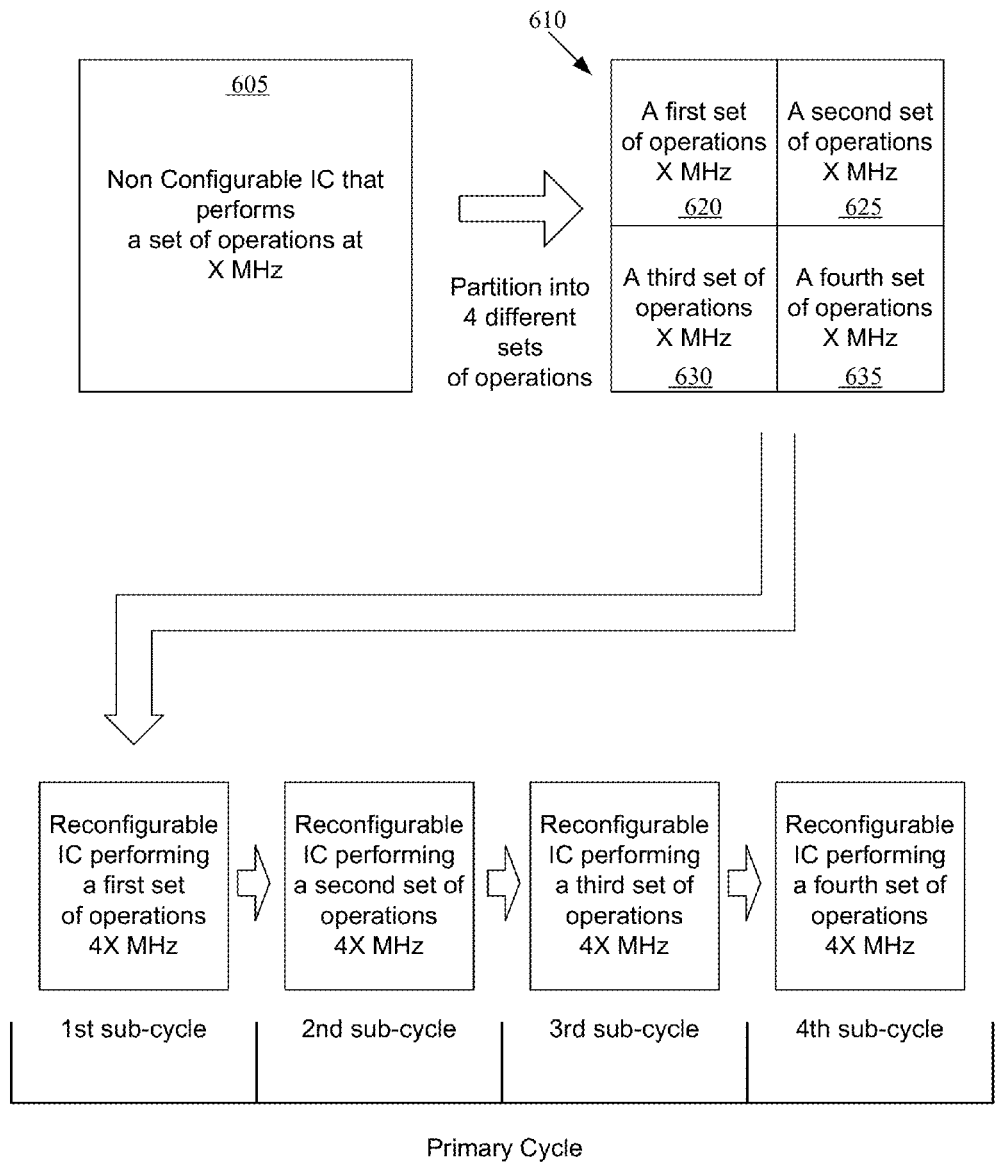
FIG. 6 conceptually illustrates an example of an IC with circuits that are reconfigurable on a sub-cycle basis in some embodiments of the invention.

FIG. 6 conceptually illustrates an example of an IC with sub-cycle reconfigurable circuits (i.e., circuits that are reconfigurable on a sub-cycle basis). In this example, the IC implements an IC design 605 that operates at a clock speed of X MHz. The operations performed by the components in the IC design 605 can be partitioned into four sets of operations 620-635, with each set of operations being performed at a clock speed of X MHz.

FIG. 6 then illustrates that these four sets of operations 620-635 can be performed by one IC 610 with sub-cycle reconfigurable circuits. The IC operates at 4X MHz. In some embodiments, four cycles of the 4X MHz clock correspond to four sub-cycles within a cycle of the X MHz clock. Accordingly, this figure illustrates the IC 610 (i.e., at least one or the reconfigurable circuits of the IC) reconfiguring four times during four cycles of the 4X MHz clock (i.e., during four sub-cycles of the X MHz clock). During each of these reconfigurations (i.e., during each sub-cycle), the IC 610 performs one of the identified four sets of operations 620-635. In other words, the faster operational speed of the IC 610 allows the circuits of this IC to reconfigure four times during each cycle of the X MHz clock, in order to perform the four sets of operations 620-635 sequentially at a 4X MHz rate instead of performing the four sets of operations in parallel at an X MHz rate.

Several embodiments were described above by reference to examples of sub-cycle reconfigurable circuits that operate based on four different sets of configuration data. In some of these examples, a reconfigurable circuit receives its four different configuration data sets sequentially in an order that loops from the last configuration data set to the first configuration data set. Such a sequential reconfiguration scheme is referred to as a 4-loopered scheme. Higher order loopered schemes (e.g., 8, 16, 32, etc.,) can likewise be implemented.

While the reconfigurable circuits described above reconfigure in sub-cycles of a user design clock cycle, one of ordinary skill in the art will understand that in some embodiments, the reconfiguration cycles are not part of a larger user design clock cycle. Accordingly, any features described herein as using sub-cycles can also be implemented in some embodiments with reconfiguration cycles that are not sub-cycles of a longer user design clock cycle. In some such embodiments, multiple reconfigurations of the reconfigurable circuits are performed cyclically based on a reconfiguration clock cycle. In some such embodiments, some reconfigurable circuits reconfigure sequentially through a sequence of configurations over the course of multiple reconfiguration cycles, and then repeat the sequence of configurations multiple times.

II. OVERVIEW

Some embodiments provide a detailed placer for assigning cells in a user design to physical sites on an IC. In an IC that has no configurable circuits (such as a VLSI), a physical site is any location on the IC wafer where a circuit module is allowed to be placed. In an IC with configurable circuits (such as an FPGA) or an IC with reconfigurable circuits, a site is an existing logic circuit or logic block on the IC. Placement in ICs is usually performed in two stages, global and detailed placement. Global placement distributes the cell over the placement region with the goal to reduce the global congestion, global timing, and wirelength. Detailed placer uses a better timing model than global placement with the goal of resolving local congestion and local timing problems.

Figure 7:
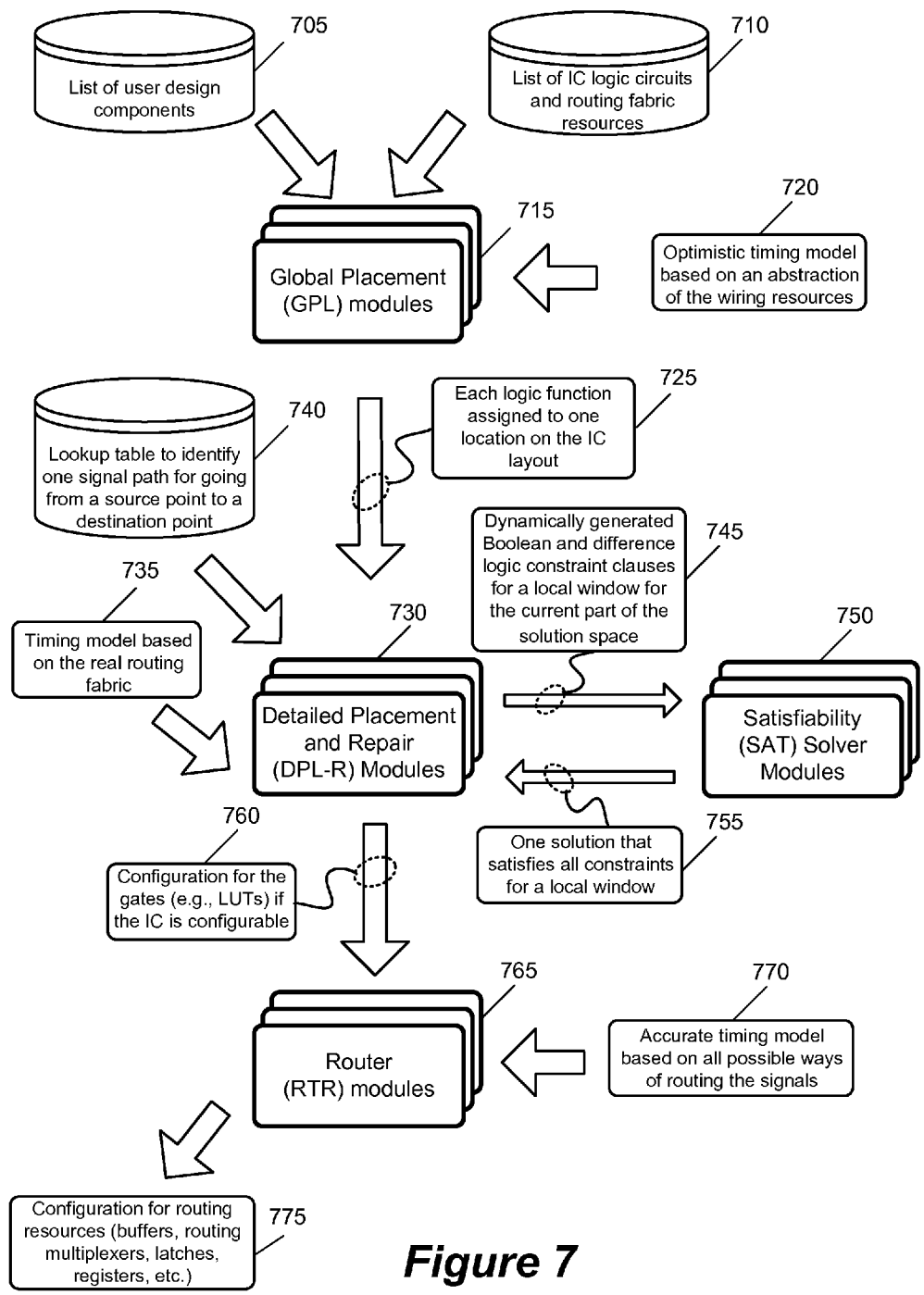
FIG. 7 conceptually illustrates the interactions of the detailed placement modules with global placement modules and router modules in some embodiments of the invention.

FIG. 7 conceptually illustrates the interactions of the detailed placer with global placer and router in some embodiments. As shown, the global placer (GPL) includes a set of global placement modules 715. The GPL modules receive a list 705 of user design components (hereinafter referred to as cells) and a list 710 of IC logic circuits and routing fabric resources (hereinafter referred to as sites) for placing the user design components.

Figure 8:
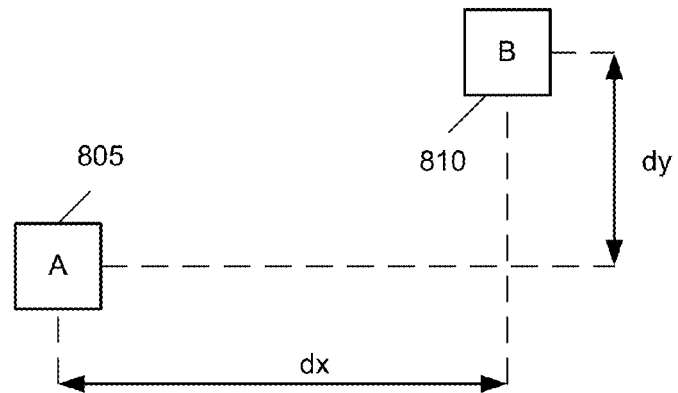
FIG. 8 conceptually illustrates the optimistic timing model used by global placer for an IC in some embodiments of the invention.

The global placer uses an optimistic timing model 720 that is based on an abstraction of the wiring resources. FIG. 8 conceptually illustrates an example of the optimistic timing model used by GPL for an IC in some embodiments. The timing model estimates the time it takes for the signal to get from a source cell 805 to a destination (or sink) cell 810 by using the distance between the two cells as an indication of the wire length between the source and sink cells. Each cell indicates a user design component such as a logic function. As shown in FIG. 8, dx and dy indicate the distance of the source and sink cells in x and y coordinates. As shown, this model uses the distance between the two cells instead of a possibly lengthier path through the actual routing fabric between the two cells.

Figure 9:
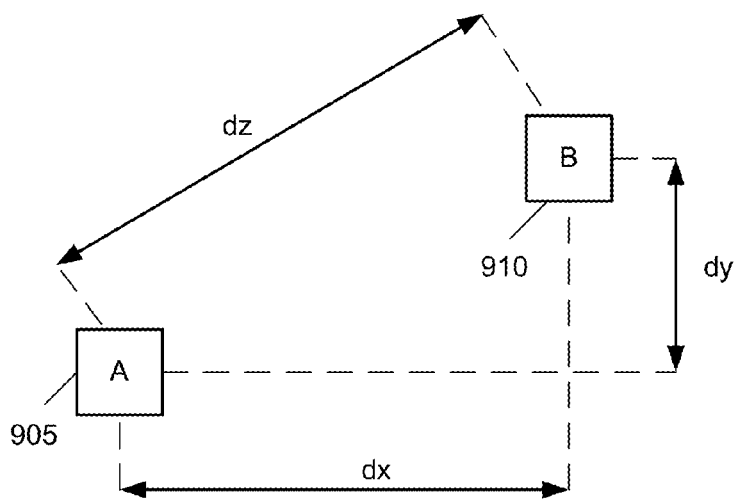
FIG. 9 conceptually illustrates the optimistic timing model used by global placer for an IC with sub-cycle reconfigurable circuits in some embodiments of the invention.

For an IC with sub-cycle configurable circuits, the sink cell may be placed in a different sub-cycle. The timing model has, therefore, an additional component, dz, that indicates the number of sub-cycles between when the source cell is placed and when the sink cell is placed. FIG. 9 conceptually illustrates an example of the optimistic timing model used by GPL for an IC with sub-cycle reconfigurable circuits in some embodiments. Similar to FIG. 8, the timing model in FIG. 9 estimates the time it takes for the signal to get from a source cell 905 to a destination (or sink) cell 910 by using the distance between the two cells as an indication of the wire length between the source and sink cells. As shown in FIG. 9, dx and dy indicate the distance of the source and sink cells in x and y coordinates while dz indicates the number of sub-cycles between when the source cell is placed and when the sink cell is placed. For instance, if the source is placed in sub-cycle 2 and the sink cell is placed in sub-cycle 7 of a user design cycle, dz is equal to 5 sub-cycles.

Referring back to FIG. 7, the global placer uses the optimistic timing model 720 to generate an output list 725 that assigns each logic function in the user design to one location in the IC layout. In an IC with sub-cycle configurable circuits, each cell (e.g., a user design logic function) is assigned to one site (e.g., a LUT or a gate) in one sub-cycle. The output 725 of GPL is used by detailed placer 730 modules to perform detailed placement. The detailed placer repairs local timing and local congestion. The term detailed-placement and repair (or DPL-R) is used in this specification to refer to one or more embodiments of the disclosed detailed placer.

Figure 10:
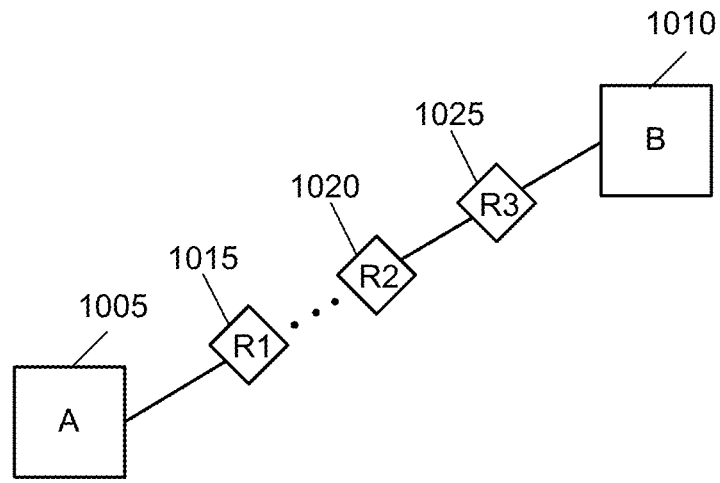
FIG. 10 conceptually illustrates the timing model used by DPL-R in some embodiments.

DPL-R formulates problems as constraint satisfaction in order to meet timing and generates legal overlap-free placement with minimal degradation of global congestion quality. DPL-R uses a timing model 735 that is based on the actual routing fabric resources. Optionally, DPL-R in some embodiments (e.g., in ICs with configurable or reconfigurable circuits) uses a lookup table 740 to identify one signal path for going from a source cell to a destination cell. FIG. 10 conceptually illustrates the timing model used by DPL-R in some embodiments. As shown, the timing model uses the routing fabric resources 1015-1025 e.g., the routing resources identified by the lookup table 740) to determine the timing delay between a source cell 1005 and a destination cell 1010. The routing resources in some embodiments are wires and buffers used to connect different components of an IC. In other embodiments, routing resources include multiplexers or switches used as interconnects to connect different components of an IC with configurable circuits. Yet in some embodiments, the routing fabric includes latches and registers used as interconnects. The timing delay is calculated as the sum of wire length delays and the delays to go through the routing resources between (1) the source cell 1005 and the first routing resource (e.g., latch) 1015, (2) each routing fabric resource 1015-1025 and the next routing fabric resource, and (3) the last routing fabric resource 1025 and the destination cell 1010.

For an IC with sub-cycle reconfigurable circuits, some of the routing resources are used to hold a signal at the end of a sub-cycle to pass the signal to the next sub-cycle. The timing model includes the sub-cycle delays to the total delay for a signal to travel between the source and destination cells. For instance, when routing resource 1020 is a register that holds the signal for two sub-cycles, the two sub-cycle delay is added to the wire length delays between the source and sink cells.

DPL-R 730 in FIG. 7 uses the output 725 of the GPL and the timing model 735 that is based on the actual routing fabric resources to determine whether any connections between two different cells have failed. DPL-R selects a pair of a source cell and a destination cells that do not satisfy their placement constraints. A pair of source and destination cells and their current connection is referred to as a "fromto" in this specification.

The DPL-R selects a failed fromto, selects a group of other fromtos in the vicinity of the failed connection and passes the information for the selected group of cells, the associated connections, and a set of initial constraints to a satisfiability solver (SAT solver) 750.

In some embodiments, the SAT solver informs DPL-R 730 each time a cell in the selected group of cells is moved to a new site. Based on the move, DPL-R 730 dynamically generates a set of Boolean and mathematical constraints and passes them to the SAT solver. The mathematical constraints (referred in this specification as difference logic constraints or difference logic clauses) include mathematical operators, inequalities, and real numbers. The difference logic clauses are used by DPL-R to formulate timing constraints for the SAT solver.

The SAT solver uses the new constraints to move another cell until the SAT solver either finds a solution or informs the DPL-R that a solution based on the current set of constraints cannot be found. Interactions between the DPL-R and the SAT solver are described further below by reference to FIG. 27.

Once all placement constraints are satisfied, the DPL-R generates an output that assigns the cells in the user design to sites on the IC layout. For an IC with configurable and/or reconfigurable circuits, the output of DPL-R includes the configuration 760 for the gates (e.g., LUTs) on the IC. The output of DPL-R is used by the router (RTR) 765 to do global and detailed routing. The router uses an accurate timing model 770 that is based on different possible ways of routing the signals.

Figure 11:
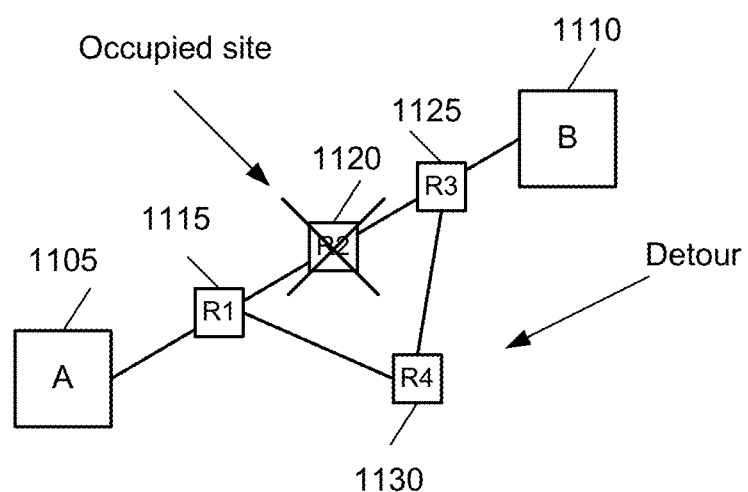
FIG. 11 conceptually illustrates how a path suggested by the DPL-R is modified by the router in some embodiments of the invention.

FIG. 11 conceptually illustrates how a path suggested by the DPL-R is modified by the router 765. As shown in this example, the path generated by DPL-R starts from the source cell 1105 and goes to the destination cell 1110 through three routing fabric resources 1115-1125. If the router determines that a routing resource (e.g., routing resource 1120) is already used for a different signal path or the path is congested, the router connects routing resources 1115 and 1125 through a different unoccupied routing resource 1130. The router then tests for congestion to ensure the new path satisfies the congestion criteria. As shown in FIG. 7, the output of the router includes configuration 775 for routing resources.

A. Using a Satisfiability Solver to do Placement

Some embodiments utilize a satisfiability solver in order to solve timing and legalization problems during placement operations. A satisfiability (or SAT) problem is formulated as a Boolean clause or expression using Boolean operators such as AND, OR, NOT. For simplicity, some of the formulas in this specification show AND, OR, NOT operators as $\wedge$, +, and $\neg$ respectively. The SAT problem is solved to determine whether there is some assignment of TRUE and FALSE values to the variables that makes the clause to result in a TRUE value. Equally important is to determine whether no such assignments exist, which means that the function expressed by the clause is FALSE for all possible variable assignments (i.e., the clause is unsatisfiable).

SAT problems belong to the class of nondeterministic polynomial time complete (NP-complete) problems where there are no known algorithms that efficiently solve all instances of the SAT problem. A SAT solver is an algorithm that can solve a large enough subset of SAT instances to be used in a practical area. SAT solvers take formulas in conjunctive normal form (CNF) or product of sums and return an assignment for variables to make the clause TRUE or indicate that none exists. CNF clauses include a set of literals (or Boolean variables) that may be negated and operators. For instance (A OR B) AND (NOT C OR D) is a CNF formula.

Figure 12:
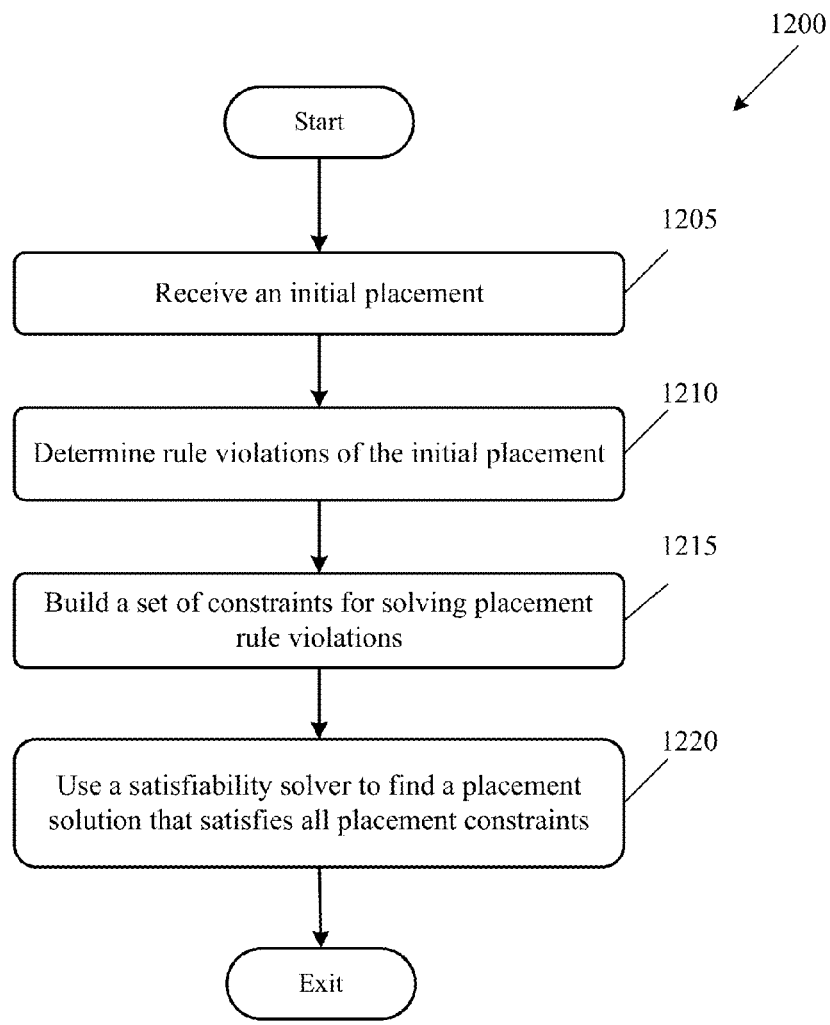
FIG. 12 conceptually illustrates a process for using a satisfiability solver to solve placement violations in some embodiments of the invention.

FIG. 12 conceptually illustrates a process 1200 for using a satisfiability solver to solve placement violations in some embodiments. As shown, the process receives (at 1205) an initial placement. In some embodiments, the initial placement is the output of the global placement. In other embodiments, the initial placement is done by other techniques (e.g., random initial placement or placement based on a predetermined heuristic). The process then determines (at 1210) the placement violations of the initial placement. As described further below, the placement violations include legalization violations and timing violations.

The process then builds (at 1215) a set of constraints for solving placement violations. A simple example of such a constraint is a constraint that prevents two cells to be placed on the same site. As described further below, some embodiments also utilize constraints that include mathematical formulas and inequalities to express different timing requirements and constraints. The process then utilizes (at 1220) a satisfiability solver to receive the constraints and come up with one placement solution that does not violate any rules. In some embodiments, such a solution resolves all placement violations without creating any new violations. In some embodiments, the first solution that does satisfy all constraints is accepted as a valid solution without attempting to further optimize the placement. In some embodiments, the SAT solver either constructs a solution or proves that a solution does not exist. In these embodiments, when a solution does not exist, the SAT solver identifies the combination of the requirements that make a solution impossible. When a solution does not exist, there exists at least one cell where all of the possible placement options result in constraint violations. The SAT solver identifies one such cell, and for each possible placement option, identifies the subset of the constraints that are violated as a consequence of selecting that placement option. By exhaustively demonstrating how each placement option is ruled out, the SAT solver proves conclusively that the cell has no satisfactory placement. The constraints identified in this proof are the combination of requirements that make a solution impossible, even when these requirements are considered in isolation from the complete set of the requirements. The process then exits.

For complicated placement problems with many cells to place, it is difficult to build an efficient system that uses constraint satisfaction. Problem formulations often require 100,000 or more variables and millions of constraints. Individual constraints can be very complicated and might include hundreds of separate variables. The underlying solver algorithms are often NP-complete, so the solver can consume an enormous amount of time searching for satisfiable solution or providing unsatisfiability for a complicated placement. Accordingly, several more embodiments are described below to facilitate the use of a satisfiability solver for IC placement.

B. Use of Mathematical and Timing Constraints in a Satisfiability Problem

Figure 13:
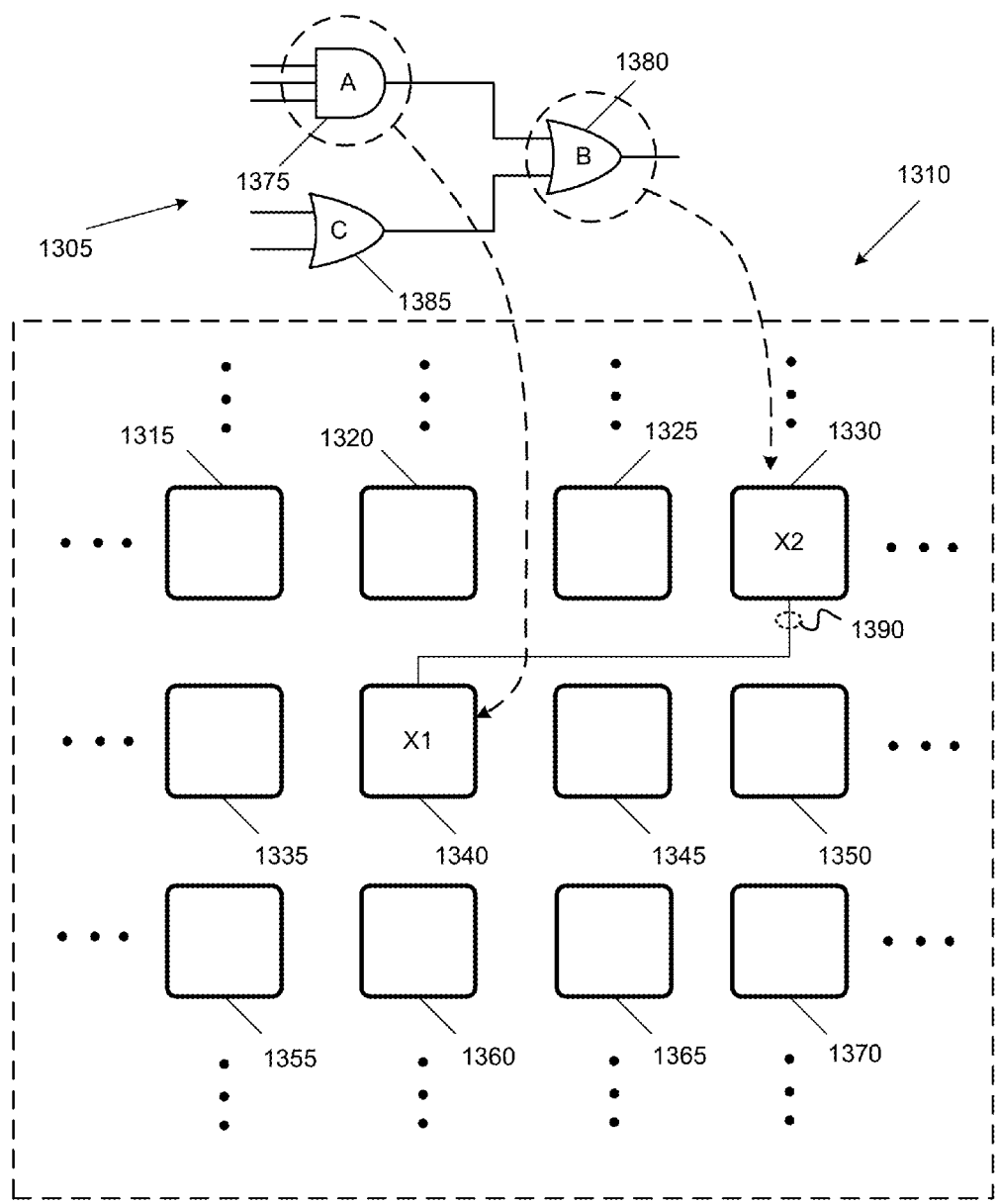
FIG. 13 conceptually illustrates a portion of a user design and a portion of an IC with configurable circuits with several sites (e.g., logic blocks such as LUTs) in some embodiments of the invention.

Some embodiments use timing constraints clauses expressed as mathematical formulas (in addition to Boolean clauses) when using a SAT solver to solve placement problems. FIG. 13 conceptually illustrates a portion 1305 of a user design and a portion 1310 of an IC with several sites 1315-1370 in some embodiments. Examples of such sites include locations in placement region of a VLSI or logic blocks such as LUTs in an IC with configurable circuits. The illustrated portion of the user design includes three cells 1375-1385. As shown, cell A 1375 is placed in site X1 1340 and cell B 1380 is placed in site X2 1330.

The connection 1390 between the source cell A 1375 when located in site X1 and the destination (or sink) cell B 1380 when located in site X2 has a signal delay of M which is expressed as SS (X1, X2)=M. The signal delay includes delay due to wire length and delay for the signal to go through routing elements such as routing multiplexer. In order to meet timing requirements, the time the signal becomes available at the output of the source cell A 1375, plus the time, M, that takes for the signal to travel between the source cell A 1375 and the destination cell B 1380, plus the delay, $G_B$, for the signal to go through the destination cell B 1380 must be less that the time that the signal is required at the output of the destination cell B 1380. This timing requirement (or constraint) is formulated by the following expression (A):

$$R_B - A_A >= M + G_B \quad (A)$$

where $R_B$ is the required time of the signal at the output of the destination cell B 1380, $A_A$ is the available time of the signal at the output of the source cell A 1375, M is the source to destination signal transmission delay including delay due to wire length and delay for the signal to go through routing elements, and $G_B$ is the delay for the signal to go through the destination cell B 1380. As shown, expression (A) is a mathematical formula which includes the mathematical operator+ and an inequality operator as opposed to a Boolean constraint that includes only Boolean variables and Boolean operators.

Figure 14:
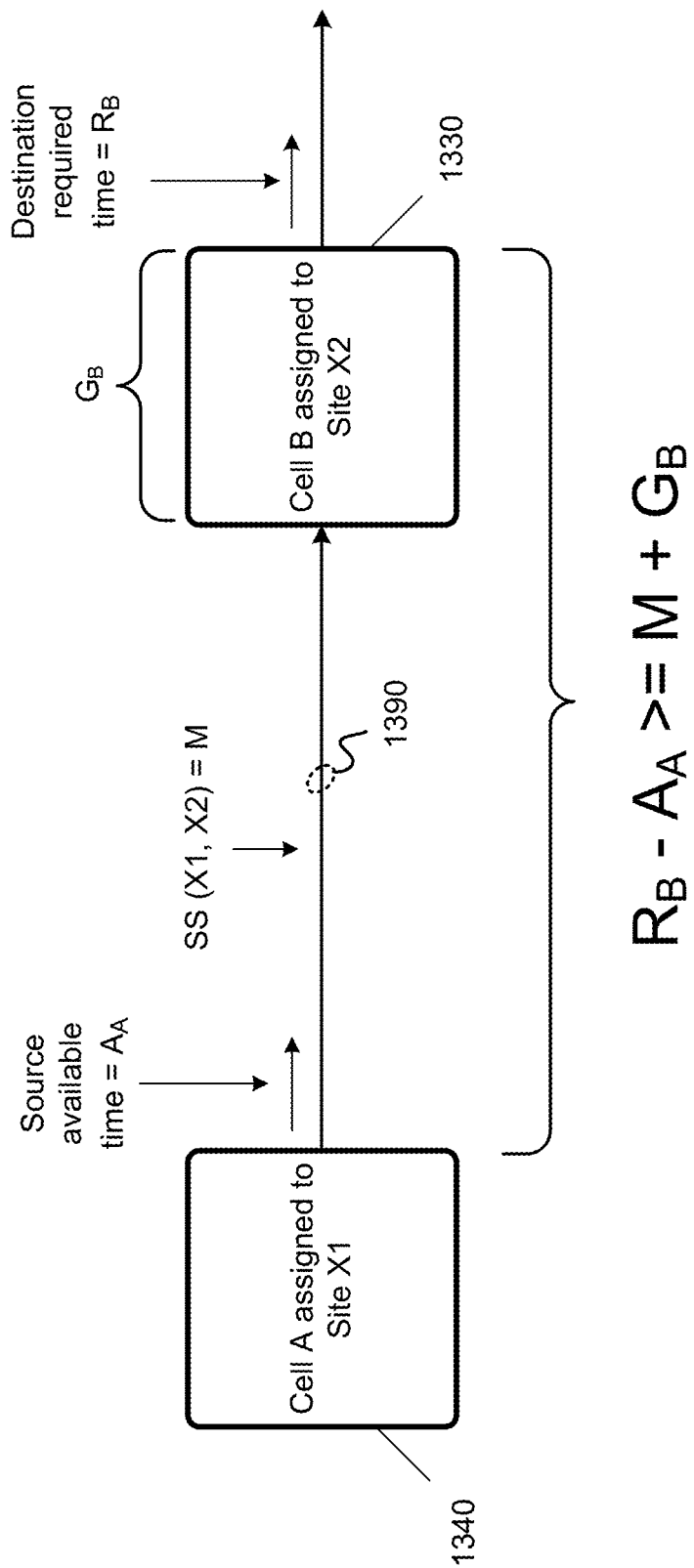
FIG. 14 conceptually illustrates a timing constraints expression that the DPL-R sends to the SAT solver in some embodiments of the invention.

FIG. 14 conceptually illustrates the timing constraints expression (A) that the DPL-R sends to the SAT solver in some embodiments. As shown, cell A is assigned to site X1 1340 and cell B is assigned to site X2 1330. The source to destination (or source to sink) signal delay for connection 1390 is shown as "SS (X1, X2)=M". In order for the placement of cell A in site X1 and cell B in site X2 to be a valid placement, the timing constraint (A) shown above has to be satisfied.

Figure 15:
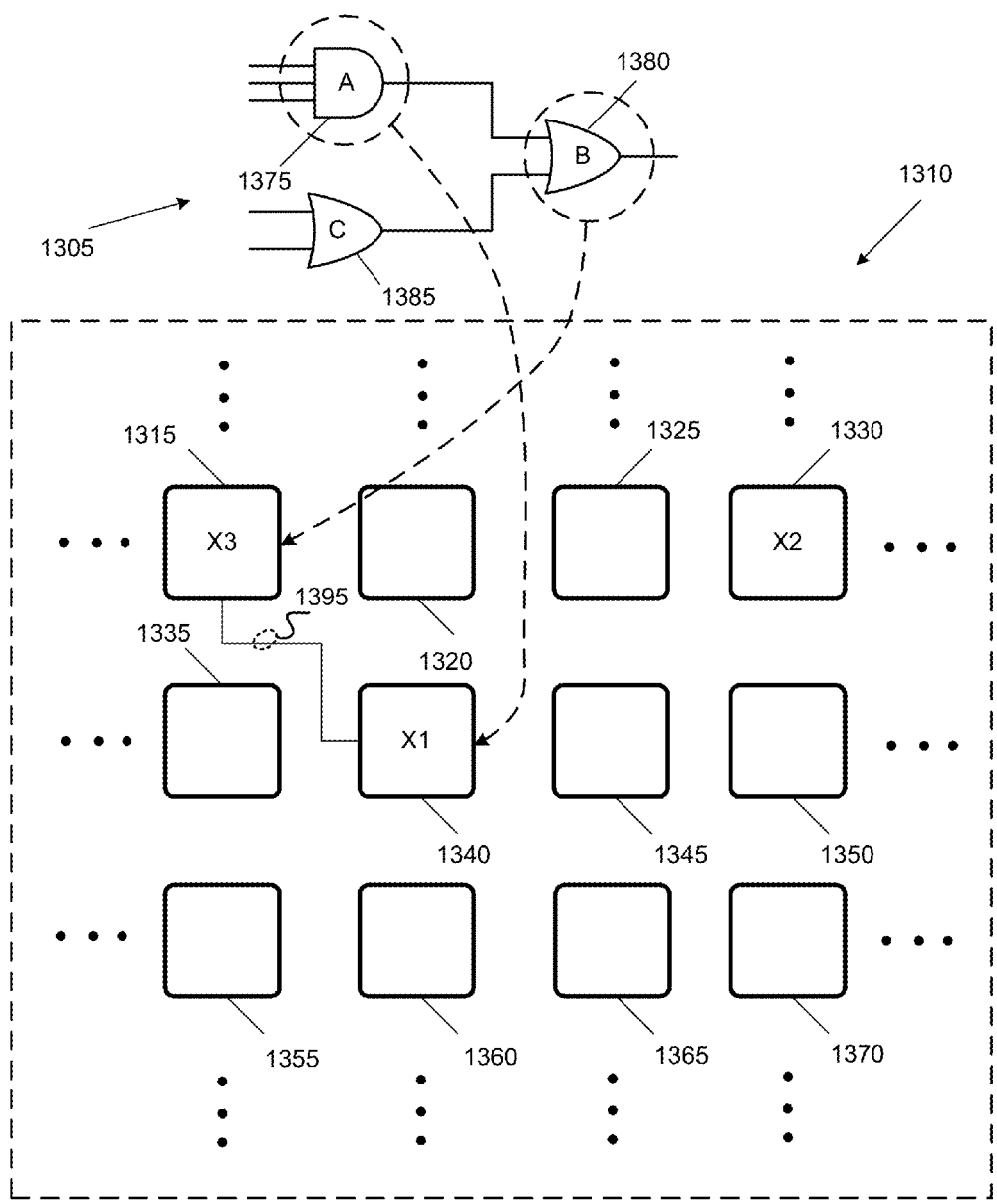
FIG. 15 conceptually illustrates the same source and destination cells as in FIG. 13 after the destination cell is moved to a different site in some embodiments of the invention.

Assuming that the constraint is not satisfied when cell A is placed in site X1 1340 and cell B is placed in site 1330, the SAT solver moves one of the cells to another site. The SAT solver then receives a new timing constraint from the DPL-R and checks whether the new timing constraint between the arrival time of the signal at the destination cell and the available time of the signal at the source cell is satisfied. FIG. 15 conceptually illustrates the same source and destination cells 1375 and 1380 after the destination cell is moved to site X3 1315 in some embodiments. Assuming that the signal transmission delay between sites X1 and X3 is "SS (X1, X3)=N", the SAT solver checks the timing validity of the new placement by using the constraint in the following expression (B):

$$R_B - A_A >= N + G_B \quad (B)$$

where $R_B$ is the required time of the signal at the output of the destination cell B 1380, $A_A$ is the available time of the signal at the output of the source cell A 1375, N is the source to destination signal transmission delay including delay due to wire length and delay for the signal to go through routing elements, and $G_B$ is the delay for the signal to go through the destination cell B 1380.

Figure 16:
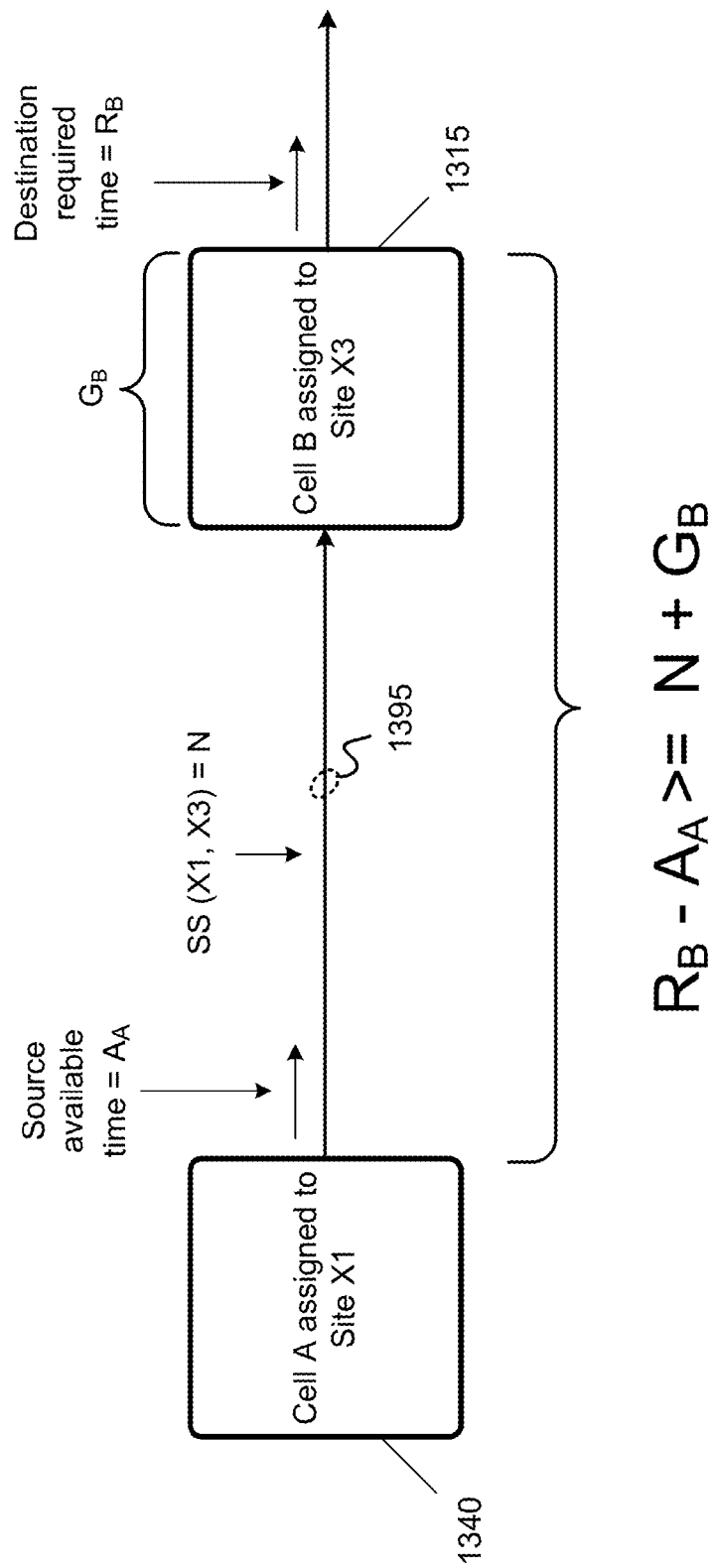
FIG. 16 conceptually illustrates a timing constraints expression that the DPL-R sends to the SAT solver in some embodiments of the invention.

FIG. 16 conceptually illustrates the timing constraints expression (B) that the DPL-R sends to the SAT solver in some embodiments. As shown, cell A is assigned to site X1 1340 and cell B is assigned to site X3 1315. The source to destination (or source to sink) signal delay for connection 1395 is shown as "SS (X1, X3)=N". In order for the placement of cell A in site X1 and cell B in site X3 to be a valid placement, the timing constraint (B) shown above has to be satisfied.

In the examples of FIGS. 13-16, the assumption is that the time that the signal is available at the source cell and the time that the signal is required at the destination cell is known in advance. For instance, the input signal comes from outside to the source cell and the user design indicates that the input signal is available at a particular time and the user design also indicates that the signal is required at the output of the destination cell on or before a certain time. The values of the $R_B$ and $A_A$ are therefore known in expressions (A) and (B), above. However, when there are intermediate cells in the path between a source cell and a destination, the available and required times of each intermediate cell as well as the signal delays between the cells has to be added as variables to the constraint expressions.

Figure 17:
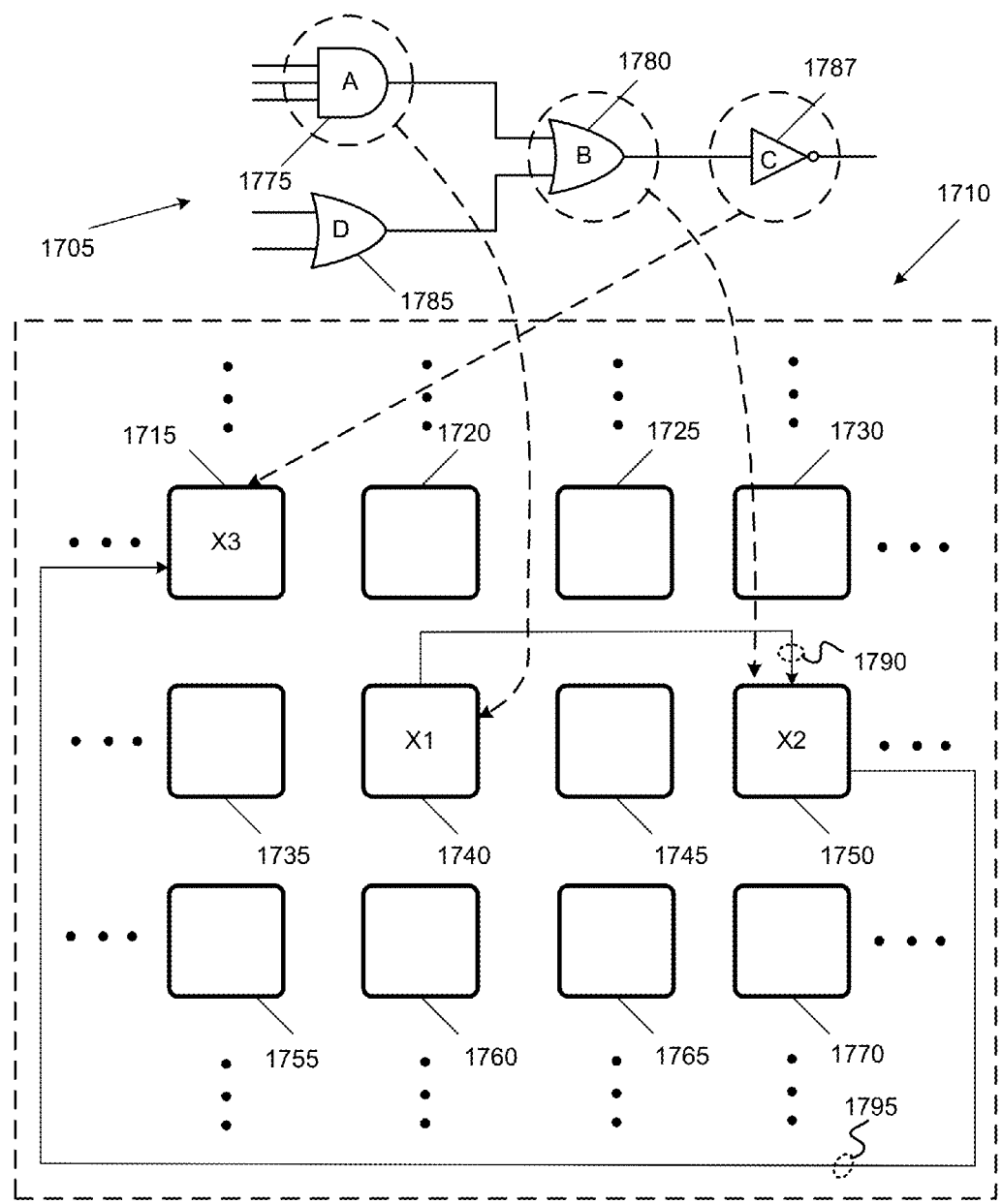
FIG. 17 conceptually illustrates a portion of a user design and a portion of an IC with configurable circuits with several sites (e.g., logic blocks such as LUTs) in some embodiments of the invention.

FIG. 17 conceptually illustrates a portion 1705 of a user design and a portion 1710 of an IC with several sites 1715-1770 in some embodiments. Examples of such sites include locations in placement region of a VLSI or logic blocks such as LUTs in an IC with configurable circuits. The illustrated portion of the user design includes four cells 1775-1787. As shown, cell A 1775 is placed in site X1 1740, cell B 1780 is placed in site X2 1790, and cell C 1787 is placed in site X3 1715. As described below, there are several more timing variables to consider in FIG. 17 than in FIGS. 13 and 15.

As shown in FIG. 17, the path between the source cell A 1775 (placed at site X1 1740) and the destination cell C 1787 (placed at site X3 1715) goes through cell B 1780 (placed at site X2 1790). The connection 1790 between the source cell A 1775 when located in site X1 and the cell B 1780 when located in site X2 has a signal delay of M which is expressed as SS (X1, X2)=M. The connection 1795 between the cell B 1780 when located in site X2 and the destination cell C 1787 when located in site X3 has a signal delay of N which is expressed as SS (X2, X3)=N. The signal delays include delay due to wire length and delay for the signal to go through routing elements. In order to meeting timing requirements, the time the signal becomes available at the output of the source cell A 1775, plus the time, M, plus the time N, plus the delay, $G_B$, for the signal to go through the cell B 1780, plus the delay, $G_C$, for the signal to go through the cell C 1787 must be less that the time that the signal is required at the output of the destination cell C 1787. This timing requirement (or constraint) is formulated by the following expression (C):

$$R_C - A_A >= M + N + G_B + G_C \quad (C)$$

where $R_C$ is the required time of the signal at the output of the destination cell C 1787, $A_A$ is the available time of the signal at the output of the source cell A 1775, M is the signal transmission delay between cells A 1775 and B 1780 including delay due to wire length and delay for the signal to go through routing elements, N is the signal transmission delay between cells B 1780 and C 1787 including delay due to wire length and delay for the signal to go through routing elements, $G_B$ is the delay for the signal to go through cell B 1780, and $G_C$ is the delay for the signal to go through the destination cell C 1787.

Figure 18:
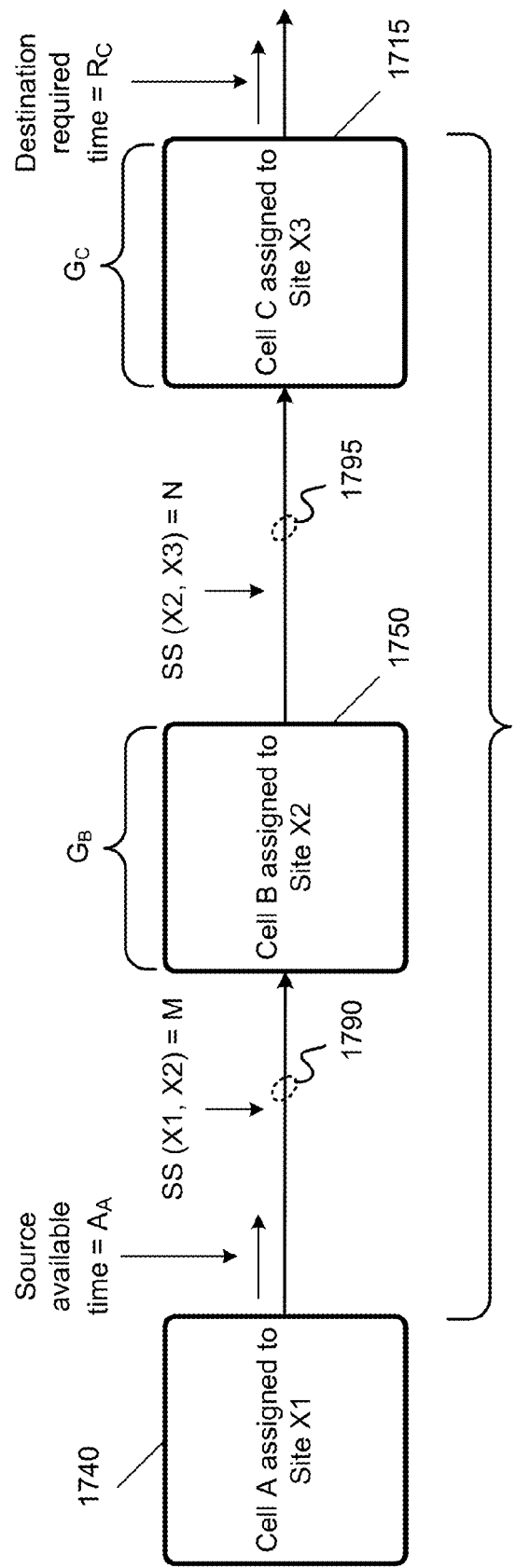
FIG. 18 conceptually illustrates a timing constraints expression that the DPL-R sends to the SAT solver in some embodiments of the invention.

FIG. 18 conceptually illustrates the timing constraints expression (C) that the DPL-R sends to the SAT solver in some embodiments. As shown, cell A is assigned to site X1 1740, and cell B is assigned to site X2 1750, cell C is assigned to site X3 1715. In order for the placement of cell A in site X1 and cell C in site X3 to be a valid placement, the timing constraint (C) shown above has to be satisfied.

In FIG. 17, only one path between the source cell A and the destination cell C which goes through cell B is shown. In a complicated circuit design, there may be many possible paths between a source and a destination cell which go through different cells in the IC design. As the number of paths between the source and destination cells increases and the number of intermediate cells between the source cell and the destination cell increases, the number and complexity of the constraint expressions increases. Every path requires a separate constraint expression and the SAT solver has to ensure all placement decisions along each path are compatible with the corresponding constraint. Not only the signal delays between the cells has to be included in the constraint formulations but also the available time and arrival time of the signal at each intermediate cell have to be included as variables in the constraints.

As the IC design becomes more complicated (a typical IC design is much more complicated that the simple examples of FIGS. 13, 15, and 17), there are more divergences and re-convergences are possible through different paths from a source cell to a destination cell. Some embodiments consider constraints for each connection instead of each path. FIGS. 19-22 conceptually illustrate portions of an IC design in some embodiments of the invention.

Figure 19:
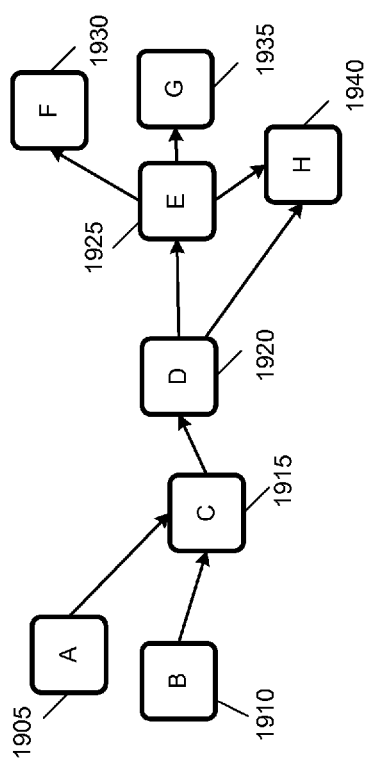
FIGS. 19-22 conceptually illustrate examples of the relationships between the number of connections and the number of paths in some embodiments of the invention.

As shown in FIG. 19, the IC design includes eight cells 1905-1940. There are eight paths between the source cells (cells A 1905 and B 1910) and the destination cells (cells F 1930, G 1935, and H 1940). These paths are ACDEF, ACDEG, ACDEH, ACDH, BCDEF, BCDEG, BCDEH, and BCDH where the letters A-H correspond to cells 1905-1940 respectively. A path indicated as, e.g., ACDEF is the path from source cell A to destination cell F that goes through intermediate cells C, D, and E. In addition, there are eight connections between the adjacent cells. These connections are AC, BC, CD, DE, DH, EF, EG, and EH where a connection indicated e.g., as AC is a connection between the two adjacent cells A and C.

Figure 20:
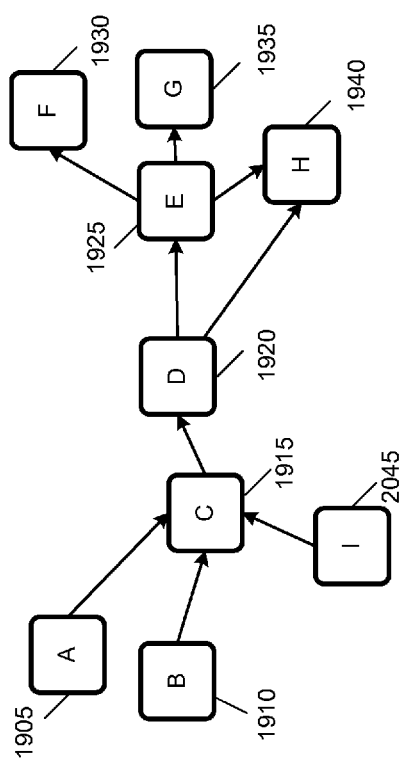

FIG. 20 shows a portion of an IC design which has one more cell (i.e., the source cell I 2045) than the portion of the IC design in FIG. 19. As shown, the number of connections has increased to nine but the number of paths between the source cells and the destination cells has grown to 12. The paths in FIG. 20 are ACDEF, ACDEG, ACDEH, ACDH, BCDEF, BCDEG, BCDEH, BCDH, ICDEF, ICDEG, ICDEH, ICDH. The connections are AC, BC, CD, DE, DH, EF, EG, EH, and IC.

Figure 21:
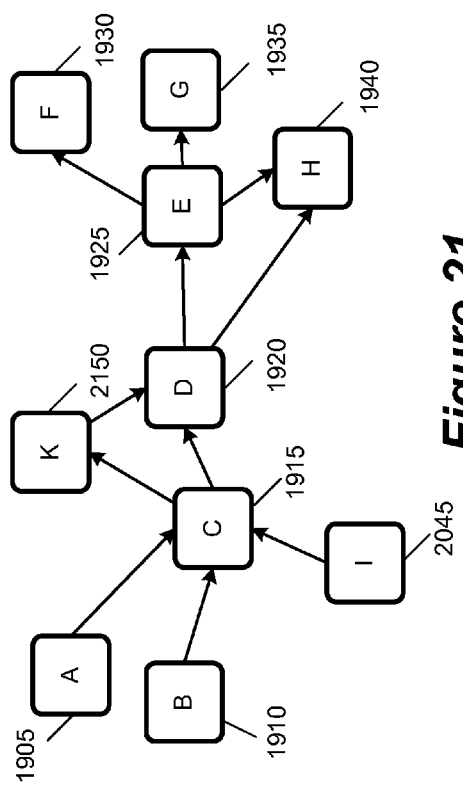

FIG. 21 shows a portion of an IC design which has one more cell (i.e., the intermediate cell K 2150) than the portion of the IC design in FIG. 20. As shown, the number of connections has increased to 11 but the number of paths between the source cells and the destination cells has grown to 24. The paths in FIG. 21 are ACDEF, ACDEG, ACDEH, ACDH, BCDEF, BCDEG, BCDEH, BCDH, ICDEF, ICDEG, ICDEH, ICDH, ACKDEF, ACKDEG, ACKDEH, ACKDH, BCKDEF, BCKDEG, BCKDEH, BCKDH, ICKDEF, ICKDEG, ICKDEH, and ICKDH. The connections are AC, BC, CD, DE, DH, EF, EG, EH, IC, CK, and KD.

Figure 22:
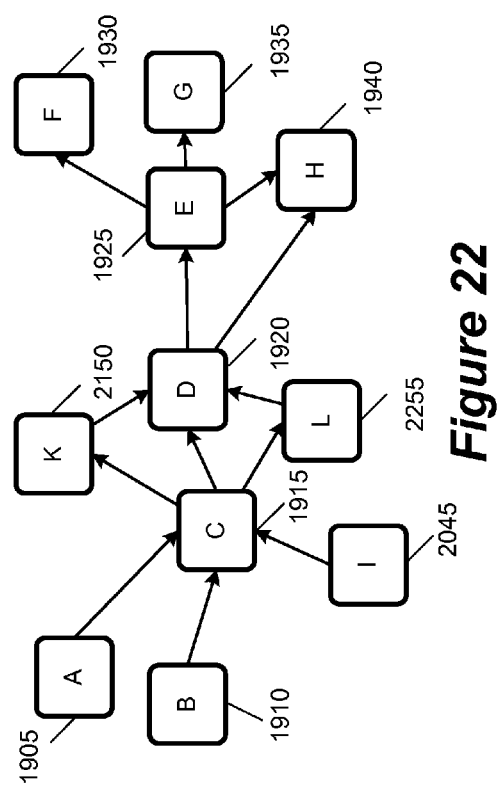

FIG. 22 shows a portion of an IC design which has one more cell (i.e., the intermediate cell L 2255) than the portion of the IC design in FIG. 21. As shown, the number of connections has increased to 13 but the number of paths between the source cells and the destination cells has grown to 36. The paths in FIG. 21 are ACDEF, ACDEG, ACDEH, ACDH, BCDEF, BCDEG, BCDEH, BCDH, ICDEF, ICDEG, ICDEH, ICDH, ACKDEF, ACKDEG, ACKDEH, ACKDH, BCKDEF, BCKDEG, BCKDEH, BCKDH, ICKDEF, ICKDEG, ICKDEH, ICKDH, ACLDEF, ACLDEG, ACLDEH, ACLDH, BCLDEF, BCLDEG, BCLDEH, BCLDH, ICLDEF, ICLDEG, ICLDEH, and ICLDH. The connections are AC, BC, CD, DE, DH, EF, EG, EH, IC, CK, KD, CL, and LD.

As can be seen from the examples of FIGS. 19-22, there are fewer connections than paths. In addition, each connection only involves the signal delay between the two adjacent cells, delays through the destination cell, and the arrival time of the source cell and the required time of the destination cell. However, the paths can include many intermediate cells and for each intermediate cells the arrival time and the required time of the cell has to be included in the constraint formulation. Therefore, using the connections timings in the constraints is much less complicated than using the paths timings.

Figure 23:
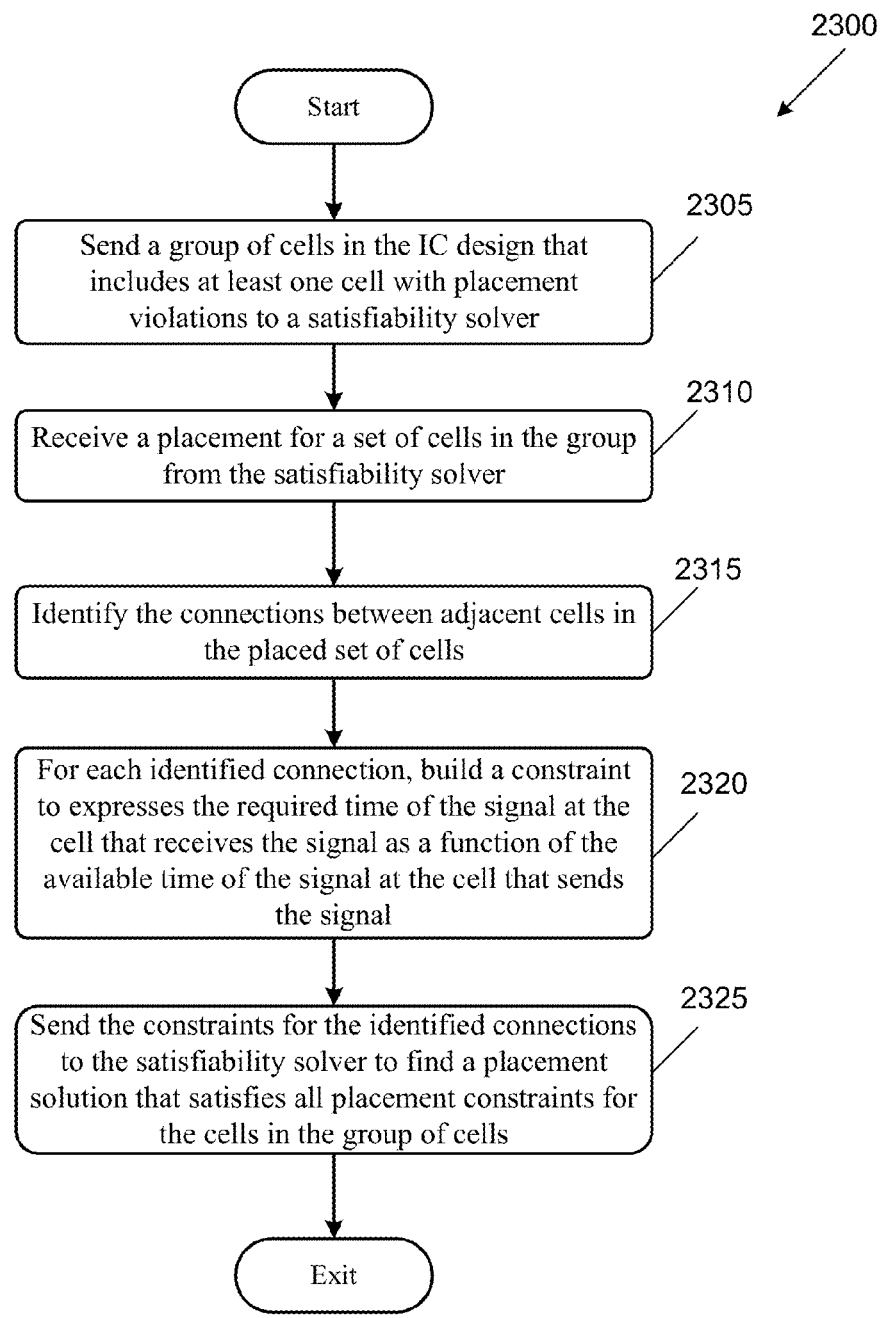
FIG. 23 conceptually illustrates a process for using a satisfiability solver to do placement in some embodiments of the invention.

FIG. 23 conceptually illustrates a process 2300 for using a SAT solver and constraints for connections between the cells of an IC design to perform placement in some embodiments of the invention. As shown, process 2300 sends (at 2305) a group of cells in the IC design that includes at least one cell with placement violations to a SAT solver. The process then receives (at 2310) a placement for a set of cells in the group from the SAT solver. The process then identifies (at 2315) the connections between adjacent cells in the placed set of cells. Each connection is identified as a signal path between two adjacent cells in the placement where there are no other intervening cells between the cells in each connection.

Figure 24:
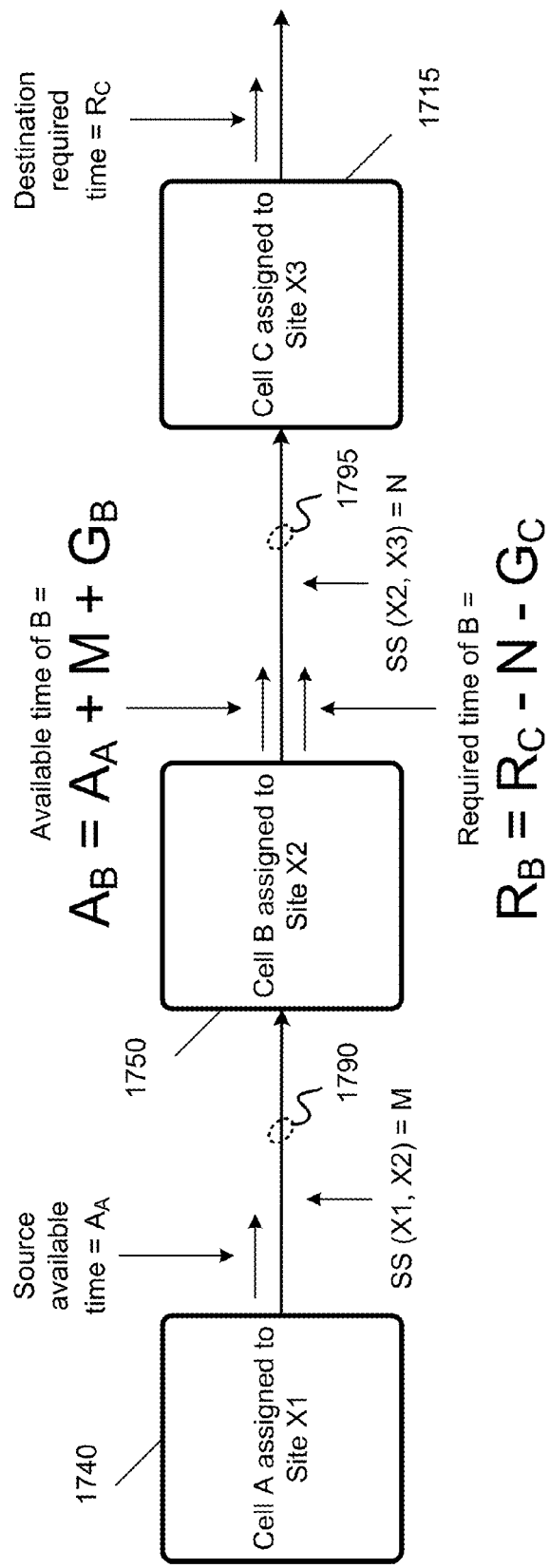
FIG. 24 conceptually illustrates the variables that are needed for an intermediate cell (i.e., a cell that is not a source or destination cell where the available and required timings of the cell are not known) in some embodiments of the invention.

Next, for each identified connection, the process constructs (at 2320) a constraint to expresses the required time of the signal at the cell that receives the signal as a function of the available time of the signal at the cell that sends the signal. FIG. 24 conceptually illustrates the variables that are needed for an intermediate cell (i.e., a cell that is not a source or destination cell where the available and required timings of the cell are not known) in some embodiments of the invention. The cells and placement sites are similar to the cells and sites shown in FIG. 17. Two constraint expressions are needed for FIG. 24: (i) the connection between cell A placed at site X1 1740 and cell B placed at site X2 1750 and (ii) the connection between cell B placed at site X2 1750 and cell C placed at site X3 1715. The signal available time at the output of cell B is formulated by the following expression (D):

$$A_B = A_A + M + G_B \quad (D)$$

where $A_B$ is the arrival time of the signal at the output of cell B, $A_A$ is the available time of the signal at the output of the source cell A, M is the signal transmission delay between cells A and B including delay due to wire length and delay for the signal to go through routing elements, and $G_B$ is the delay for the signal to go through cell B.

The signal required time at the output of cell C is formulated by the following expression (E):

$$R_B = R_C - N - G_C \quad (E)$$

where $R_C$ is the required time of the signal at the output of the destination cell C, $R_B$ is the required time of the signal at the output of cell B, N is the signal transmission delay between cells B and C including delay due to wire length and delay for the signal to go through routing elements, and $G_C$ is the delay for the signal to go through the destination cell C.

Figure 25:
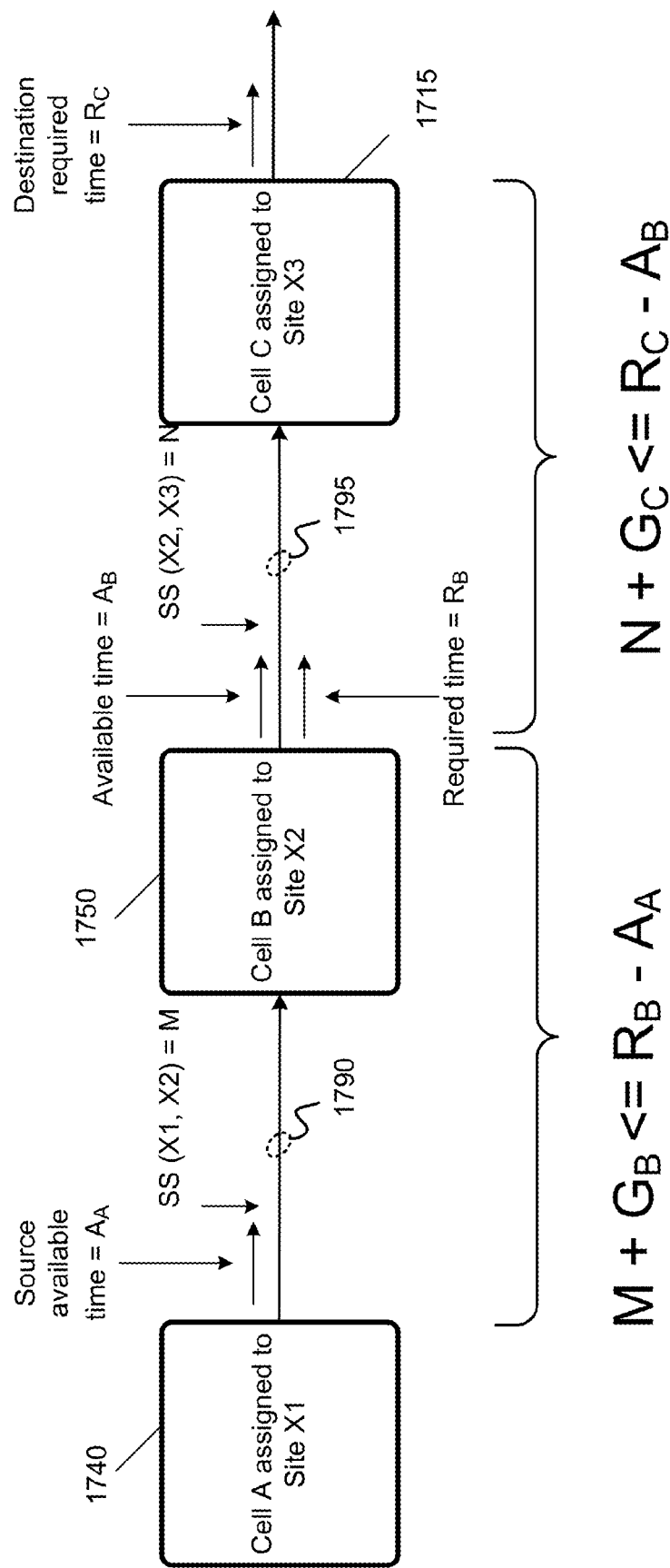
FIG. 25 conceptually illustrates the constraints required in a placement for a portion of an IC design that includes three cells A, B, and C in some embodiments of the invention.

FIG. 25 conceptually illustrates the constraints required in a placement for a portion of an IC design that includes three cells A, B, and C in some embodiments of the invention. The constraints for the connection between cells A and B and the connection between cells B and C are respectively formulated by the following expressions (F) and (G) by inserting the expressions for the arrival and required times of cell B from expressions (D) and (E) into an expression similar to expression (A):

$$M + G_B <= R_B - A_A \quad (F)$$

$$N + G_C <= R_C - A_B \quad (G)$$

where $R_C$ is the required time of the signal at the output of the destination cell C, $R_B$ is the required time of the signal at the output of the intermediate cell B, M is the signal transmission delay between cells A and B including delay due to wire length and delay for the signal to go through routing elements, N is the signal transmission delay between cells B and C including delay due to wire length and delay for the signal to go through routing elements, $G_B$ is the delay for the signal to go through the destination cell B, and $G_C$ is the delay for the signal to go through the destination cell C.

When there are more than one intermediate cells between a source cell and a destination cells, one more equation similar to equations (F) and (G) is added for each connection between two intermediate cells. In general, the constraints are written based on the arrival time and required times of the end points of each placed connection.

Referring back to FIG. 23, process 2300 sends (at 2325) the constraints (e.g., expressions similar to expressions (F) and (G), above) for the identified connections to the SAT solver to find a placement solution that satisfies all placement constraints for the cells in the group of cells. The process then exits.

C. Dynamic Constraints Clause Generation

In some embodiments, DPL-R determines each pair of a source cell and a destination cell (a "fromto") that do not satisfy their placement constraints. The term failed fromto or simply failed connection in this specification refers to a pair of source and destination cells that at their current assigned sites have failed timing and/or placement legalization (e.g., overlap) issues. DPL-R then selects one such failed pair. Instead of attempting to solve the individual failed fromto or all failed fromto's at once, DPL-R in some embodiments selects a group of other cells and attempts to solve all failed constraints within the selected group together.

Figure 26:
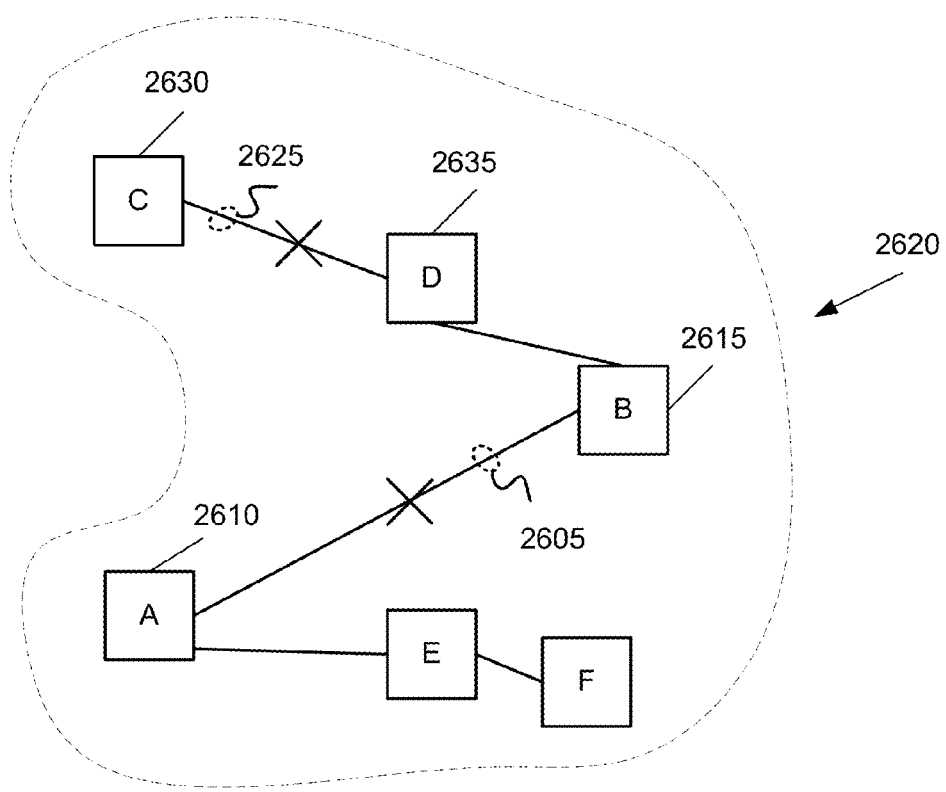
FIG. 26 conceptually illustrates an example of a failed fromto and a group of other cells selected to resolve the placement violations of all cells in the selected group in some embodiments of the invention.

FIG. 26 conceptually illustrates an example of a failed fromto and a group of other cells selected to resolve the legalization issues of all cells in the selected group in some embodiments. In this example, a fromto between a source cell A 2610 and a destination cell B 2615 does not meet placement constraints (e.g., the path 2605 between the two cells does not meet the timing and/or the cell placements overlap).

When DPL-R selects this fromto to resolve the failed constraints, the DPL-R also selects several other cells and connections and groups them with the failed fromto in order to resolve all placement violations of the group of cells and connections together. The group of cells and connections are conceptually shown as a window (or region) 2620 in FIG. 26. As shown, the window includes one more failed fromto (i.e., the connection 2625 between cell C 2630 and cell D 2635 does not meet timing requirements). In an IC with sub-cycle reconfigurable circuits, the conceptual window or region that is defined around the failed connection spans both space and time. For instance, in the example of FIG. 26, both cells 2630 and 2615 might occupy the same physical site (e.g., a reconfigurable logic circuit) in two different sub-cycles. The window 2620 for placement of an IC with sub-cycle reconfigurable circuits, therefore, might include cells that are separated from each other both in space and in time (i.e., in a time-space window). For ICs without sub-cycle reconfigurable circuits, the window spans only in space.

Figure 27:
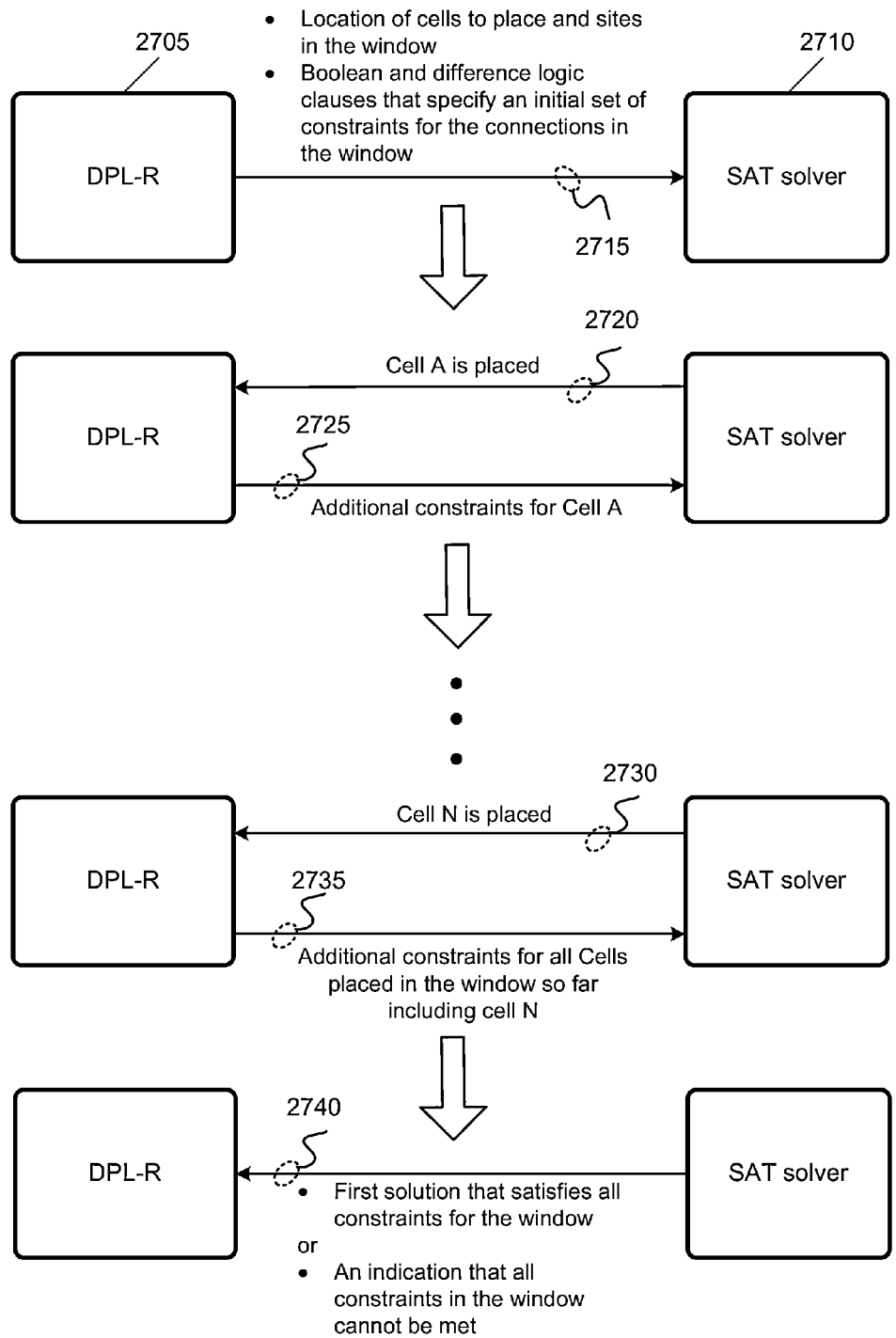
FIG. 27 conceptually illustrates the interactions of the DPL-R and the SAT solver in some embodiments of the invention.

After setting a window or region around the failed fromto, DPL-R in some embodiments constructs a set of initial constraints and sends them to the SAT solver along with the information about the selected cells and sites in the window. The SAT solver interacts with DPL-R by resolving each failed fromto in the window and interactively getting more constraints from DPL-R. FIG. 27 conceptually illustrates the interactions of the DPL-R and the SAT solver in some embodiments. As shown, DPL-R 2705 sends (at 2715) the location of cells to place and the available sites in the window to the SAT solver. DPL-R also sends (at 2715) a set of initial constraints to the SAT solver. The DPL-R uses constraints that are in the form of Boolean clauses and/or difference logic clauses. As described above, different logic constraint clauses are mathematical constraints that include numbers as well as mathematical operators and inequalities.

Once the SAT solver receives the information about the cells, connections, and sites inside the identified window, the SAT solver pulls up all the connections with timing issues inside the window and attempts to solve the timing issues by changing the placement of the cells. As shown in FIG. 27, for each cell placed at a different site, the SAT solver informs (at 2720 and 2730) the DPL-R of the move. For each move, the DPL-R in some embodiments constructs a new set of constraints and sends the new constraints (at 2725 and 2735) to the SAT solver. In some other embodiments, the SAT places more than one cell before informing the DPL-R of the new moves. This process continues until the SAT solver either finds a solution that satisfies all constraints inside the window and sends (at 2740) the solution to the DPL-R or sends an indication to DPL-R that all constraints inside the window cannot be met.

Figure 28:
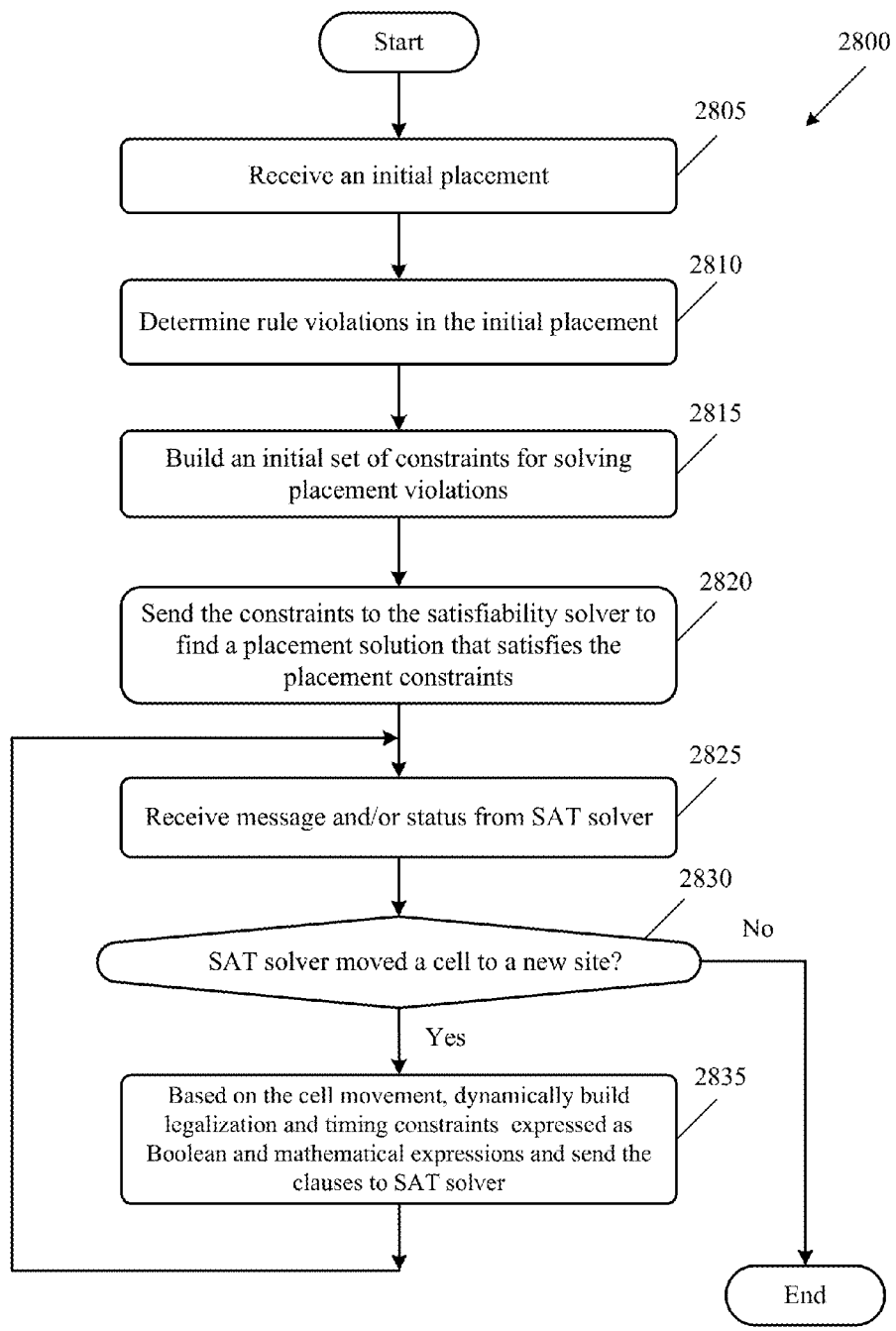
FIG. 28 conceptually illustrates a process for dynamically generating constraints by a placer in some embodiments of the invention.

FIG. 28 conceptually illustrates a process 2800 for dynamically generating constraints by a placer in some embodiments. As shown, the process receives (at 2805) an initial placement. In some embodiments, the initial placement is the output of the global placement. In other embodiments, the initial placement is done by other techniques (e.g., random initial placement or placement based on a heuristic). The process then determines (at 2810) the placement violations of the initial placement. As described further below, the placement violations include legalization violations and timing violations.

The process then builds (at 2815) an initial set of constraints for solving placement violations. The process then sends (at 2820) the constraints along with a set of failed fromto's to the SAT solver to find a placement solution that satisfies the placement constraints. As described above, the set of failed fromto's sent to the SAT solver at each time can be a subset of all failed fromto's.

The process then receives (at 2825) a message and/or status from the SAT solver. The process then determines (at 2830) whether the SAT solver has moved a cell to a new site. If the SAT solver has not moved a cell (e.g., when the SAT solver has successfully resolved all placement violations or the SAT solver indicates that the constraints cannot be met), the process exits. Otherwise, the process dynamically builds (at 2835) a new set of constraints based on the cell movement and sends them to the SAT solver. In some embodiments, process 2800 receives an indication from the SAT solver (at 2825) after each individual cell is moved. In other embodiments, the process receives an indication after more than one cell is moved. The process then proceeds to 2825 and waits for the next message from the SAT solver.

D. Pruning of the Search Space and the Timing Constraints

Figure 29:
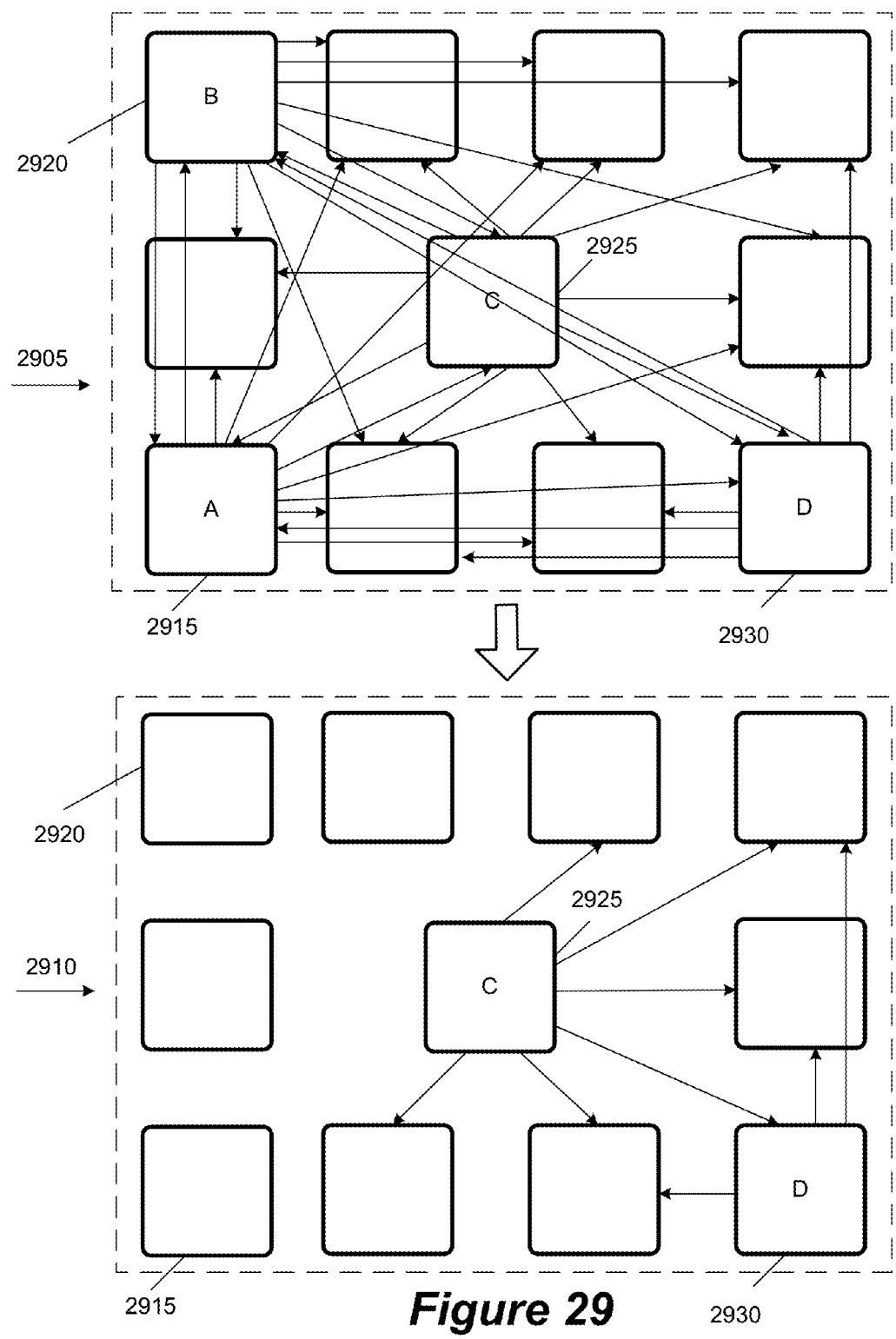
FIG. 29 conceptually illustrates the advantage of dynamic clause generation in some embodiments of the invention.

Several techniques are utilized in some embodiments of the invention to reduce the number of sites that are examined and the number of timing constraints that are used during placement. Dynamic generation of constraints requires the DPL-R to generate constraints only when the SAT solver enters a part of the solution where the constraint is meaningful. For instance, a clause like don't place C and D in the same site, $\neg(C \wedge D)$, is only important when the placer tries to actually place C and D. FIG. 29 conceptually illustrates the advantage of dynamic clause generation in reducing the search space during placement. The figure conceptually illustrates a window selected for placement of four cells A, B, C, D and a portion of the IC that includes eleven possible sites for placing the cells. The possible sites are either locations on an IC fabric where a cell can be placed, logic circuits on a programmable IC, or spacetime locations (i.e., physical sites on the IC that are either separated from each other in space and/or in time) on an IC with sub-cycle reconfigurable circuits. Cells A-D are currently placed in sites 2915-2930 respectively. The example of FIG. 29 assumes that the SAT solver had previously placed cell C in site 2925, has just placed cell D, and has not started solving cells A and B violations yet.

The figure shows two possible scenarios (2905 and 2910) for providing constraints to the SAT solver by DPL-R. In the first scenario 2905, constraints for all four cells have been provided to the SAT solver at once. In this scenario, the SAT solver has to consider many possible moves (as shown by the arrows) to move the four cells A-D to different sites even though the SAT solver is not trying to resolve the issues for cells A and B at this time.

In the second scenario, 2910, the SAT solver is provided with constraints for cells C and D after cell D is placed. As shown, the SAT solver does not have to consider any possible moves for A and B at this time and therefore does not have to consider any constraints for these cells. In addition, in some embodiments, the SAT solver also minimizes the number of moves to consider by moving either cell C or cell D to a nearby site (e.g., one or two sites in each directions or one or two sites in a particular direction) in order to expedite finding a solution. For instance, if the connection between cell C in site 2925 and cell D in site 2930 violates a timing constraint, the SAT solver in some embodiments does not consider to move cell C to site 2920 which makes the connection even longer and instead only considers to move cell C to one of the sites closer to site 2930 in order to reduce the wire length and reduce signal transmission delays. Accordingly, dynamic clause generation used in the second scenario 2910 in many instances reduces the number of constraints and therefore reduces the computation burdens of the SAT solver by a large magnitude.

As shown in the above example, some embodiments utilize look ahead and provide the ability to estimate the best placement options before the SAT solver has chosen the next placement move. These embodiments look at the partial results of the placement performed by the SAT solver at each time and prune the search space. For instance, when the best case for the connection between cell C placed at site 2925 and cell D placed at site 2930 is 100 picoseconds and fails a timing constraint, site 2920 which is farther to site 2930 than site 2925 is not considered for moving cell C in order to correct the failed timing constraint. Since placement of cell C at site 2920 together with cell D at site 2930 will not be considered by the SAT solver, DPL-R prunes the corresponding timing constraint for this particular placement from the set of constraints that has to be considered by the SAT solver.

Figure 30:
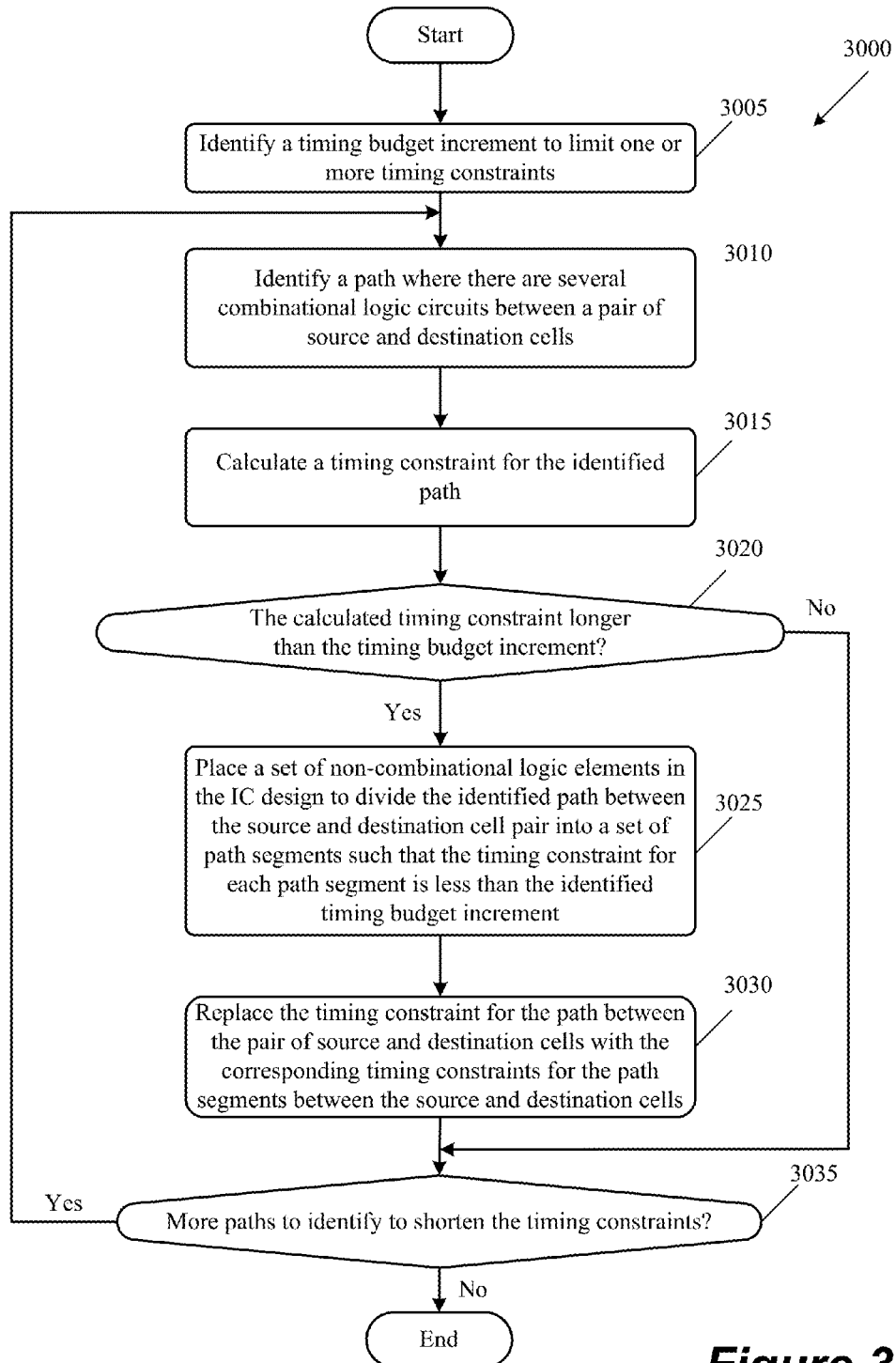
FIG. 30 conceptually illustrates a process for pruning timing constraints in some embodiments of the invention.

Some embodiments utilize a fine grained timing budget in order to prune deep timing patterns into relatively shallow timing patterns. Instead of having constraints that require examining long chains of connections over a long span of time, some embodiments provide tighter constraints that overrule the constraints for the signals that have to propagate around. FIG. 30 conceptually illustrates a process 3000 for pruning timing constraints in some embodiments of the invention. As shown, the process identifies (at 3005) a timing budget increment to limit one or more timing constraints. Next, the process identifies (at 3010) a path where there are several combinational logic circuits between a pair of source and destination cells in the IC design.

The process then calculates (at 3015) the timing constraint for the identified path. The process then determines (at 3020) whether the calculated timing constraint is longer than the timing budget increment. If not, the process proceeds to 3035 which is described below. Otherwise, the process places (at 3025) a set of non-combinational logic elements in the IC design to divide the identified path between the source and destination cell pair into a set of path segments such that the timing constraint for each path segment is less than the identified timing budget increment. The process then replaces (at 3030) the timing constraint for the path between the pair of source and destination cells with the corresponding timing constraints for the path segments between the source and destination cells. The process then determines (at 3035) whether there are more paths to identify for shortening their timing constraints. If so, the process proceeds to 3010 which was described above. Otherwise, the process exits.

As an example, some embodiments utilize ICs with subcycle reconfigurable circuits. In these embodiments, a user design cycle is divided into sub-cycles where the reconfigurable circuits receive configuration data sets that are used to reconfigure the circuits when necessary. Since timing constraints for the circuits that are reconfigured have to be satisfied at sub-cycle boundaries, the relatively short time span of the sub-cycles overrules the longer timing paths that might exist in the user design.

Detailed examples of these timing constraints are provided further below using the example of ICs with reconfigurable circuits. However, the use of fine grain timing budgets is not limited to IC with reconfigurable circuits. Other embodiments identify and utilize short duration timing constraints to overrule longer duration timing constraints in order to limit the number of constraints that the SAT solver has to satisfy. For instance some embodiments identify registers or other elements that do not have combinational delays where the timing constraints have to be satisfied before a signal crosses the element. Some embodiments identify near deadlines that overrule the farther deadlines that the SAT solver does not have to satisfy As described further below, some embodiments identify symmetries in the IC design. For instance, in an IC with configurable circuits, many permutations for pin placement map to the same pin site. Some embodiments use only one variable to represent placement constraints for all permutations that map the same pin to a same pin site.

III. DIFFERENT STAGES OF THE DETAILED PLACEMENT AND REPAIR

Figure 31:
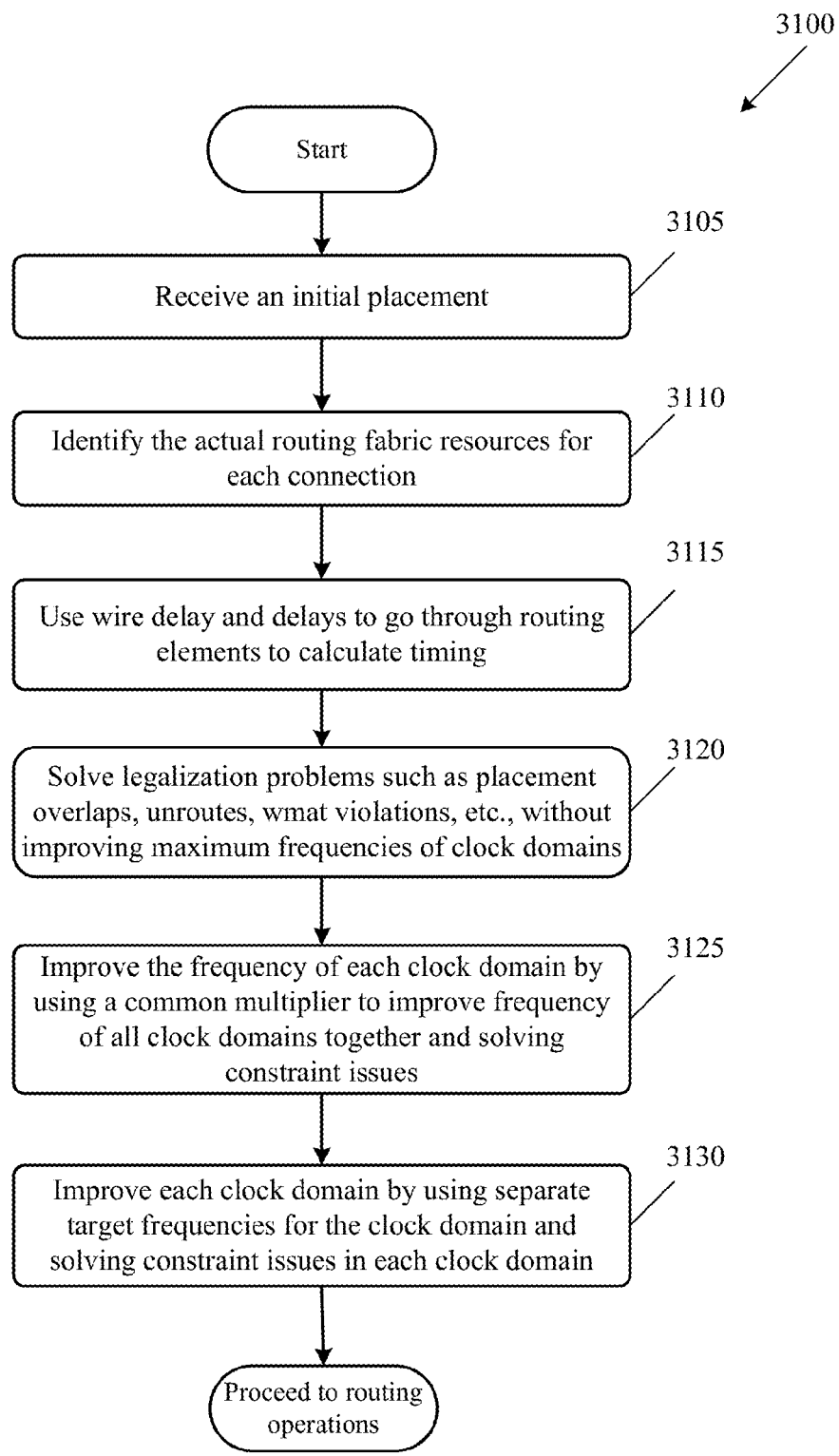
FIG. 31 conceptually illustrates a process for performing detailed placement and repair (DPL-R) in some embodiments of the invention.

Detailed placement in some embodiments is performed in several stages. FIG. 31 conceptually illustrates a process 3100 for performing detailed placement and repair (DPL-R) in some embodiments. Process 3100 shows the high level operations performed. More detailed processes performed by DPL-R are described further below. As shown in FIG. 31, process 3100 receives (at 3105) an initial placement such as the results of global placement.

Next, the process identifies (at 3110) the actual routing fabric resources for each connection. The process in some embodiments uses a table lookup to identify actual routing fabric resources for each connection. In an IC with sub-cycle reconfigurable circuits, the routing fabric resources include routing resources that hold a signal for one or more sub-cycles when the source and destination cells are in different sub-cycles. The process then uses (at 3115) wire delays and delays to go through routing resources (as described above by reference to FIG. 10) to calculate timing for signals to travel between each pair of source and destination cells.

The process then solves (at 3120) legalization problems such as placement overlaps, unroutes, local congestion, etc. without attempting to improve maximum frequencies of each clock domain. In some embodiments, the IC design has several clock domains. In this specification, the clock frequency that a user design specifies for a clock domain is referred to the timing goal or the desired frequency for the clock domain. The term target frequency is referred to a frequency set for a clock domain during a particular stage or particular iteration of the placement. The term achieved frequency is referred to the actual frequency achieved during a particular stage or particular iteration of the placement.

Figure 32:
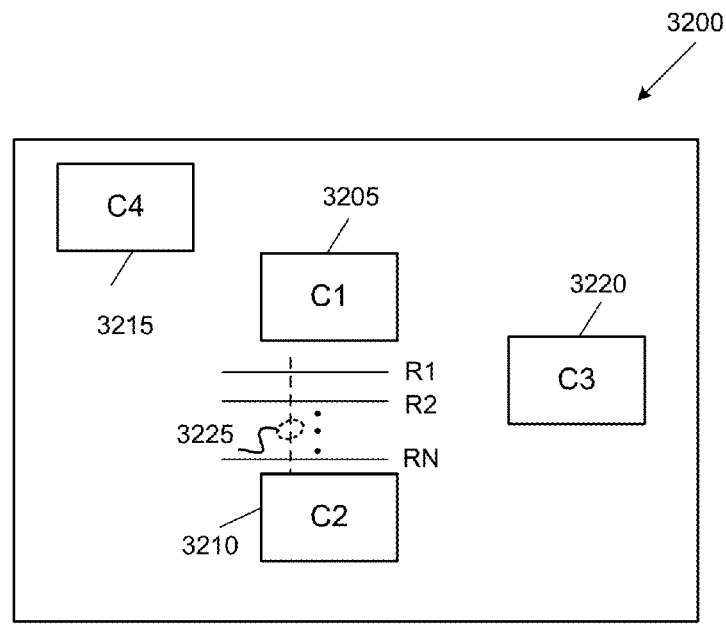
FIG. 32 conceptually illustrates a local congestion violation in an IC in some embodiments of the invention.

The local congestion violations occur when more than a pre-determined number of wires are used in a particular region or a particular cross section of an IC. FIG. 32 conceptually illustrates an example of a local congestion violation in an IC in some embodiments of the invention. The potion 3200 of the IC includes several components 3205-3220. In this example, the maximum number of wires that can pass between object 3205 (e.g., a logic circuit C1) and object 3210 (e.g., another logic circuit C2) is set to be "M". The number of wires that are actually placed in the area between the two objects 3205 and 3210 is measured by the number of wires, N, that cross the line 3225. When N is larger than M, there is a local congestion violation for the number of wireless passed between the two objects.

Figure 33:
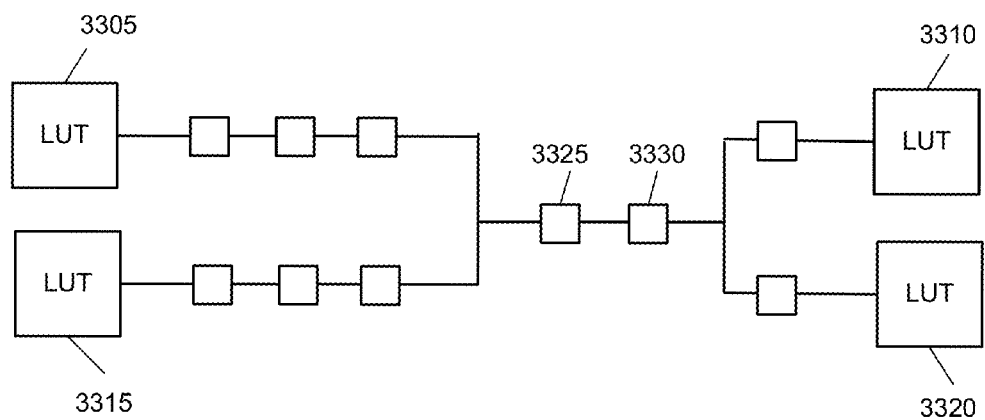
FIG. 33 conceptually illustrates a local congestion violation in an IC with configurable circuits in some embodiments of the invention.

The local congestion violations also occur (e.g., in an IC with configurable circuits) when the same routing resource is used for passing two signals at the same time. FIG. 33 conceptually illustrates a local congestion violation in some embodiments. As shown, a signal from LUT 3305 to LUT 3310 and another signal from LUT 3315 to LUT 3320 use the same two routing resources 3325 and 3330. The placer, therefore, has to move one or more of the source and destination cells 3305-3320 in order to correct the violation.

A hard pin placement violation occurs when overlapping pin placements cause a set of routing resources near a destination cell that must be used to get to the destination cell to become unavailable. The use of these routing resources is mandatory and no detour is possible. The placer has to move one or more cells around to solve the violation. A non-hard (or soft) pin placement violation occurs when detours are available but have poor timing characteristics. The placer avoids non-hard pin placement violations in order to achieve good timing. Unroutes occur when a path cannot be provided from the source to destination cell at their current placed sites. For instance, in the embodiments that utilize the lookup table 740, unroutes occur when the lookup table 740 is not able to provide a path to get from a source to a destination cell at their currently placed sites. Again the solution is to move either the source or the sink cell to a different site.

Referring back to FIG. 31, process 3100 then improves the frequency of each clock domain by gradually increasing the target frequency for the clock domains towards the maximum desirable frequency. Process 3100 performs this timing optimization by first increasing (at 3125) the target frequency of each clock domain by a common multiplier so that all domains timing is improved in a synchronized fashion. The process then allows (at 3130) the target frequency of each clock domain to be increased independently.

Specifically, the process first increases (at 3125) the frequency of each clock domain by a common multiplier in order to allow the clock domains that are intended to have a fixed relative frequency ratio to improve in a balanced way that preserves this desired frequency ratio. Some embodiments include clock crossing cells to send data from one clock domain to another. The justification is that if two clock domains that are joined by clock crossing cells (to send data from one clock domain to another) are allowed to improve in an unbalanced way, then the connections close to the clock crossing cells will be difficult or impossible to optimize due to unbalanced timing violations on either side of the clock crossing cells. However, once the clock domains are optimized while maintaining clock frequency ratios, DPL-R should try (at 3130) to make as much improvement as possible in each individual clock domain. The process then provides its output (as shown in FIG. 7) to the router 765. In the embodiments that have only one clock domain, operations 3125 and 3130 are merged together. As shown in FIG. 31, the DPL-R includes several stages of solving (at 3120) placement legalization issues, improving (at 3125) the frequency of clock domains by using a common clock multiplier, and improving (at 3130) the frequency of different clock domains separately. Although process 3100 is shown to perform all three stages, 3120-3130, some embodiments only perform one or two of these stages and skip the other stages. Different operations of process 3100 are described in further detail in the subsections below.

A. Solving Placement Legalization Issues

Figure 34:
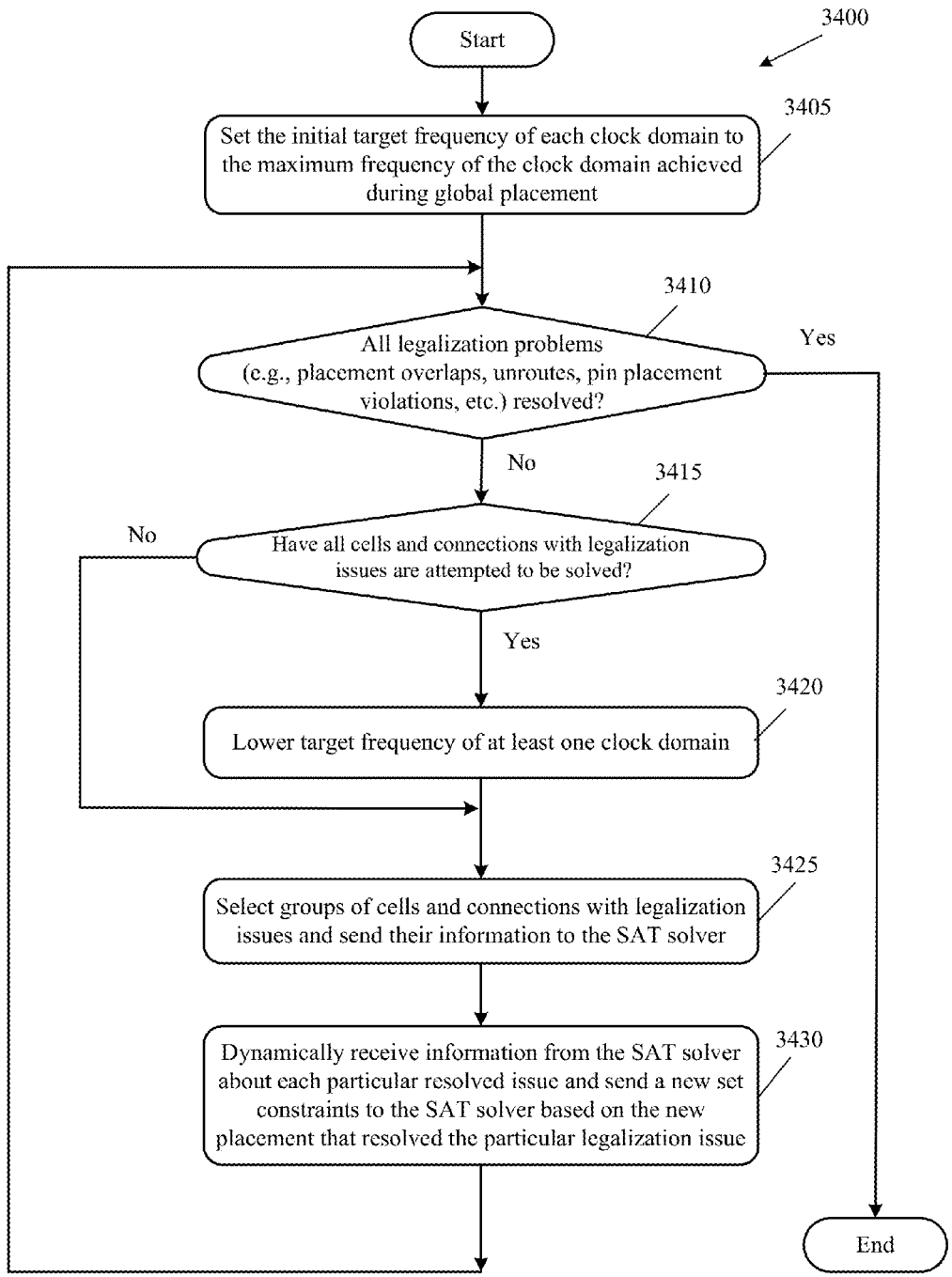
FIG. 34 conceptually illustrates a high-level process for solving legalization issues by the DPL-R in some embodiments of the invention.

After receiving the results of the global placement, the DPL-R in some embodiments attempts to solve legalization issues such as placement overlaps, unroutes, and pin placement violations. In this stage, DPL-R does not attempt to improve the timing quality of the placement. Instead, DPL-R gradually lowers target clock domain frequencies until all placement legalization problems are solved. FIG. 34 conceptually illustrates a process 3400 for solving legalization issues by a DPL-R in some embodiments. Process 3400 illustrates the high level concept of solving placement legalization issues in some embodiments. Details of solving the legalization issues are described by reference to FIGS. 35A and 35B below.

As shown in FIG. 34, the process sets (at 3405) the initial target frequency of each clock domain to the maximum frequency of the clock domain achieved during global placement. Then process then determines (3410) whether all legalization problems such as placement overlaps, unroutes, pin placement overlap, etc. are resolved. When the process determines that all legalization issues are resolved, the process exits and the next DPL-R stage for doing timing optimization starts.

Otherwise, the process determines (at 3415) whether all cells and connections with legalization issues have been attempted to be solved at the current target frequency for all clock domains. When there are still cells and connections with legalization issues that are not attempted, the process proceeds to 3425 which is described below. On the other hand, when all cells and connections with legalization issues have been attempted to be resolved and there are still legalization issues left to be solved, the process lowers (at 3420) the target frequency of at least one clock domain.

The process then selects (at 3425) a fromto with legalization issue along with a group of other cells and connections as described by reference to FIG. 26 above. The process then uses (at 3430) a SAT solver to resolve legalization issues in a selected group of cells and connections. The process dynamically receives information from the SAT solver about each particular resolved issue and sends a new set of constraints to the SAT solver based on the new placement that resolved the particular legalization issue. The process then proceeds to 3410 which was described above.

As described by reference to FIGS. 35A-38B below, DPL-R in some embodiments utilizes an iterative SAT solving technique. In these embodiments, when the SAT solver indicates that the constraints cannot be resolved for a given window, the SAT solver constraints are relaxed by turning off some of the constraints that the DPL-R determines to be too tight.

Relaxation is accomplished by artificially lowering the arrival times of out-of-window sources that drive cells inside the window, and artificially raising the required times of out-of-window sinks that are driven by cells inside the window. These are the boundary conditions for solving timing constraints inside the window. Relaxation is applied when a window is determined to be unsatisfiable (UNSAT) because one or more cells have had all of their candidate sites ruled out. For each cell in this set, all of arrival times at out-of-window sources that drive this cell are considered. All of the required times at out-of-window sinks that are driven by this cell are considered. These arrival and required times are relaxed by a number of picoseconds that is computed by analyzing the candidate site that failed timing by the smallest margin. The amount of relaxation is set equal to the amount of picoseconds by which the candidate site failed to meet timing. By adjusting the boundary conditions by exactly this much, that particular candidate site (and possibly other candidate sites) should now just meet the timing requirements. Now that the cell has at least one candidate site, the SAT solver can make further progress towards finding a satisfying solution. This is repeated for each cell that has had all of its candidate sites ruled out. This entire process is iterative. After relaxing one or more cells, the SAT solver may make additional progress towards a solution but still find that the problem is unsolvable due to additional cells that have no candidate sites. These cells were previously unnoticed because the SAT solver was able to show that the problem was unsolvable without having to rule out every placement option for this particular cell. Furthermore, after relaxation is applied to a particular cell, the newly unblocked candidate sites may still be ruled out due to combinations of other constraints, once again leaving the cell with no placement candidates. In this case the cell might require additional relaxation that is additive with respect to previous relaxations.

There is a fixed heuristic upper limit on the amount of relaxation a cell is allowed to accumulate. Relaxation is effectively borrowing time from cells that are outside the window in order to make the current window easier to solve. DPL-R operates under the assumption that a future window will visit the cells that are donating time and improve their placement so that this time debt is paid back. After a cell accumulates a certain amount of relaxation, DPL-R decides that it is unlikely that this borrowing can practically be paid back, and/or that additional relaxation will be unlikely to help find a satisfying solution. The window is declared UNSAT at this point, and DPL-R continues as normal by attempting a different window, temporarily setting the current violation aside and proceeding to work on other violations. Once some other nearby violations are repaired, it is likely that those repairs will have resulted in improving the boundary conditions for the current difficult violation. When revisiting the difficult violation, it is frequently the case that it can then be solved with a smaller amount of relaxation or perhaps without any amount of relaxation.

Constraints are relaxed by removing the old constraint and replacing it with a new constraint that describes a looser timing requirement. For example, the constraint $$R_B - A_A >= M + G_B$$

can be removed from the system and replaced with a new constraint $$R_B - A_A >= N + G_B$$

where N<M. The SAT solver is then incrementally restarted to continue the search for a satisfying solution under these relaxed constraints. The SAT solver retains knowledge of how the previous search resulted in an unsatisfiable result. This knowledge is used to avoid repeating steps in the search process that will still lead to an unsatisfiable result even under these relaxed constraints. This improves the overall efficiency of DPL-R.

Furthermore, DPL-R in some embodiments considers different window sizes and shapes (i.e., the number of cells and connections grouped together by the window) in order to leverage the trade-offs between windows size and the time SAT solver spends to solve the window failures. A small window requires moving a small number of cells only a small amount from their originals locations. However, in some instances, a larger window is necessary in order to find a satisfiable solution. In some embodiments, the candidate windows are ranked heuristically in order of the likelihood of solving the failed connections timing issues, potential benefit to the overall solution quality, and expected solver runtime. DPL-R maintains a list of attempted windows for each selected failed connection in order to prevent duplication of effort.

When constraints for a failed connection cannot be met after relaxing the constraints and considering different windows around the failed connection, DPL-R in some embodiments temporarily sets the failed connection aside and proceeds to fix other failed connections. DPL-R revisits the failed connection when the list of failed connections is updated. A failed connection might simply stop violating timing when cells in the connection's fanin or fanout are moved and additional slack is propagated to the failed connection. If the connection still fails placement constraints, the connection remains in the list of failed connections and DPL-R repeats the process of selecting the failed connection, selecting one or more windows around the failed connection, and sending them to the SAT solver during a later iteration (e.g., when the constraints become less tight).

Figure 35A:
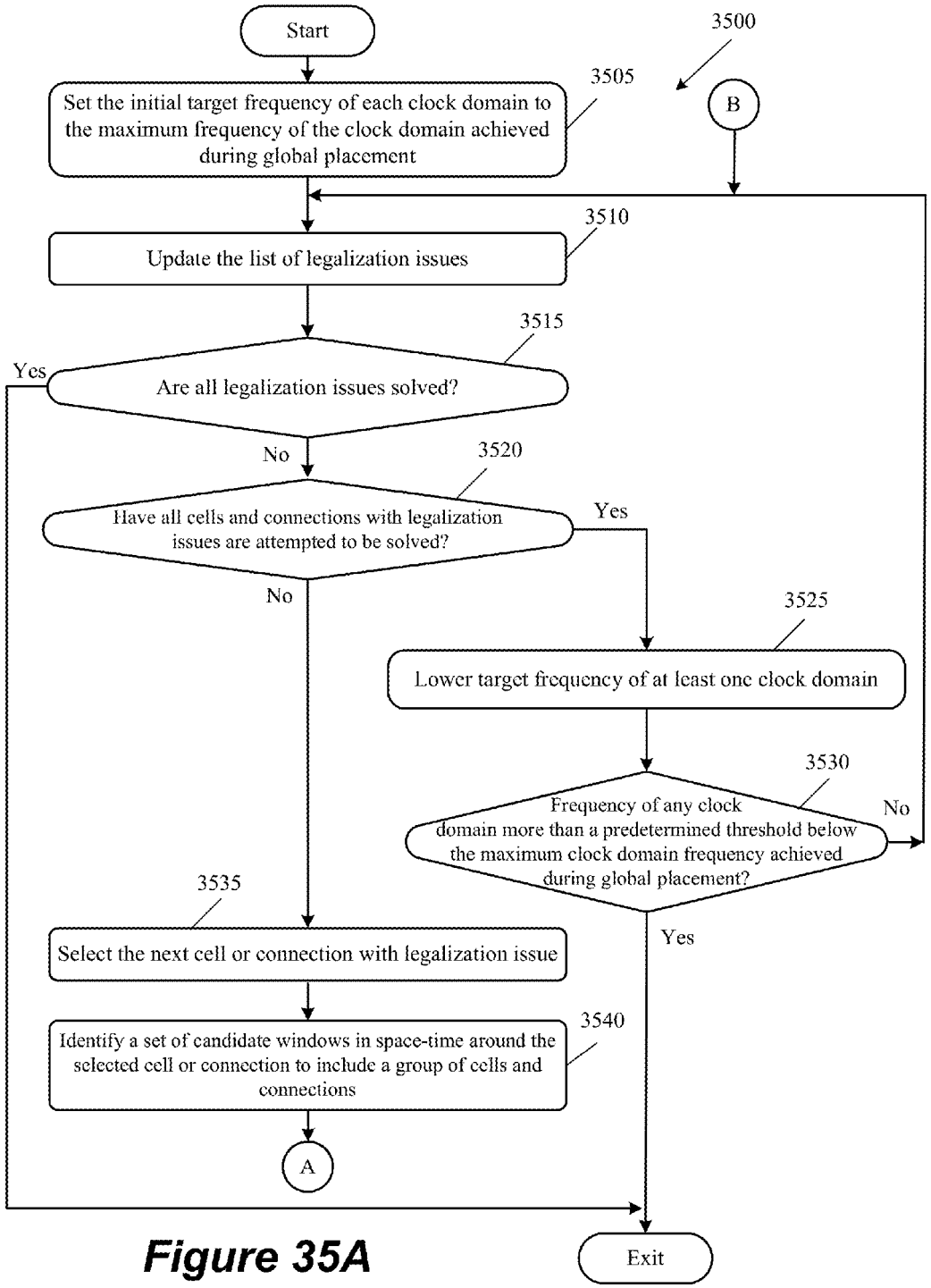
FIGS. 35A and 35B conceptually illustrate a detailed process for solving legalization issues by the DPL-R in some embodiments of the invention.
Figure 35B:
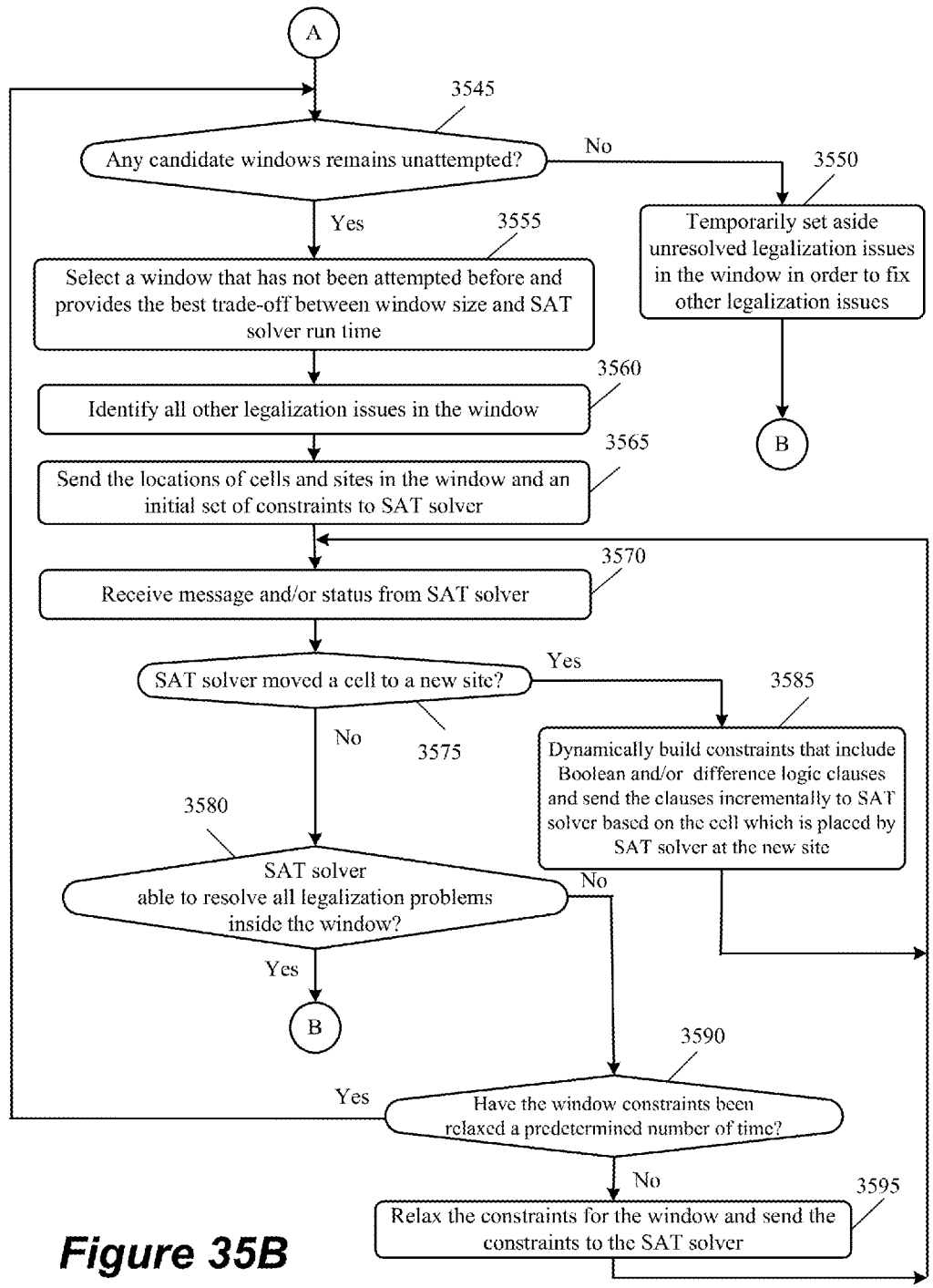

FIGS. 35A and 35B conceptually illustrate a detailed process 3500 for solving legalization problems in some embodiments. As shown, the process sets (at 3505) the initial target frequency of each clock domain to the maximum frequency of the clock domain achieved during global placement.

The process then updates (at 3510), or in the first iteration creates, creates the list of legalization issues. Next the process determines (at 3515) whether there are any legalization issues that have not been resolved. When all legalization issues are resolved, the process exits and DPL-R proceeds to the next stage. Otherwise, the process determines (at 3520) whether all cells and connections with legalization issues have been attempted to be solved at the current target frequency for all clock domains.

When there are still cells and connections with legalization issues that are not attempted, the process proceeds to 3535 which is described below. On the other hand, when all cells and connections with legalization issues have been attempted to be resolved and there are still legalization issues left to be solved, the process lowers (at 3525) the target frequency of at least one clock domain. The process then determines (at 3530) whether the frequency of any clock domain is now more than a predetermined threshold below the maximum clock domain frequency achieved during global placement. For instance the process in some embodiments stops when the frequencies of any clock domain have been lowered to below a percentage (e.g., 30%, 50%, 75%, etc.) of the initial target frequencies (which were set at 3505) and the process is still unable to resolve all of the placement legalization issues. In some embodiments, DPL-R proceeds to next stage, in other embodiments DPL-R stops indicating that the initial placement cannot be legalized. The process then exits.

The process selects (at 3535) the next fromto with legalization issue. The process then identifies (at 3540) a set of candidate windows around the selected fromto and a group of other fromto. As described by reference to FIG. 26 above, the candidate windows for an IC with sub-cycle reconfigurable circuits can span across both time and space. For an IC without sub-cycle reconfigurable circuits, the windows only span across space. Instead of resolving the legalization issues of an individual fromto or attempting to resolve the legalization issues of all fromtos at the same time, process 3500 selects a group of fromtos (e.g., in the vicinity of a selected fromto with legalization issues) and attempts to resolve all legalization issues inside the window. Each candidate window includes the selected failed fromto and at least one fromto that is different than any other candidate window. Process 3500 considers different window sizes and shapes (i.e., the number of cells and connections grouped together by the window) in order to leverage the trade-offs between windows size and the time SAT solver spends to solve the window failures. A small window requires moving a small number of cells only a small amount from their originals locations. However, in some instances, a larger window is necessary in order to find a satisfiable solution.

Process 3500 then determines (at 3545) whether any candidate windows in the set of candidate windows remains unattempted. When all candidate windows have been attempted and all legalization issues inside a window are not resolved, the process temporarily sets aside (at 3550) the unresolved legalization issues inside the window in order to fix other legalization issues. The process then proceeds to 3510 which was described above. Otherwise, the process selects (at 3555) another window that has been identified around the current cell or connection with legalization issues. In some embodiments, the process selects a window that provides the best trade-off between window size and SAT solver required run time among the unattempted windows.

The process then identifies (at 3560) all other legalization issues inside the selected window. Next, the process sends (at 3565) the information of cells and connections to be placed and sites and routing resources available inside the window to the SAT solver. The process also sends an initial set of connections to the SAT solver. The process then interacts with the SAT solver and receives (at 3570) messages and/or status indications from the SAT solver. The process determines (at 3575) whether the SAT solver has moved a cell to a new site. In some embodiments, the SAT solver informs process 3500 of such a move by returning a status code or sending a message to process 3500.

When the message and/or status received from the SAT solver indicates that the SAT solver has moved a cell to a new site, process 3500 dynamically builds (at 3585) a new set of constraints that include Boolean clauses and/or difference logic clauses and sends them to the SAT solver. The process then proceeds back to 3570 and awaits the next action from the SAT solver. In some embodiments, process 3500 incrementally builds the new set of constraints based on the cell which is placed by the SAT solver at the new site.

When the message and/or status received from the SAT solver indicates that the SAT solver was able to resolve all legalization issues inside the current window, process 3500 proceeds to 3510 which was described above. Otherwise, when the SAT solver indicates that it was unable to solve all legalization issues inside the window, process 3500 determines (at 3590) whether the window constraints have been relaxed a predetermined number of times. When the window constraints have already been relaxed the pre-determined number of times, the process proceeds to 3545 to attempt another window to resolve the legalization issues of the currently selected fromto that has issues. Otherwise, the process relaxes (at 3595) the constraints for the current window, sends the relaxed constraints to the SAT solver and proceeds to 3570 which was described above.

B. Timing Optimization with Locked-Multiplier

The next stage after solving the placement legalization issues is to optimize timing in order to achieve the timing goals (i.e., the desired frequencies) set by the user for each clock domain. This stage starts at the achievable frequencies of the legalized placement and gradually increases the targets frequencies in multiple iterations. DPL-R in this stage performs timing optimization by increasing clock domain frequencies in a synchronized fashion.

Figure 36:
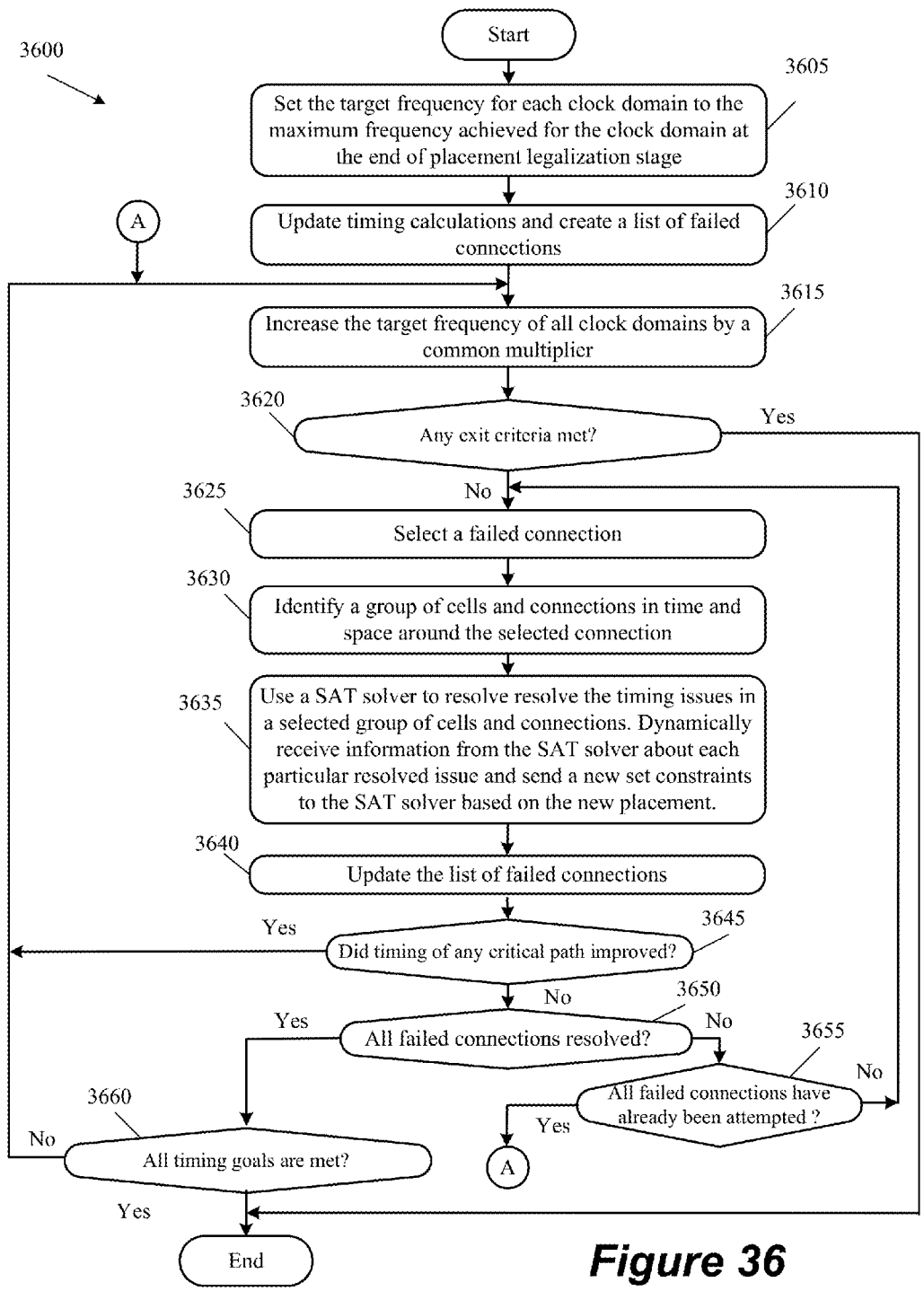
FIG. 36 conceptually illustrates a high-level process in some embodiments of the invention that performs timing optimization by increasing the clock domain frequencies using a common multiplier.

FIG. 36 conceptually illustrates a process 3600 in some embodiments that performs timing optimization by increasing the clock domain frequencies using a common multiplier. Process 3600 illustrates the high level concept of timing optimization with locked-multiplier in some embodiments. Details of such optimization are described by reference to FIGS. 37A and 37B below.

As shown in FIG. 36, process 3600 sets (at 3605) the target frequency for each clock domain to the maximum frequency achieved for the clock domain at the end of placement legalization stage. The process then uses the output 725 (shown in FIG. 7) of the global placer to update (at 3610) the signal timings based on the real routing fabric (as described by reference to FIG. 10 above). The process creates (at 3610) a list of the connections that fail timing requirements.

The process then increases (at 3615) the target frequency of all clock domains by a common multiplier. The process then determines (at 3620) whether any exit criteria are met. Details of the exit criteria are described by reference to FIGS. 37A and 37B further below. When any exit criteria is met, the process exits and DPL-R proceeds to the next optimization stage. Otherwise, the process selects (at 3625) a fromto with failed timing in order to correct the timing failure.

Next, the process identifies (at 3630) a group of cells and connections in time and space around the selected connection and attempts to correct all timing failures within the group. Similar to what was described by reference to FIG. 26 above, DPL-R in this stage identifies a conceptual window or region around the selected connection. The process then uses a SAT solver to resolve timing issues in a selected group of cells and connections. The process dynamically receives (at 3635) information from the SAT solver when a cell is placed at a new site and sends a new set constraints to the SAT solver based on the new placement.

DPL-R encodes the placement window as a constraint satisfaction problem and utilizes a satisfiability solver to solve the constraint satisfaction problem, decode the results, and apply the corresponding placement changes to the netlist. The solver tells the control algorithm whether the window was satisfiable or unsatisfiable, and measures the quantitative difference in overall placement quality. DPL-R then uses this information to select the next window.

When the process receives indication from the SAT solver that either all timing constraints inside the selected group are met or the SAT solver cannot currently solve all the constraints, the process updates (at 3640) the list of the failed connections. The process then determines (at 3645) whether the timing for any critical path has been improved. As shown in FIG. 36, process 3600 conceptually performs two different loops: an outer loop and an inner loop. The outer loop (which includes operations 3615 and 3660) gradually increases the common multiplier to improve clock domain frequencies. The inner loop (which includes operations 3625 and 3655)

attempts to solve all timing violations at the current multiplier value. In some embodiments, process 3600 maintains the multiplier in the outer loop at a level slightly higher than the worst clock domain in the IC design. When at any point the worst clock domain is improved (based on the determination at 3645), process 3600 returns to the outer loop (at 3615) and the target multiplier is increased to keep the timing constraints sufficiently challenging and to make progress towards the desired frequency (i.e., the timing goals) set by the user for the IC design.

When process 3600 determines that no critical path is improved, the process determines (at 3650) whether timing issues of all failed fromtos are resolved. When all fromto timings are resolved, the process determines (at 3660) whether all timing goals set by the user design are met. If so, the process exits and DPL-R proceeds to the next stage. Otherwise, the process proceeds to 3615 to continue improving the clock domain frequencies. When the process determines (at 3650) that all failed fromtos are not resolved yet, the process determines (at 3655) whether all failed fromtos have already been attempted at the current clock domain frequencies. When there are still unattempted fromtos remained, the process proceeds to 3625 to select another connection. Otherwise, the process proceeds to 3615 which was described above.

As shown in FIG. 36, it is possible that the inner loop exhausts the failed connection list by attempting all failed connections without making an overall improvement to achieve the desired frequencies (as determined at 3645) and without finding solutions to every failed connection (as determined at 3655). As described by reference to FIGS. 37A and 37B, DPL-R in some embodiments uses the strategy of pressing forward a certain amount followed by backtracking to continue improving the achieved timing.

Figure 37A:
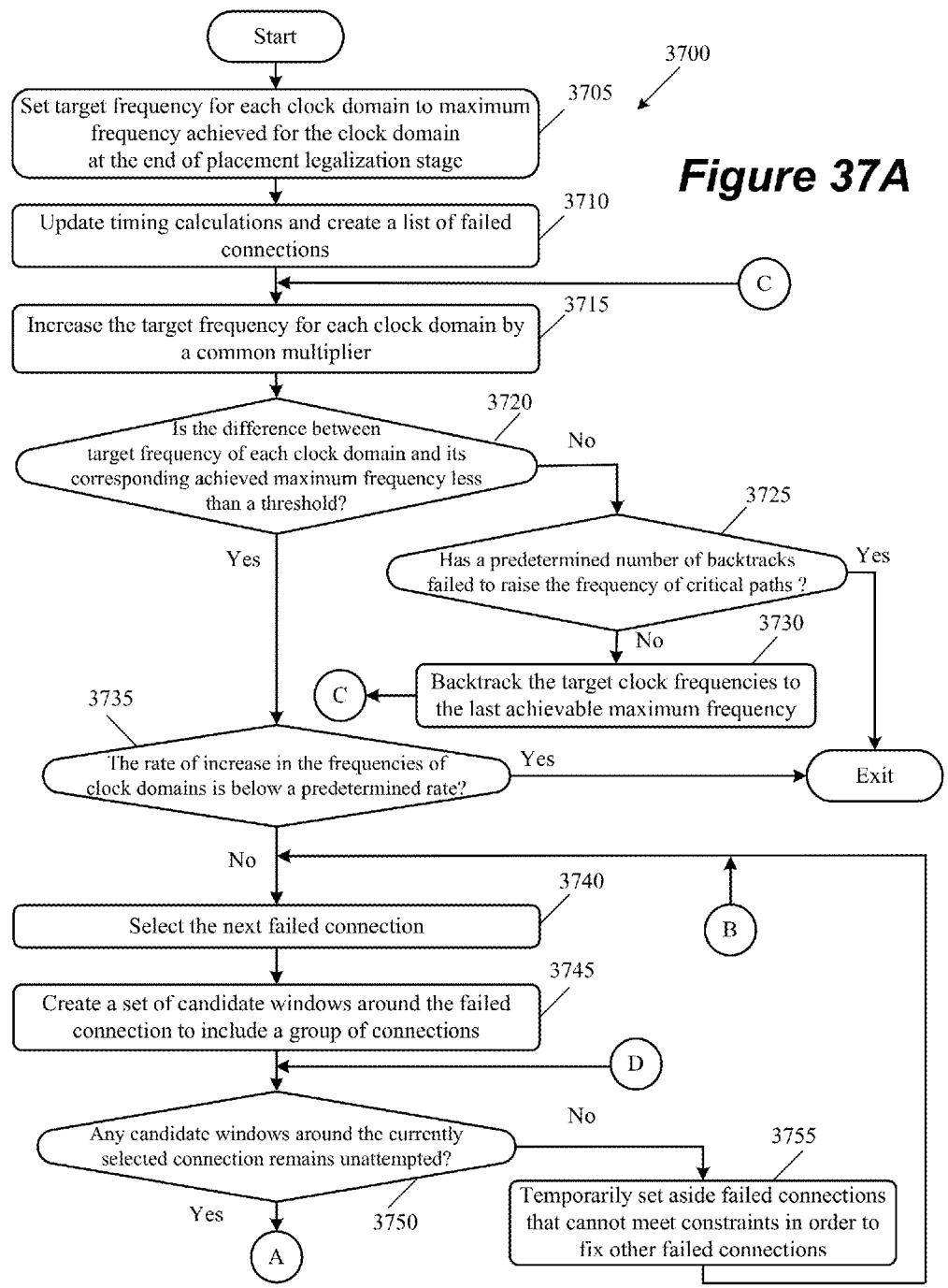
FIGS. 37A and 37B conceptually illustrate a detailed process in some embodiments of the invention that performs timing optimization by increasing the clock domain frequencies using a common multiplier.
Figure 37B:
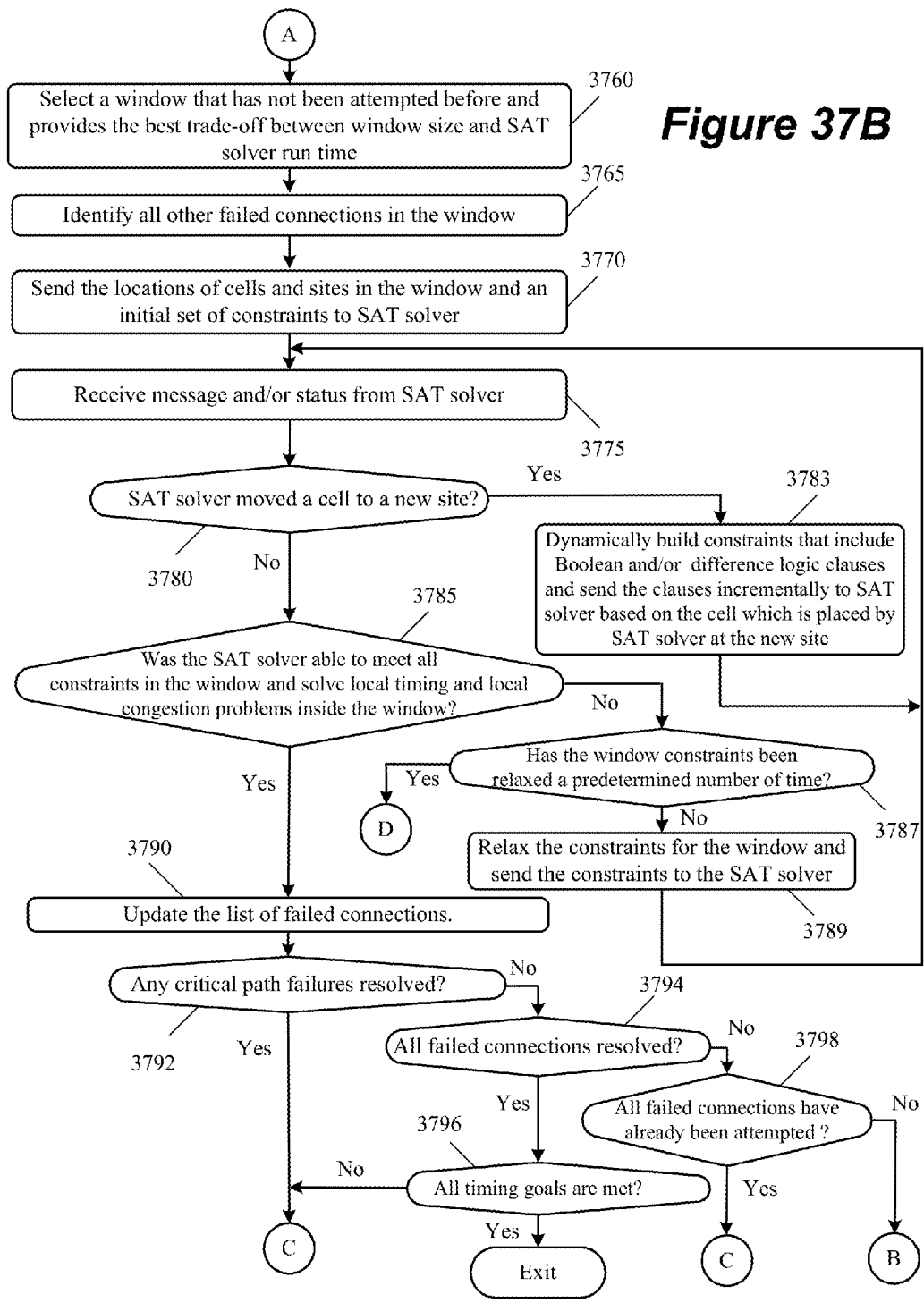

FIGS. 37A and 37B conceptually illustrate a detail process 3700 in some embodiments that performs timing optimization by increasing the clock domain frequencies using a common multiplier. As shown, the process sets (at 3705) target frequency for each clock domain to the maximum frequency achieved for the clock domain at the end of placement legalization stage. Next, the process updates (at 3710) timing calculations of the IC design based on the output of the previous stage and creates a list of the failed fromtos (i.e., source and destination cells with connections that do not meet timing constraints). The process then increases (at 3715) the target frequency for each clock domain by a common multiplier.

Next, the process determines (at 3720) whether the difference between the target frequency of each clock domain and its corresponding achieved maximum frequency is less than a threshold. As described by reference to FIG. 36 above, it is possible that the inner loop exhausts the failed connection list by attempting all failed connections without making an overall improvement to achieve the desired frequencies and without finding solutions to every failed connection. The DPL-R in some embodiments has the strategy of pressing forward a certain amount followed by backtracking. In these embodiments, the target multiplier is increased even though no overall improvement was made at the previous target multiplier. The goal is to continue to improve less-critical portions of the placement in order to introduce enough slack into the placement that the timing constraints on the critical paths loosen up enough to admit a solution. The outer loop continues to optimize the design at increasing target multipliers until a gap of certain percentage size (as determined at 3720) is formed between the target multiplier and the critical achieved frequency. The outer loop then backtracks to a target multiplier just higher than the actual achieved maximum frequency and attempts to repair the most critical paths again.

For instance, the DPL-R might have achieved 100 MHz for almost the entire design, but there are a few critical connections still at 99 MHz that DPL-R cannot figure out how to solve. By pressing forward, it may be possible to get the noncritical majority of the connections in the design to meet timing at 108 MHz. This creates an approximately 8% gap between the level where DPL-R was finding satisfiable connections and the overall achievable frequency. At this point DPL-R backtracks the target frequency to 100 MHz and attempts to repair the 99 MHz critical paths up to 100 MHz. Only this time, the majority of the design has 8 MHz of slack to offer instead of only 1 MHz of slack.

When process 3700 determines (at 3720) that the gap between the target frequency of each clock domain and its achieved maximum frequency is still below a predetermined threshold, the process proceeds to 3735 which is described below. Otherwise, the process determines (at 3725) whether a predetermined number of backtracks have already been made and failed to raise the frequency of critical paths. If so, the process exits and DPL-R proceeds to the next stage. Otherwise, the process backtracks (at 3730) the target frequencies of the clock domains to the last achievable maximum frequency for each domain. The process then proceeds to 3715 to continue improve the target frequencies.

At 3735, the process determines whether the rate of increase in the frequencies of the clock domains is below a predetermined rate. In some embodiments, the process performs regression analysis of the increase in achievable frequency over time. When the optimization starts to slow down and the target frequencies are no longer improving at a rate comparable to the historical rate, the process determines that a point of diminishing returns has been reached. The process then exits and DPL-R proceeds to the next stage. Otherwise, the process selects (at 3740) the next fromto with a connection that fails to meet timing requirements. In some embodiments process 3700 randomly selects the next failed connection from the list of failed connections. In other embodiments, process 3700 uses a heuristic method (e.g., a connection with the least amount of timing problem, a connection in the critical path, etc.) to select the next failed connection to resolve.

Next, the process creates (at 3745) a set of candidate windows (or regions) around the selected failed connection to include a group of other connections and cells. As described by reference to FIG. 26 above, the candidate windows for an IC with sub-cycle reconfigurable circuits can span across both time and space. For an IC without sub-cycle reconfigurable circuits, the windows only span across space. Instead of resolving the timing issues of an individual connection or attempting to resolve the timing issues of all connections in the IC design at the same time, process 3700 selects a group of cells connections in time and/or space vicinity of a selected cell or connection with legalization issues and attempts to resolve all legalization issues inside the window. Each candidate window includes the selected failed fromto and at least one other fromto that is not included in any other candidate windows.

Similar to discussions by reference to FIG. 26 for the placement legalization solving stage, process 3700 selects a group of cells and connections by placing a conceptual window or region in around the selected failed connection. In an IC with sub-cycle reconfigurable circuits, the conceptual window or region that is defined around the failed connection spans both space and time. For instance, two cells can occupy the same physical site (e.g., a reconfigurable logic circuit) in two different sub-cycles. Process 3700 considers different window sizes and shapes (i.e., the number of cells and connections grouped together by the window) in order to leverage the trade-offs between windows size and the time SAT solver spends to solve the window failures. A small window requires moving a small number of cells only a small amount from their originals locations. However, in some instances, a larger window is necessary in order to find a satisfiable solution. In some embodiments, the candidate windows are ranked heuristically in order of the likelihood of solving the failed connections timing issues, potential benefit to the overall solution quality, and expected solver runtime. Process 3700 maintains a list of attempted windows for each selected failed connection in order to prevent duplication of effort.

The process then determines (at 3750) whether any candidate windows for the current selected failed fromto remain unattempted. When all candidate windows for the selected connection are attempted and there are still unresolved timing failures inside the window, the process temporarily sets aside (at 3755) the failed connections inside the window and proceeds to 3740) in order to fix other failed connections. If none of the candidate windows for a failed fromto are satisfiable, the process moves on and does not revisit the problematic fromto in the inner loop (i.e., at the current value of clock domain frequencies). Such a fromto can get fixed later by coincidence when the process solves a different window for a different fromto with different geometry that just happens to admit a solution to the problematic fromto. Also, a failed fromto might stop violating timing when cells in its fanin or fanout are improved and additional slack is propagated to the fromto.

When there are more unattempted candidate windows for the failed fromto, the process selects (at 3760) a window that has not been attempted before and that provides the best trade-off between window size and SAT solver run time. The process then identifies (at 3765) all other failed connections in the window. The process then sends (at 3770) the locations of cells and sites inside the window and an initial set of constraints to SAT solver. Next, the process waits for the next action from the SAT solver and receives (at 3775) a message and/or status indication from the SAT solver. Interactions of the DPL-R and the SAT solver were described by reference to FIG. 27 above.

Process 3700 then determines (at 3780) whether the SAT solver has moved a cell to a new site. In some embodiments, the SAT solver informs process 3700 of such a move by returning a status code or sending a message to process 3700. When the SAT solver has not moved a cell the process proceeds to 3785 which is described below. Otherwise, the process dynamically builds (at 3783) constraints that include Boolean and/or difference logic clauses and sends the clauses to the SAT solver based on the cell that is placed by the SAT at the new site. The process then proceeds to 3780 and waits for the next action from the SAT solver.

At 3785, the process determines whether the SAT solver was able to meet all constraints in the window and solve local timing and local congestion problems inside the window. If so, the process proceeds to 3790 which is described below. Otherwise, the process determines (at 3787 whether the window constraints have been relaxed a predetermined number of times. If so, the process proceeds to 3750 which was described above. Otherwise, the process relaxes (at 3789) the constraints for window and sends the constraints to the SAT solver and proceeds back to 3775 which was described above.

After finding the first satisfiable window, it is not necessary to attempt any of the other candidate windows. At 3790, the process updates the list of failed fromtos. Any fromtos inside the satisfied window now meets timing and is removed from the failed fromto list. Additionally, some fromtos outside the window may no longer violate timing due to additional slack propagated from the improved placement within the window. These are also removed from the list. Fromtos are never added to the list as the placement quality is intended to improve monotonically.

The process then determines (at 3792) whether any critical path failures are resolved. As described above, when at any point the worst clock domain is improved, the process returns to the outer loop (at 3715) and the target multiplier is increased to keep the timing constraints sufficiently challenging and to make progress towards the desired frequency (i.e., the timing goals) set by the user for the IC design. Otherwise, the process determines (at 3794) whether all failed fromtos in the user design are resolved. If so, the process determines (at 3796) whether all timing goals set by the user design are met (i.e., all clock domains have reached their desired frequencies). If so, the process exits. Otherwise, the process proceeds to 3715 to continue improve the clock domain frequencies.

When the process determines that all failed fromtos are not resolved, the process determines (at 3798) whether all failed fromtos have already been attempted at the current clock domain frequencies. If so, the process proceeds to 3715 which was described above. Otherwise, the process proceeds to 3740 to select the next failed fromto to resolve.

C. Timing Optimization with Unlocked-Multiplier

The third stage of DPL-R is nearly identical to the second stage. The main difference is that each clock domain is allowed to have its own target frequency and these targets are allowed to grow independently of one another. As described by reference to FIG. 31 above, some embodiments include clock crossing cells to send data from one clock domain to another. The third stage is justified because after the second stage the clock crossing cells are optimized as best as it is possible in each clock domain and the additional frequency headroom in the third stage makes the router's task easier.

The justification is that if two clock domains that are joined by clock crossing cells (to send data from one clock domain to another) are allowed to improve in an unbalanced way, then the connections close to the clock crossing cells will be difficult or impossible to optimize due to unbalanced relative slack violations on either side of the clock crossing cells.

Figure 38A:
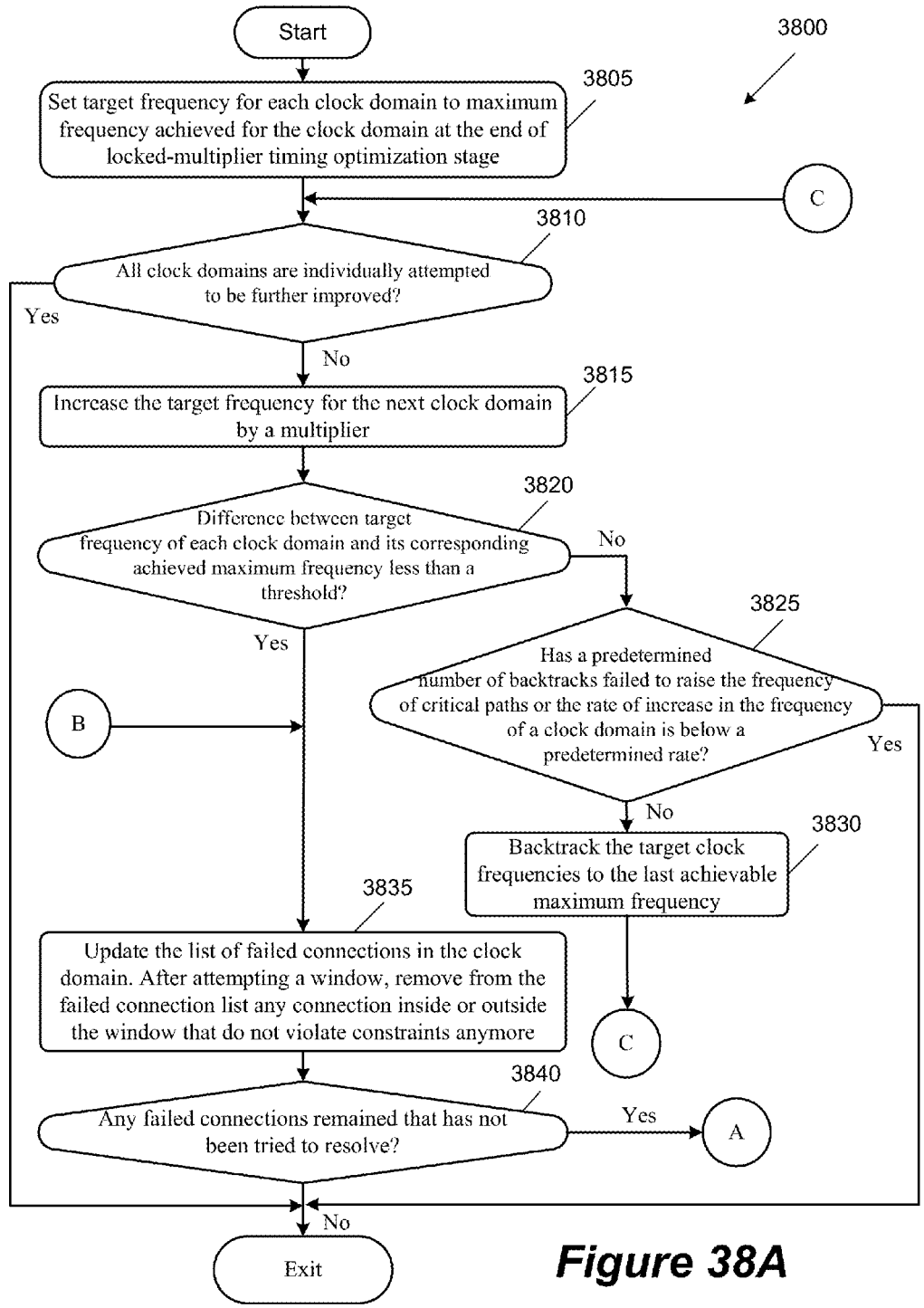
FIGS. 38A and 38B conceptually illustrate a process in some embodiments of the invention that performs timing optimization by independently increasing the clock domain frequencies of each clock domain.
Figure 38B:
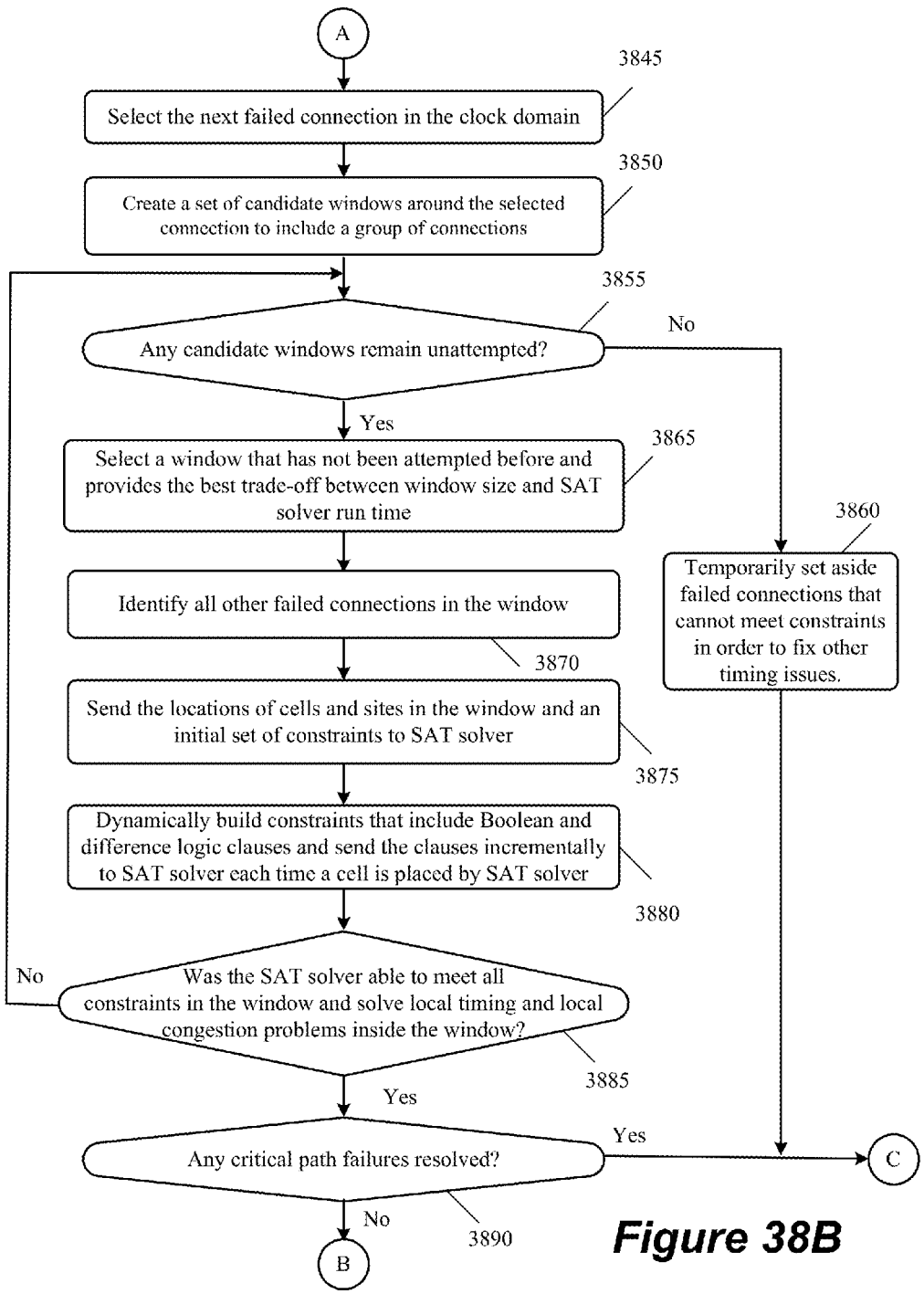

FIGS. 38A and 38B conceptually illustrate a process 3800 in some embodiments that performs timing optimization by independently increasing the clock domain frequencies of each clock domain. In some embodiments, process 3800 is utilized even when the previous stage of DPL-R has fixed all placement issues in order to create slack in timing delays. Details are several operations that are similar to operations of process 3700 are eliminated for simplicity.

As shown in FIGS. 38A and 38B, process 3800 sets (at 3805) the target frequency for each clock domain to the maximum frequency achieved for the clock domain at the end of locked-multiplier timing optimization stage. Next, the process determines (at 3810) whether all clock domains are individually attempted to be further improved. If no further improvement is to be attempted, the process exits and DPL-R sends the placement results to the router. Otherwise, the process increases (at 3815) the target frequency of at least one clock domain.

The process then determines (at 3820) whether the difference between the target frequency of each clock domains and its corresponding achieved maximum frequency is less than a threshold. If so, the process proceeds to 3835 which is described below. Otherwise, the process determines (at 3825) whether a predetermined number of backtracks has failed to raise the frequency of critical paths or the rate of increase in the frequency of a clock domain is below a predetermined rate. If so, the process exits. Otherwise, the process backtracks (at 3830) the target frequency to the last achieved maximum frequency for at least one clock domain. The process then proceeds to 3810 which was described above.

At 3835, the process updates the list of failed connections (if any) in each clock domain. After attempting a window, the process removes from the failed connection list any connection inside or outside the window that do not violate constraints anymore. The process then determines (at 3840) whether any failed connections remained that has not been tried to resolve or, when there are no more failed connections, whether any connections remained that is not attempted to have improved timing. If not, the process exits.

Otherwise, the process selects (at 3845) the next failed fromto in a clock domain or the next connection to improve the timing. The process then creates (at 3850) a set of candidate windows around the selected fromto. As described by reference to FIG. 26 above, the candidate windows for an IC with sub-cycle reconfigurable circuits can span across both time and space. For an IC without sub-cycle reconfigurable circuits, the windows only span across space. The process then determines (at 3855) whether any candidate windows remain unattempted. If not, the process temporarily sets aside (at 3860) the failed connection (or the connection for which the timing is being improved) in order to fix other timing issues. The process then proceeds to 3810 which was described above.

When there are unattempted windows, the process selects (at 3865) an unattempted window that provides the best trade-off between window size and SAT solver run time. The process then identifies (at 3870) all other failed fromtos in the window (if any). The process then sends (at 3875) the locations of the cells and sites inside the window and an initial set of constraints to the SAT solver.

The process then dynamically builds (at 3880) constraints that include Boolean and difference logic clauses and sends the clauses incrementally to SAT solver each time a cell is placed by SAT solver. Details of the interactions between the SAT solver and process 3800 are similar to the interactions of the DPL-R and SAT solver described by reference to FIG. 27 above and operations 3775-3789 of process 3700 and are not repeated here for brevity.

The process then determines (at 3885) whether the SAT solver was able to meet all constraints in the window and solve local timing and local congestion problems inside the window. If not, the process proceeds to 3855 which was described above. Otherwise, the process determines (at 3890) whether any critical path failures have been resolved or any critical path timing has been improved. If so, the process proceeds to 3810 which was described above. Otherwise, the process proceeds to 3835 which was also described above.

D. Satisfiability Solver

Figure 39:
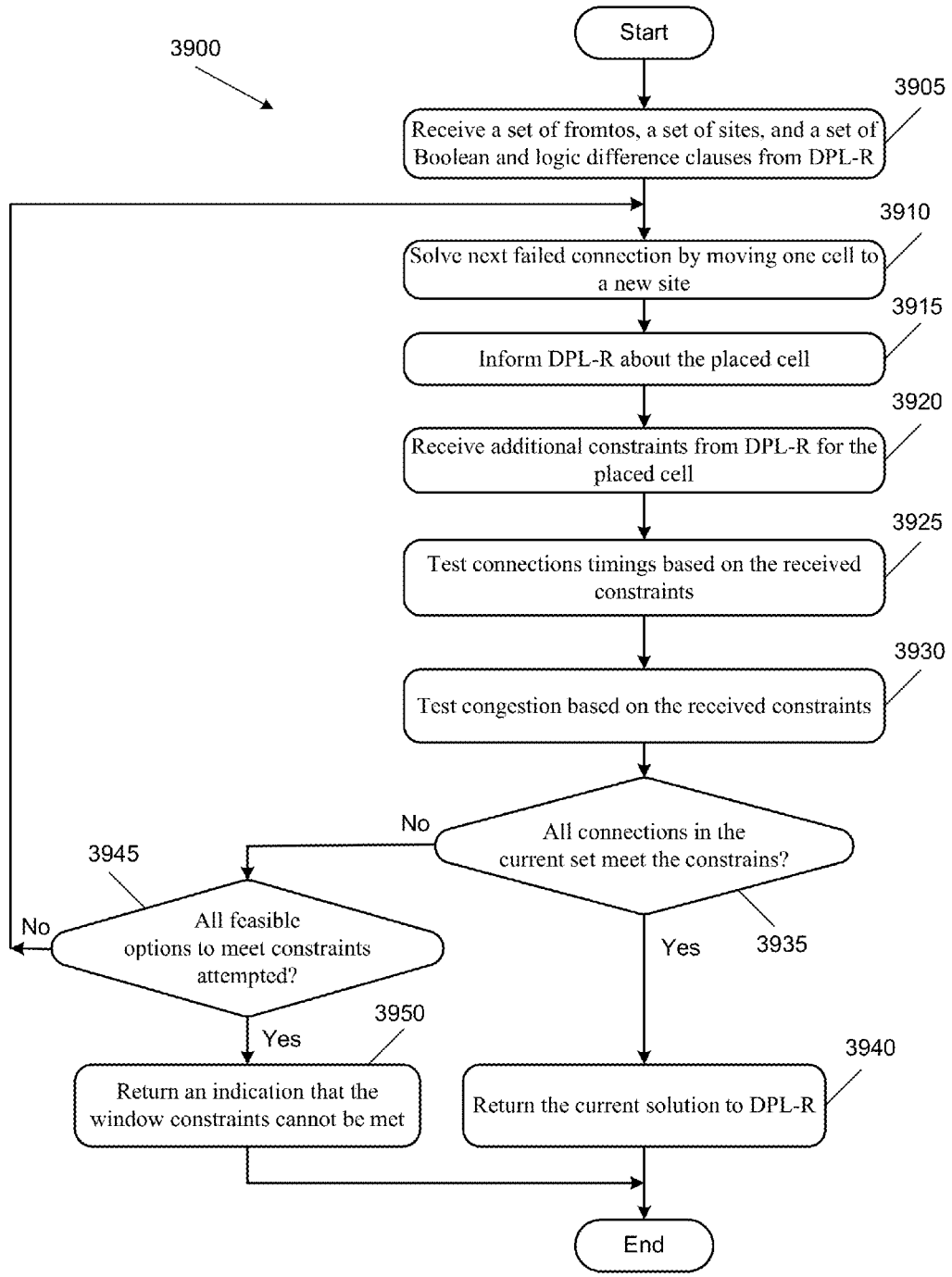
FIG. 39 conceptually illustrates a process performed by a satisfiability solver in some embodiments of the invention.

FIG. 39 conceptually illustrates a process 3900 performed by a satisfiability solver in some embodiments. As shown, the process receives (at 3905) a set of fromtos, a set of sites, and a set of Boolean and difference logic clauses from DPL-R. The process then solves (at 3910) a fromto by moving one cell to a new site in the set of received sites.

The process then informs (at 3915) DPL-R about the placed cell. The process then receives (at 3920) additional constraints from the DPL-R based on the newly placed cell. The process then tests (at 3925) the timings of the fromtos based on the received constraints. The process also tests (at 3930) local congestion based on the received constraints. The process then determines (at 3935) whether all fromtos in the received set of fromtos meet the constraints.

When all fromtos meet the constraints, the process returns (at 3940) the current placement solution to DPL-R. The process then exits. Otherwise, the process determines (at 3945) whether all feasible options to meet constraints are attempted. If not, the process proceeds to 3910 to solve the next failed fromto in the received set of fromtos. Otherwise, the process returns (at 3950) an indication that the constraints for the received set of fromtos cannot be met. The process then exits.

IV. ENCODING PLACEMENT AS A SATIFIABILITY PROBLEM

Several more embodiments are described below. Details of performing IC placement as a constraint satisfaction problem are described by using examples for an IC with sub-cycle reconfigurable circuits. However, a person of ordinary skill in the art would realize that the descriptions apply to ICs without sub-cycle reconfigurable circuits. For instance, when selecting a window to solve the placement issues of a set of fromtos, an IC with sub-cycle reconfigurable circuits might include sites that correspond to the same physical reconfigurable circuit at different sub-cycles while in ICs without sub-cycle reconfigurable circuits the window only includes cells and sites that are separated in space but not in time.

In the examples described below the term spacetime sites refers to physical sites on the IC that are either separated from each other in space and/or in time. For instance, two cells assigned to two spacetime sites might be (i) assigned to two separate physical circuits on the IC on the same clock sub-cycle, (ii) assigned to the same physical circuit on two different clock sub-cycles, or (iii) assigned to two separate physical circuits on the IC on two different sub-cycle. One of ordinary skill in the art would realize that the same examples can be used for an IC without sub-cycle reconfigurable circuits by assigning the two cells to two physical circuits on the IC.

A. Boolean SAT Encoding

In some embodiments, the DPL-R uses a SAT solver that is capable of solving Boolean as well as difference logic constraints. In other embodiments, the DPL-R uses an off-the-shelf SAT solver that is only capable of solving Boolean satisfiability problems where the variables must be Boolean variables and the constraint is a single Boolean formula written using AND, OR, and NOT operators.

This representation is more restrictive than the example given in the next section. Instead of describing the placement of cells and pins using variables whose values are sites and sitepins, in the off-the shelf SAT solver, variables can only take the values 1, 0, and X (don't care or undefined). There are no real number variables for modeling event times, inequality operators or quantifiers. In return, DPL-R benefits from a practical and fast solver that is well-supported by academia and has made remarkable advancements in capability over the last decade. The following sections describe how DPL-R encodes a windowed placement problem as a Boolean Satisfiability problem.

Figure 40:
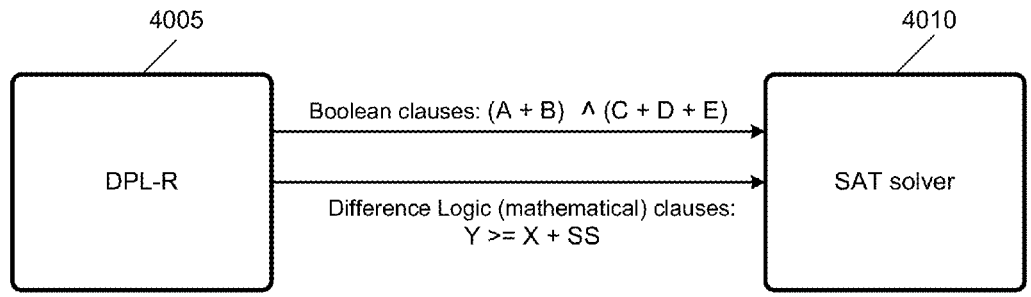
FIG. 40 conceptually illustrates the use of a SAT solver that receives Boolean clauses and difference logic clauses from DPL-R in some embodiments of the invention.
Figure 41:
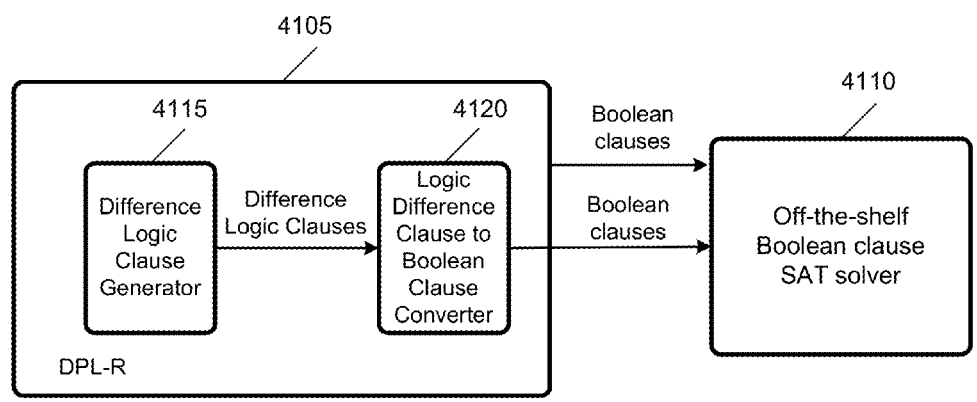
FIG. 41 illustrates the use of a SAT solver that only receives Boolean clauses from DPL-R in some embodiments of the invention.

FIG. 40 conceptually illustrates the use of a SAT solver that receives Boolean clauses and difference logic clauses from DPL-R in some embodiments. As shown, DPL-R 4005 sends both Boolean clauses and difference logic clauses to the SAT solver 4010. FIG. 41 illustrates the use of a SAT solver that only receives Boolean clauses from DPL-R in some embodiments. As shown, the DPL-R 4105 internally converts difference logic clauses (generated by difference logic clause generator 4115) to Boolean clauses by using a logic clause to Boolean clause converter 4120 module. DPL-R 4105 sends only Boolean clauses (either generated directly or converted from difference logic clauses) to the SAT solver 4110. Several examples of the DPL-R 4105 are described below.

B. Constraint Satisfaction Problems

DPL-R's SAT solver does the work of encoding the placement window as a constraint satisfaction problem, solving this constraint satisfaction problem formulation, decoding the results, and applying the corresponding placement changes to the netlist. The SAT solver tells the DPL-R whether the window was satisfiable or unsatisfiable, and measures the quantitative difference in overall placement quality. The DPL-R then uses this information to choose the next window.

In this constraint satisfaction problem, some variables are defined that describe the placement of cells and pins, and some constraints are defined that restrict the values that these variables can take. A solver then searches for values for the variables that meet all the constraints. The cells and pins are then moved to the locations given by these values. The following is an example of a constraint satisfaction problem for doing placement.

Assume that the window contains 3 cells, A, B, and C, and 5 spacetime sites $S_0$, $S_1$, $S_2$, $S_3$, and $S_4$. Define the variables $V_A$, $V_B$ and $V_C$ to describe the placement of cells A, B, and C. These variables can take any value $S_0 \ldots S_4$.

Next, define logical constraints that rule out invalid solutions. For example, the constraint $\forall_{a, b, a \neq b}: \neg (V_a = V_b)$ states that any two cells a and b cannot have the same site assignment. This constraint rules out all placement overlaps. The symbol $\forall$ reads as "for all" and the constraint reads as follows: for all pairs of cells a and b, where cell a is not the same as cell b, cell a and cell b cannot be placed on the same site.

Timing constraints can also be expressed. For instance, assume that there is a fromto between cells A and B called $F_{AB}$. Further assume that if cell A is placed on site $S_0$ and cell B is placed on site $S_1$, then this fromto fails to meet timing at the current target frequency because the fabric path between site $S_0$ and $S_1$ is very long. This constraint could be expressed as the constraint $\neg (V_A = S_0 \wedge V_B = S_1)$.

A more complex timing constraint might involve the event time at a cell. Define the variables $A_i$ and $R_i$ to represent the arrival and required times, in units of picoseconds, at cell i. If the fabric path between site $S_0$ and $S_1$ has source-to-sink delay $ss_{01}$, then the timing constraint would be written as $(V_A = S_0 \wedge V_B = S_1) \rightarrow ((A_B \geq A_A + ss_{01}) \wedge (R_A \leq R_B - ss_{01}))$. Timing violations are then prevented by a constraint that prohibits the arrival time at a cell from exceeding the required time: $(A_i \leq R_i)$.

Figure 42:
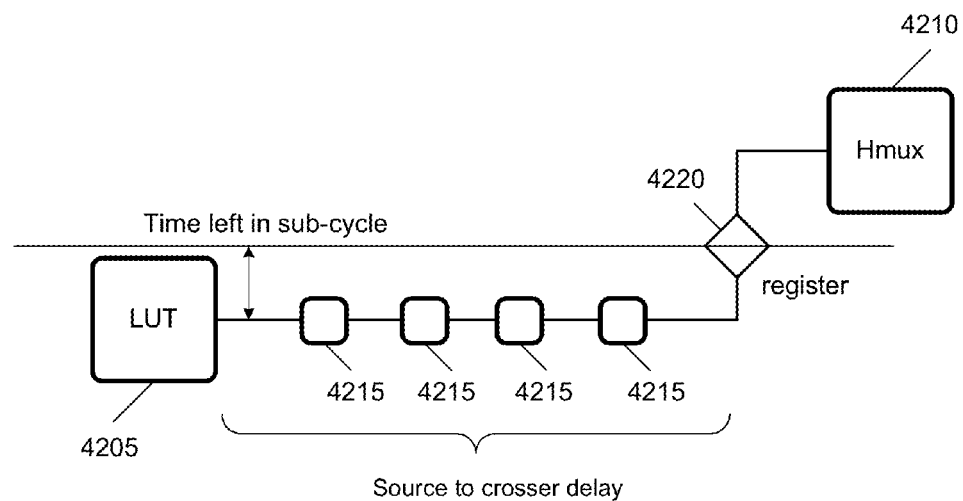
FIG. 42 conceptually illustrates a source cell, a destination cell, several routing elements such as latches, and a register in an IC with reconfigurable circuits in some embodiments of the invention.

Source-to-crosser (sx) and crosser-to-sink (xs) timing constraints are handled in a similar way. FIG. 42 conceptually illustrates a source cell 4205, a destination cell 4210, several routing elements such as latches 4215, and a register 4220 in an IC with sub-cycle reconfigurable circuits in some embodiments. In this example, the source cell 4205 and the destination cell 4210 are assigned to sites in two different sub-cycles. Register 4220 is referred to as a crosser because it holds the signal for transition (or cross) between two sub-cycles. A sx constraint would force the required time at an output pin (opin) to occur a certain amount of time before the end of the sub-cycle: $(R_A \leq \tau - sx_{01})$ where $\tau$ is a constant equal to the current target sub-cycle period. As shown, even if the destination cell is several sub-cycles later, the local timing for the source-to-crosser is the first deadline that the signal has to meet on its way towards the destination cell.

Next, a constraint satisfaction problem solver is invoked. The solver searches for assignments for each of the variables such that all of the constraints are satisfied simultaneously. The solver looks for any satisfying solution. It does not compare the relative merits of different solutions if there are multiple possible solutions in order to return the "best" solution. It simply returns any solution or proves that there exists no possible solution. The constraint satisfaction problem solver is usually a separate piece of software that solves general problems and has no specific knowledge about spacetime placement problems. It only knows about the variables and constraints that are given to it.

In this example the solver might determine that the answer is $V_A = S_2$, $V_B = S_3$, and $V_C = S_4$. This solution implies that cells A, B, and C should be moved onto sites $S_2$, $S_3$ and $S_4$ respectively. DPL-R can then make these actual moves, and it can be easily confirmed that the result is free of placement overlaps and avoids the simple timing constraints described above which were all predicated on $(V_A = S_0 \wedge V_B = S_1)$. The quantitative improvement in placement quality can be measured by the existing DPL-R cost functions.

C. SatCells and SatSites

In order to use an off-the-shelf SAT solver, DPL-R encodes the placement of cells on sites using Boolean variables. As described above by reference to FIG. 26, a window is simply a collection of cells and spacetime sites. DPL-R in some embodiments creates an array of objects (referred to as SatCells) to represent the cells in the window. This provides a convenient mechanism to index the netlist relative to the number of cells in the window. SatCells also store the original spacetime placement of the cell and other related data.

DPL-R also creates an array of objects (referred to as SatSites) to represent the placement options for the SatCells. The SatSites are a superset of the spacetime fabric sites in the window. The additional elements beyond the window fabric sites are to represent extended placement options and user cycle-retimed placement options. For instance, consider a window that contains two spacetime LUTs: Lut_3[1:1] and Lut_3[2:2]. These two sites refer to the same physical LUT, Lut_3, used in the first sub-cycle and the second sub-cycle. The notation [1,1] indicates that the LUT usage starts on sub-cycle 1 and ends on sub-cycle 1. There are therefore two SatSites representing unextended placements (i.e., placements that are limited to a particular physical site at a particular sub-cycle). In the following discussions, when a LUT (e.g., Lut_3) is to be used to hold the signal for both sub-cycles (i.e., the LUT usage is extended across two sub-cycles), the SatSite for the LUT is represented as Lut_3[1:2].

Also, SatSites are always specified in terms of unrolled sub-cycles. If a cell was originally located in sub-cycle [4:4] and the looperness is 8 (i.e., there are 8 sub-cycles in each user cycle as described by reference to FIG. 6, above), then a solution that places a cell on SatSite [−1:−1] would correspond to a retime of −5 sub-cycles, leaving the cell in absolute sub-cycle [7:7] (i.e., sub-cycle 7 of the previous user cycle). A placement on SatSite [8:8] (for a cell that was originally located in sub-cycle [4:4]) is a retime of +4 sub-cycles and leaves the cell in absolute sub-cycle [0:0] (i.e., the first sub-cycle in the next user cycle). Then, for a looperness of L, the following are the user-cycle-retimed variations of each of the three spacetime positions (Lut_3[1:1], Lut_3[2:2], Lut_3 [1:2]) of Lut_3:

| SatSite | Spatial Site | Z Placement | Comments |
|---|---|---|---|
| $S_0$ | Lut_3 | [1:1] | |
| $S_1$ | Lut_3 | [2:2] | |
| $S_2$ | Lut_3 | [1:2] | (extended placement) |
| $S_3$ | Lut_3 | [1 + L:1 + L] | (unextended, usercycle retimed later) |
| $S_4$ | Lut_3 | [1 − L:1 − L] | (unextended, usercycle retimed earlier) |

-continued

| SatSite | Spatial Site | Z Placement | Comments |
|---|---|---|---|
| $S_5$ | Lut_3 | [2 + L:2 + L] | (unextended, usercycle retimed later) |
| $S_6$ | Lut_3 | [2 − L:2 − L] | (unextended, usercycle retimed earlier) |
| $S_7$ | Lut_3 | [1 + L:2 + L] | (extended, usercycle retimed later) |
| $S_8$ | Lut_3 | [1 − L:2 − L] | (extended, usercycle retimed earlier) |

D. Placement Variable Matrix

Next, DPL-R creates a placement variable matrix where the rows are the SatSites and the columns are SatCells:

| | SatCells | | | | |
|---|---|---|---|---|---|
| SatSites | A | B | C | D | E |
| $S_0$ | $V_{A0}$ | $V_{B0}$ | $V_{C0}$ | $V_{D0}$ | $V_{E0}$ |
| $S_1$ | $V_{A1}$ | $V_{B1}$ | $V_{C1}$ | $V_{D1}$ | $V_{E1}$ |
| $S_2$ | $V_{A2}$ | $V_{B2}$ | $V_{C2}$ | $V_{D2}$ | $V_{E2}$ |
| $S_3$ | $V_{A3}$ | $V_{B3}$ | $V_{C3}$ | $V_{D3}$ | $V_{E3}$ |
| $S_4$ | $V_{A4}$ | $V_{B4}$ | $V_{C4}$ | $V_{D4}$ | $V_{E4}$ |
| $S_5$ | $V_{A5}$ | $V_{B5}$ | $V_{C5}$ | $V_{D5}$ | $V_{E5}$ |
| $S_6$ | $V_{A6}$ | $V_{B6}$ | $V_{C6}$ | $V_{D6}$ | $V_{E6}$ |
| $S_7$ | $V_{A7}$ | $V_{B7}$ | $V_{C7}$ | $V_{D7}$ | $V_{E7}$ |
| $S_8$ | $V_{A8}$ | $V_{B8}$ | $V_{C8}$ | $V_{D8}$ | $V_{E8}$ |

The entries in the above matrix are Boolean variables of the form $V_{ij}$. When one of these variables takes the value 1, it means that SatCell i is placed on SatSite $S_j$. This matrix captures the placement space. Next, DPL-R restricts the solution space by creating Boolean constraints using these variables.

E. Exactly One Site Per Cell Constraints

The most basic constraint is a "liveness" constraint that requires each SatCell to be assigned to exactly one SatSite. This constraint prevents the solver from finding a solution where $\forall_x(\neg V_{Ax})$, which would have the interpretation that cell A is not placed anywhere. The solution where $\exists_{x, y, x \neq y}$: $(V_{Ax} \wedge V_{Ay})$ implies that cell A is placed in two different places is also ruled out. The symbol $\exists$ reads as "there exists" and the constraint that has to be ruled out reads as follows: there exists a site x and a site y, where site x is not the same as site y, and cell A is placed at both site x and site y.

A separate "exactly one" (ExactlyOne) constraint is made for each column in the placement variable matrix. ExactlyOne can be implemented as the conjunction of an AtLeastOne and an AtMostOne constraint. AtLeastOne is a Boolean clause that OR's all of the variables in the column: $(V_{A0} + V_{A1} + \ldots + V_{An})$. AtMostOne can be implemented using a set of two-literal clauses that prevent all possible pairs of variables in the column from being both true: $(\neg V_{A0} + \neg V_{A1})$ $(\neg V_{A0} + \neg V_{A2}) \ldots (\neg V_{An} + \neg V_{An})$.

F. At Most One Cell Per Spacetime Site Constraints

Placement overlaps are prevented by "at most one" (AtMostOne) constraints that limit the number of cells that can be placed on each spacetime site. One AtMostOne constraint is made for each spacetime site S in the window. For each row in the placement variable matrix, if the corresponding SatSite overlaps with spacetime site S, then that entire row of variables is included in the AtMostOne constraint.

Figure 43:
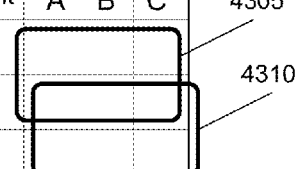
FIG. 43 conceptually illustrates two "At Most One" constraints where the variables for an extended placement site are included in both constraints in some embodiments of the invention.

For example, consider a window that contains two spacetime sites and three SatSites (the third being for the extended placement over the two sub-cycles). Two AtMostOne constraints will be created. One will include all the variables in all rows that overlap Lut_3[1:1] and the other will include all the variables in all the rows that overlap Lut_3[2:2]. The variables in the row for the extended placement appear in both AtMostOne constraints. This means that if any cell is placed on the extended SatSite, then no other cells can have unextended placements at either of the unextended SatSites. FIG. 43 conceptually illustrates two AtMostOne constraints 4305 and 4310 where the variables for the extended placement Lut_3[1:2] are included in both constraints (as conceptually shown by the three cells on the intersection of rectangles 4305 and 4310).

Figure 44:
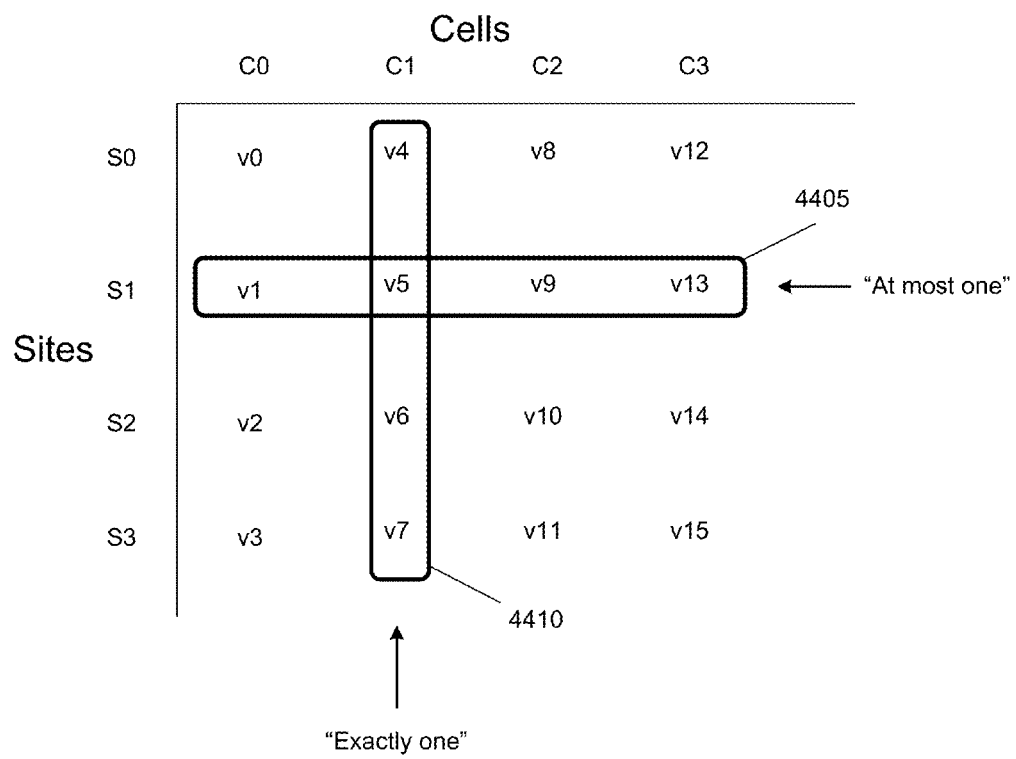
FIG. 44 conceptually illustrates the use of "At Most One" and "Exactly One" constraints for in some embodiments of the invention.

FIG. 44 conceptually illustrates the use of AtMostOne and ExactlyOne constraints for four SatSites $S_0$-$S_3$ and four SatCells $C_0$-$C_3$ in some embodiments. The AtMostOne constraint 4405 indicates that at most one of Satcells $C_0$-$C_3$ can be placed at SatSite $S_1$ while the ExactlyOne constraint 4410 indicates that SatCell $C_1$ has to be placed exactly once in one of SatSites $S_0$-$S_3$.

G. SiteOk Constraints

A "SiteOk" constraint is a simple constraint that rules out placing a certain SatCell on a certain SatSite. It is of the form $(\neg V_{ij})$. These constraints are created for a variety of reasons that reflect both basic placement rules and heuristic restrictions on the solution space. The reasons include cell-site compatibility, out-of-window precedence, valid retimes, fixed time and fixed placement cells, region constraints, and delta XYZ constraints. These reasons are described below.

Cell-site compatibility cells can only be placed on compatible fabric sites. For example, a LUT cell must be placed on a Lut site and not a LCB site. If the placement window contains a diversity of cell and site types, then many of the variables in the Placement Variable Matrix must be 0 according to this basic compatibility rule.

Out-of-window precedence cells can only be retimed within the bounds set by their out-of-window fanin and fanout cells. If a cell is originally in sub-cycle 5 and it drives an out-of-window cell in sub-cycle 7, the cell can only be retimed later by at most +2 sub-cycles. Otherwise the window solution would introduce a precedence violation into the placement. Any SatSite j that implies a retiming of more than +2 sub-cycles for SatCell i gets ruled out with a SiteOk constraint.

Valid retimes are required for certain cells such as synchronous clock crossing cells that have restrictions on what sub-cycles they may be placed in. If SatSite j implies a retiming of n sub-cycles for SatCell i, and a particular sub-cycle is not valid for retiming SatCell i, then the placement variable $V_{ij}$ gets ruled out with a SiteOk constraint.

Any Fixed Time cell cannot be placed on a SatSite that implies a sub-cycle retiming of the cell. Any Fixed Placement cell cannot be placed on a SatSite that implies a spatial move of the cell.

A cell cannot be placed on a SatSite that is outside of the cell's region constraint. Delta XYZ constraints are used by DPL-R to restrict cells to moving no more than a maximum spacetime distance away from their original location. This is a heuristic constraint instead of a hard placement rule. The maximum distance is larger for critical cells and during the placement legalization stage. The DeltaXYZ constraint artificially limits the size of the solution space to improve runtime. Most cells should only have to move a small distance in order to fix the problems within a window. It would be a waste of computational effort for the solver to search for solutions where the cells move a larger distance, even in windows where no solution exists otherwise. It is more efficient to try a different window or to use the press forward and backtrack strategy described above to solve the hard problems.

A general property of constraint satisfaction problem solvers is that they can sometimes spend a lot of runtime exploring an unproductive corner of the solution space. Heuristics called restart strategies are commonly used to break out of these corners and attack the problem from a different angle. The DeltaXYZ constraint implements a coarse-grained restart strategy where DPL-R breaks out to the outer control loop and chooses a different window when the current window appears to be too hard to solve.

After creating the SiteOk constraints, the Placement Variable Matrix will be relatively sparse. This characteristic is one reason why DPL-R is able to quickly solve problems that appear very large when measured in the number of Boolean variables.

H. Pin Permutation Variables

In addition to placing cells on sites, DPL-R also optimizes the placement of pins on sitepins. This is done by using Boolean variables to encode the pin permutation for each permutable cell in the window. A SatPermuter object is created for each permutable cell in the window. A matrix of pin permutation variables is created where the rows are SatPermuters and the columns are pin permutations.

| | pinperms | | | | | | | | | | | | | | | | |
|---|---|---|---|---|---|---|---|---|---|---|---|---|---|---|---|---|---|
| SatPermuters | 0 | 1 | 2 | 3 | 4 | 5 | 6 | 7 | 8 | 9 | 10 | 11 | 12 | 13 | 14 | 15 | ... |
| $SP_A$ | $P_{A0}$ | $P_{A1}$ | $P_{A2}$ | $P_{A3}$ | | | | | | | | | | | | | |
| $SP_B$ | $P_{B0}$ | $P_{B1}$ | $P_{B2}$ | $P_{B3}$ | $P_{B4}$ | $P_{B5}$ | | | | | | | | | | | |
| $SP_C$ | $P_{C0}$ | $P_{C1}$ | $P_{C2}$ | $P_{C3}$ | $P_{C4}$ | $P_{C5}$ | $P_{C6}$ | $P_{C7}$ | $P_{C8}$ | $P_{C9}$ | $P_{C10}$ | $P_{C11}$ | $P_{C12}$ | $P_{C13}$ | $P_{C14}$ | $P_{C15}$ | |
| $SP_D$ | $P_{D0}$ | $P_{D1}$ | | | | | | | | | | | | | | | |
| $SP_E$ | $P_{E0}$ | $P_{E1}$ | $P_{E2}$ | $P_{E3}$ | | | | | | | | | | | | | |

An ExactlyOne constraint is created for each row in the above matrix to force each permutable cell to have exactly one pin permutation. These are analogous to the ExactlyOne Site per Cell Constraints that force each cell to have exactly one site assignment.

Unlike the placement variable matrix, the above matrix does not have a Boolean variable in every entry. Instead, the rows are only populated with enough variables to describe the maximum number of permutations each SatPermuter can have. SatPermuter A in this example has four possible permutations. This might be a LUT with one lmux. An lmux is a two-input AND gate, OR gate, or multiplexor. SatPermuter B has 6 permutations and might be a LUT with zero lmuxes. The matrix is made as wide as necessary.

The placement variable matrix (described in sub-section G, above) is sparse, meaning that many of the variables are a priori known to be 0 by SiteOk constraints. The reason why the placement variable matrix is not simply depopulated instead is to make efficient the operation of converting from a placement variable to a (SatSite, SatCell) pair. A fully-populated matrix allows a simple division and remainder operation to be used. This is done frequently within the DPL-R code. In contrast, DPL-R never needs to convert a pin permutation variable to a (SatPermuter, pinperm) pair. Therefore DPL-R uses depopulation to reduce the total number of Boolean variables. The opposite conversions, from (SatSite, SatCell) and from (SatPermuter, pinperm) to variables, are efficient for both fully-populated and depopulated variable matrices.

There is not a one-to-one relationship between SatCells and SatPermuters. Some SatCells might not be permutable (e.g. LCBs in some embodiments) and will not have a SatPermuter. Some permutable objects, for example lmuxes, have SatPermuters but do not have SatCells. This is because it is not necessary to use a Boolean variable to describe the placement of an lmux on a SatSite. The SatSite assignment and pin permutation of the parent lut cell are already sufficient to determine the lmux site placement.

It is possible to derive some of the desired outputs from combinations of existing variables instead of making separate variables for every individual thing. This is important for efficiency. If lmuxes had their own SatCells and SatSites, then many new constraints would be necessary to force each lmux and its parent LUT to have SatSite assignments with a valid direct connection. Also, all of the child lmuxes of a given LUT would require SatSite assignments that correspond to a valid permutation of the LUT cell. These extra degrees of freedom in the problem space are not useful because they represent many more invalid solutions than valid solutions. The extra constraints increase the memory requirements and runtime of the solver. Instead, the pin permutation variable encoding scheme used in DPL-R describes only legal placements for the lmuxes by construction, saving memory and runtime.

DPL-R uses pin permutation variables to write more complex constraints on the solution space. In the discussions above, the constraint $\neg(V_A=S_0 \wedge V_B=S_1)$ was given as an example that rules out a placement for fromto $F_{AB}$ because the fabric connection between sites $S_0$ and $S_1$ does not meet timing. Using Boolean placement variables this would be written as $\neg(V_{A0} \wedge V_{B1})$. This constraint can be made more specific by adding a pin permutation variable: $\neg(V_{A0} \wedge V_{B1} \wedge P_{B0})$.

Now the placement is only forbidden when the sink cell B uses pin permutation 0 on site 1. This is more typical of a DPL-R timing constraint. The bad fabric connection is between a specific ositepin and a specific isitepin, not just between two sites. Since opins are usually not permutable, the source cell placement var $V_{A0}$ is sufficient to identify a unique ositepin for the source opin. The combination of variables $V_{B1}$ and $P_{B0}$ uniquely identify an isitepin for the sink ipin. Placement variables $V_{A0}$ and $V_{B1}$ also refer to SatSites 0 and 1 which describe the subcycle assignment of the source and sink pins. Therefore this constraint is very specific in ruling out a particular spacetime placement for the fromto $F_{AB}$.

I. Pin Permutation Group Variables

A cell usually has several pin permutations that associate a specific ipin with a specific isitepin. Consider the case of an implAnd sink pin i0 that violates timing when placed on the select isitepin s0. Half of the 16 permutations for an implAnd cell place pin i0 on s0. To entirely rule out the bad placement, DPL-R would need to create a constraint $\neg(V_{A0} \wedge V_{B1} \wedge (P_{Bn}+P_{Bm}+\ldots))$ with all 8 permutations n, m, ... that map i0 to the s0 isitepin. In conjunctive normal form this expands to 8 separate clauses of the form $\neg(V_{A0} \wedge V_{B1} \wedge P_{Bx})$. An implAnd is a two-input AND gate in the user design netlist.

The same overall constraint can be implemented more efficiently by using a helper variable. Define the pin permutation group variable $G_{B.i0.s0} \Leftrightarrow (P_{Bn}+P_{Bm}+\ldots)$, where the two sided arrow symbol, $\Leftrightarrow$, means "if and only if". This is a Boolean variable that is true whenever cell B has one of the 8 permutations that maps ipin i0 onto isitepin s0. It is false when cell B has any other permutation. Now the bad fabric path can be ruled out with only one constraint, written as: $\neg(V_{A0} \wedge V_{B1} \wedge G_{B.i0.s0})$.

DPL-R creates all possible pin permutation group variables for each permutable ipin in the window. Boolean constraints are created to implement the bijections between group variables and permutation variables. Most of the constraints described in the rest of this document are related to the timing or routability of specific fabric paths from an ositepin to an isitepin. Consequently, DPL-R will use permutation group variables exclusively instead of pin permutation variables when building these constraints. The frequency of use easily outweighs the overhead of defining the group variables.

Group variables do not suffer badly from the problem described in the previous section where additional degrees of freedom describe more invalid solutions than valid solutions. The bijection constraints between group variables and permutation variables prohibit the group variables from taking values that do not correspond to a valid permutation. Fortunately, these constraints can be implemented efficiently using only two-literal Boolean clauses.

J. Encoding Event Time Intervals

Figure 45:
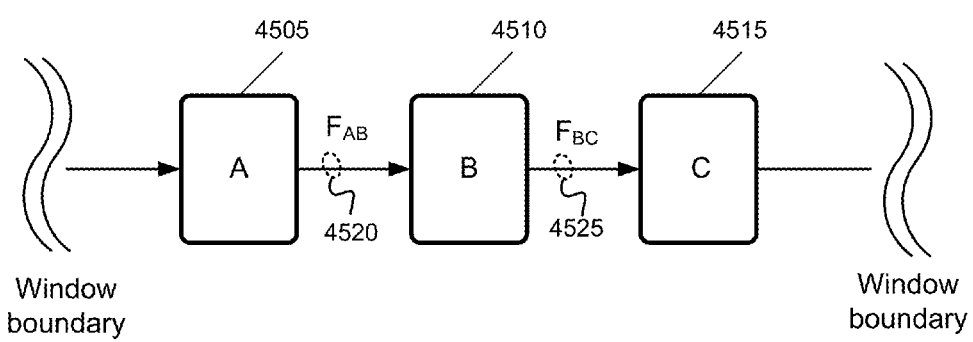
FIG. 45 conceptually illustrates three intra-window cells in some embodiments of the invention.

In some embodiments, DPL-R windows include a chain of cells linked by fromtos. FIG. 45 conceptually illustrates three intra-window cells A 4505, B 4510, and C 4515 connected by fromtos $F_{AB}$ 4520 and $F_{BC}$ 4530 in some embodiments. DPL-R in some embodiments does not rule out placements for these fromtos by looking at each one in isolation. Instead, the placement of each fromto affects the timing budget for the other. A placement for $F_{AB}$ with a long source-to-sink delay might be acceptable if $F_{BC}$ can be placed with a short delay, and vice versa.

It is not tractable for DPL-R to generate constraints that rule out all of the bad placement combinations for a set of related fromtos. The number of constraints in this product space would be astronomically large. Instead, DPL-R tracks the timing relationships between fromtos by explicitly modeling the arrival and required times at opins in a way similar to traditional static timing analysis. The difference between the arrival time and required time at an opin is the opin's event time interval or slack. The design meets timing at the target frequency when every opin has a nonempty event time interval, or an arrival time that is less than or equal to the required time.

DPL-R makes constraints in the form of implications $(V_A \wedge V_B \wedge G_B) \rightarrow ((A_B \geq C_1) \wedge (R_A \leq C_2))$, where the antecedent is some conjunction of variables that describe the placement of a single fromto, and the consequent is one or more inequalities that set bounds on required times and arrival times at the fromto's endpoints. An additional constraint $(A_i \leq R_i)$ is made for each opin i to force the event time interval to be nonempty. These constraints allow the solver to detect when any combination of fromto placements results in a violation where some opin's arrival time must be greater than its required time anywhere in the netlist. With this approach DPL-R never needs to create constraints the contain placement variables and permutation group variables for multiple fromtos at the same time, thus avoiding the product space explosion. This section describes how event time intervals and timing implication inequality constraints are implemented using Boolean SAT variables and clauses.

K. Discrete Microcycles

The existing static timing analysis code in DPL measures arrival times and required times in continuous picoseconds. Discrete variables are a better match for the capabilities and limitations of Boolean SAT. Therefore DPL-R models arrival and required times in discrete quanta referred to as microcycles. A microcycle in some embodiments is defined to be 1/32 of a sub-cycle. Since the window solver is working under the context of a specific target frequency in picoseconds per user cycle, it is straightforward to convert between microcycles and picoseconds, provided that rounding methods are chosen carefully.

Figure 46:
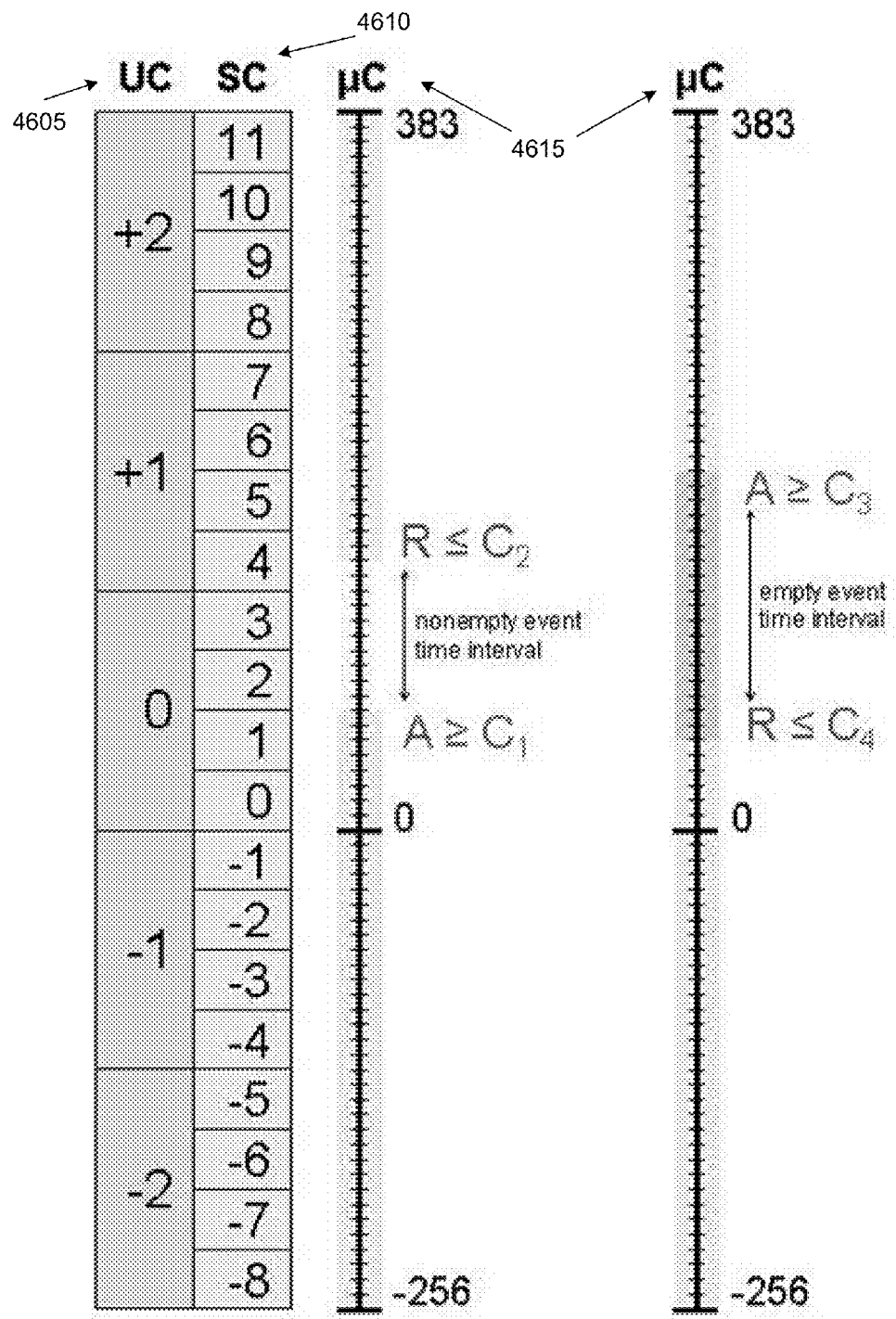
FIG. 46 conceptually illustrates retiming bounds that include a range of microcycles in some embodiments of the invention.

The SatSites that are created at the beginning of the window solver provide limits on how far any intra-window cell can be retimed earlier or later. These retiming bounds result in a finite range of microcycles that any opin arrival or required time can take. This range is typically 5 user cycles centered around the user cycle that contains the startSc of the opin's cell as it was placed when the window solver started. FIG. 46 conceptually illustrates retiming bounds that include a range of microcycles in some embodiments. Arrival and required times take any discrete value on this line. Looperness 4 is chosen for simplicity. User cycles 4605, sub-cycles 4610, and microcycles 4615 are labeled in unrolled time.

On the left, FIG. 46 shows the case where the arrival time is less than the required time and the event time interval is nonempty. On the right, the arrival time is greater than the required time which represents a timing violation.

L. Boolean Event Time Variables

DPL-R uses a novel technique to express bounds on the event time interval and to detect when the interval becomes empty using Boolean SAT variables. This allows inequality constraints like $(A_B \geq C_1)$ to be expressed with ordinary SAT clauses and for timing violations to be detected as ordinary SAT conflicts.

The key to this technique is the use of a Boolean variable to express the concept of inequality. An event time variable $E_{Ax}$ is created for each opin A and each microcycle x on the number line. This variable has the meaning that "the event time at opin A is less than x". This is different conceptually than the previous Boolean variables defined in DPL-R. The placement variable $V_{A0}$ has the meaning that "the placement site for cell A is equal to site 0".

The pin permutation variable $P_{A0}$ has the meaning that "the pin permutation for cell A is equal to permutation 0". These variables have equality semantics. When the variable takes the value 1, it means "is equal to" and when the variable is 0 it means "is not equal to".

Event time variables mean "less than" instead of "equal to". When they take the value 1, it means "less than" and when they take the value 0 it means the opposite: "greater than or equal to".

Event time variables are ideal for describing discrete microcycle arrival and required time bounds using Boolean SAT clauses. The required time expression $(R_A < C)$ is simply the literal $E_{AC}$. The timing constraint $(V_A \wedge V_B \wedge G_B) \rightarrow (R_A < C)$ can be written as $(V_A \wedge V_B \wedge G_B) \rightarrow (E_{AC})$. In conjunctive normal form, this is the Horn clause $(\neg V_A + \neg V_B + \neg G_B + E_{AC})$. A Horn clause is a clause that is a disjunction of literals with at most one positive literal. The arrival time expression $(A_B \geq D)$ is the negative literal $\neg E_{BD}$. The timing constraint $(V_A \wedge V_B \wedge G_B) \rightarrow (A_B \geq D)$ can be written as the Horn clause $(\neg V_A + \neg V_B + \neg G_B + \neg E_{BD})$.

M. Vertical Chain Clauses

Figure 47:
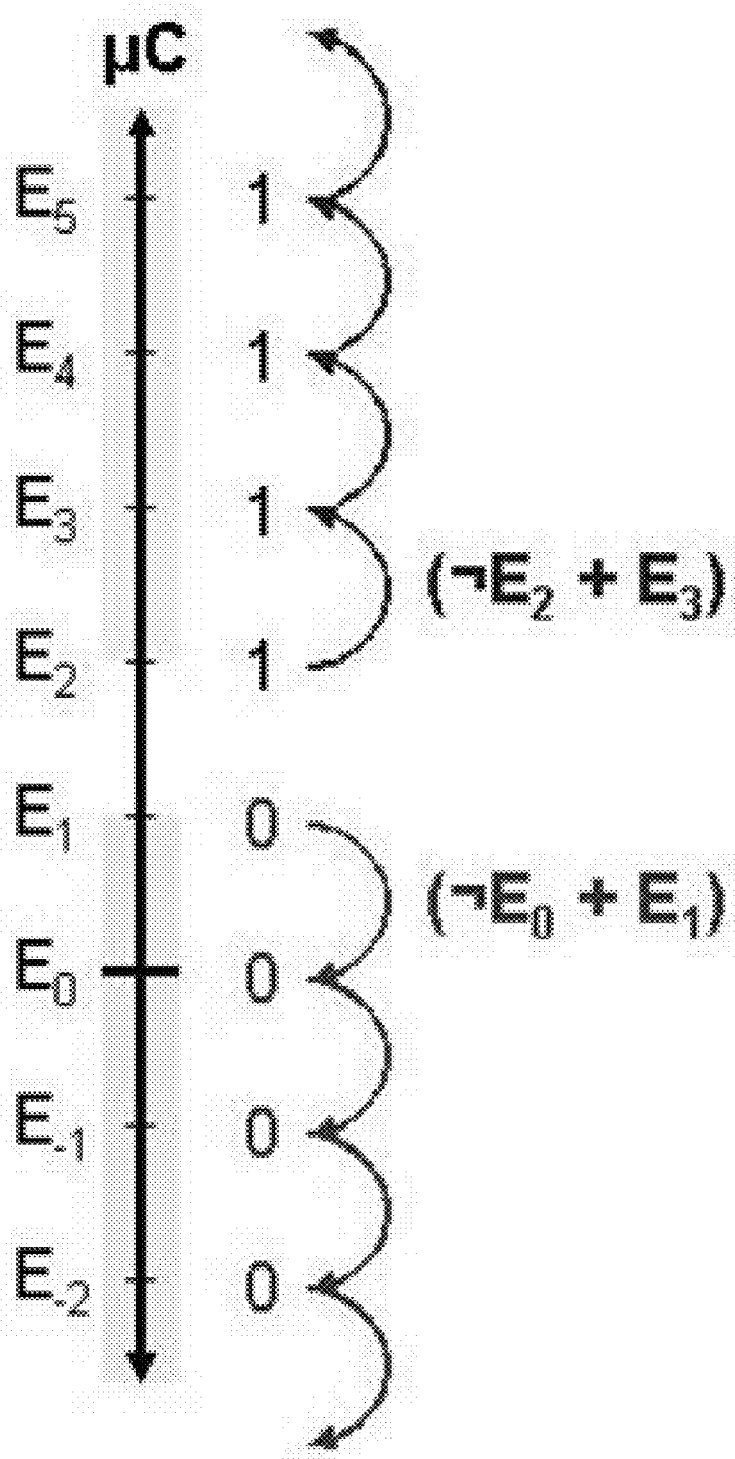
FIG. 47 conceptually illustrates an intersecting chain reaction when an event time variable is decided to be either 0 or 1 in some embodiments of the invention.

Integer inequalities have the property that $(X < n) \rightarrow (X < n+1)$. The contrapositive statement is $(X \geq n) \rightarrow (X \geq n-1)$. This property is implemented for event time variables by creating the two-literal SAT clause $(\neg E_n + E_{n+1})$ for all adjacent pairs of event time variables on the number line. These clauses produce an interesting chain reaction when an event time variable is decided to be either a 0 or a 1. FIG. 47 conceptually illustrates an intersecting chain reaction when an event time variable is decided to be either 0 or 1 in some embodiments.

As an example, when the SAT solver has determined that $E_2$ is 1, the clause $(\neg E_2 + E_3)$ is used to deduce that $E_3$ is 1. The next clause $(\neg E_3 + E_4)$ implies that $E_4$ is 1, and so on. The 1's percolate upwards to the maximum event time variable. Likewise, 0's percolate downwards to the minimum event time variable. If the solver determines that $E_1$ is 0, then the clause $(\neg E_0 + E_1)$ implies that $E_0$ is 0. Due to this chain effect, the $(\neg E_n + E_{n+1})$ clauses are called vertical chain clauses.

Vertical chain clauses are used in detecting when an event time interval becomes empty. In the above example, a required time constraint (R<2) has set the upper bound of the event time interval to 2 by asserting $E_2$. An arrival time constraint (A≥1) has set the lower bound to 1 by asserting $\neg E_1$. The interval is currently nonempty because the event time can be equal to 1 and satisfy the bounds 1≤E<2. Furthermore, all variables $E_{n>2}$ are also 1 and all variables $E_{n\leq 1}$ are also 0.

Now consider what happens if another required time constraint (R<−1) is applied. This constraint would try to set $E_{-1}$ to 1, but this variable was already deduced to be 0 as a consequence of the constraint (A≥1). The SAT solver identifies this as a conflict. The conjunction of inequality constraints ((A≥1)∧(R<−1)) makes the event time interval empty and this situation corresponds to an unsatisfiable Boolean formula. This is the basic principle that DPL-R uses to rule out placements that violate timing using Boolean SAT constraints.

N. Horizontal Chain Clauses

The examples given so far handle the simple inequalities where an arrival time or a required time is bounded by an integer constant. This is useful for source-to-crosser and crosser-to-sink constraints. DPL-R must consider one additional type of timing constraint: the source-to-sink constraint. These are more complicated because the arrival time at a fromto sink will be dependent on the arrival time at a fromto source. Likewise, the required time at a fromto source will be dependent on the required time at the fromto sink. The corresponding timing constraints contain two arrival or required variables and one constant, for example $(A_B \geq A_A + \Delta_{SS})$.

Figure 48:
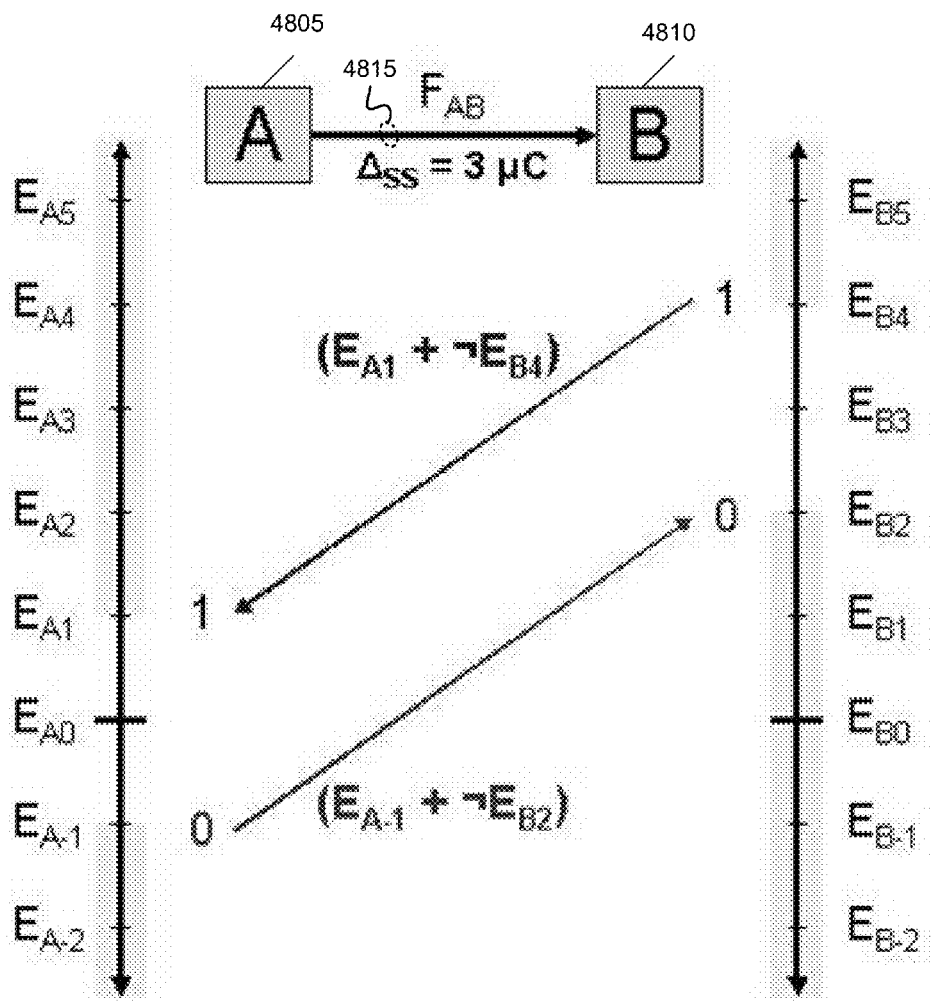
FIG. 48 conceptually illustrates horizontal chain clauses for a source cell, a destination cell, and a fromto in some embodiments of the invention.

FIG. 48 conceptually illustrates horizontal chain clauses for a source cell 4805, a destination (or sink) cell 4810, and a fromto $F_{AB}$ 4815 with $\Delta_{SS}$ equal to 3 in some embodiments. This type of timing constraint is also implemented by two-literal Boolean clauses using event time variables in some embodiments. These clauses will use one event time variable belonging to the source pin and one event time variable belonging to the sink pin. The timing constraint $(A_B \geq A_A + \Delta_{SS})$ is written as $\forall_k: (\neg E_{Ak} \rightarrow \neg E_{B(k+\Delta ss)})$. This says that for all microcycles k, if the event time at the source pin A is ≥k, then the event time at the sink pin B must be ≥k+$\Delta_{ss}$. DPL-R expands this to a set of two-literal clauses $(E_{Ak} + \neg E_{B(k+\Delta ss)})$, one clause for each microcycle k.

Whereas the vertical chain clauses defined a relationship between event time variables on the same number line, these new clauses establish a relationship between event time variables on different number lines, corresponding to pins connected by a fromto in the netlist. For this reason they are referred to as horizontal chain clauses. When the SAT solver deduces that some event time variable must be 0, this 0 propagates forwards along fromtos to force a fanout pin event time variable to be 0. Likewise, when an event time variable is set to 1, the 1 propagates backwards along fromtos to force a fanin pin event time variable to be 1.

O. Conditional Horizontal Chain Clauses

The source-to-sink delay along a fromto is usually dependent on the placement of the fromto's endpoints. This leads to constraints of the form $(V_A \land V_B \land G_B) \rightarrow (\Delta_{ss} = C)$, or $(V_A \land V_B \land G_B) \rightarrow \forall_k: (\neg E_{Ak} \rightarrow \neg E_{B(k+C)})$. DPL-R expands this to a set of five-literal clauses $(\neg V_A + \neg V_B + \neg G_B + E_{Ak} + \neg E_{B(k+C)})$. These conditional horizontal chain clauses are quite common, and are also the largest (in number of literals) timing clauses that DPL-R makes.

Conditional horizontal chains allow the SAT solver to model timing propagation down an entire path of fromtos. The placement decision for a given fromto has an effect on the event time variables for a distant cell, possibly ruling out placement options for that cell. If all of the placement options for the distant cell are ruled out as a result of these propagated timing constraints, the SAT solver sees this as a conflict and understands that the variable assignments it has made so far cannot produce a satisfying solution.

P. Dynamic Constraint Generation

Another core innovation that is essential to making DPL-R practical is dynamic constraint generation. Dynamic constraint generation is a novel technique for creating Boolean SAT clauses on-demand while the SAT solver searches the problem space. Traditional SAT solvers require that all of the constraints be known in advance. For the types of problems that DPL-R solves, it is far too costly in terms of memory and runtime to build all of the constraints in advance.

Figure 49:
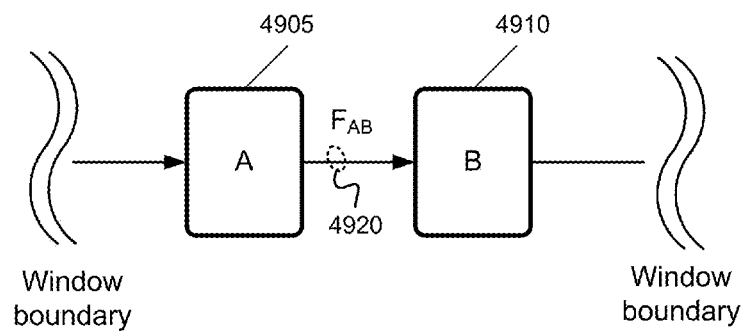
FIG. 49 conceptually illustrates a window with a source, a destination cell, and a fromto in some embodiments of the invention.

FIG. 49 conceptually illustrates a window with a source cell 4905, a destination cell 4910, and a fromto 4920 $F_{AB}$ in some embodiments. Assume that each cell is allowed to move at most one nibble away from its original location in X and Y. This gives 3*3*4=36 spatial sites for each cell. Now include the option that each cell can retime or extend within a +/−1 sub-cycle window around its original Z location. This gives each cell 5 different sub-cycle assignments: the (startSc, endSc) pairs (−1,−1), (−1,0), (0,0), (0,1), and (1,1). Now each cell has 36*5=180 possible spacetime placements. The placement variable matrix will have 180 SatSites and 2 SatCells for a total of 360 Boolean variables.

Also assume that cell B has 3 possible pin permutations. There are now 180*180*3=97200 different ways to place fromto $F_{AB}$ in spacetime. Each of these possibilities is captured by a prefix $(V_A \land V_B \land G_B)$ that will appear at the beginning of numerous timing constraints. There will be a source-to-crosser constraint $(V_A \land V_B \land G_B) \rightarrow E_{Asx}$ and a crosser-to-sink constraint $(V_A \land V_B \land G_B) \rightarrow \neg E_{Bxs}$. The source-to-sink constraint $(V_A \land V_B \land G_B) \rightarrow \forall k: (\neg E_{Ak} \rightarrow \neg E_{B(k+ss)})$ expands out to k clauses for the microcycles on the number line for the event time variables $E_A$ and $E_B$. In this example the retiming window is 3 sub-cycles, so there will be at most 3*32=96 relevant values of k. The approximate grand total is 97,200*98=9,525,600 Boolean SAT clauses for just one intra-window fromto. And it will have taken 97,200 queries to the lookup table 740 (shown in FIG. 7) retrieve the timing data needed to make these clauses. Add in hard pin placement constraints and more pin permutations and looser XYZ bounds and things get out of control very fast.

A solution to this problem starts with the observation that every one of the 98 SAT clauses described above starts with the negative literal $\neg V_A$ when written in standard conjunctive normal form. This means that all 98 clauses are satisfied when $V_A$ has the value 0. Satisfied clauses have no effect on a SAT solver. It is as if they are not in the clause database at all. The solver does not care about the consequences of assigning SatCell A to SatSite S until it actually decides to place cell A on site S.

Furthermore, the SAT solver usually does not have to try all 180 possible SatSites for each cell before it finds a solution to the window. Usually it is enough to try a few spacetime placements close to the cell's original location at the beginning of the window. In fact, experimental evidence suggests that only a minority of cells in the entire design have to move away from their original spacetime locations set by GPL over the entire run of DPL-R in order produce a good placement for the Router. This means that while the SAT solver is running, most placement variables $V_A$ are never even attempted to be set to 1.

The vast majority of the 9,525,600 SAT clauses are therefore not necessary to solve the window. DPL-R exploits this fact and uses dynamic clause generation to add constraints to the solver only when the solver enters the part of the problem space where the constraints are relevant. This avoids the majority of the queries to the lookup table 740 (shown in FIG. 7) and keeps the constraint database size practical.

In some embodiments, DPL-R provides a function, decisionCallback( ) which is called whenever the solver determines the value of a placement variable $V_A$ is 1. This can occur as the result of the solver either deducing that $V_A=1$ as a result of logical implications, or assuming that $V_A=1$ as part of the normal search algorithm. DPL-R uses this callback to create the family of constraints that begin with $(\neg V_A + \ldots)$: constraints that might be unsatisfiable in the subspace the solver has started exploring.

Figure 50:
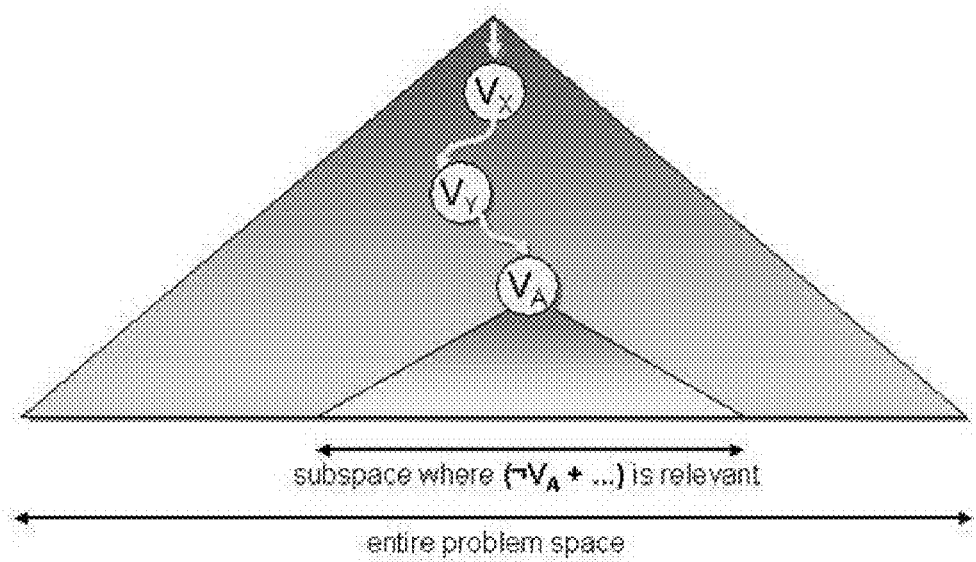
FIG. 50 conceptually illustrates a portion of the entire problem space in some embodiments of the invention where a particular constraint is relevant.

DPL-R then returns control to the SAT solver, which must now intake the newly added constraints. It is possible for a new constraint to be at odds with the solver's current state. FIG. 50 conceptually illustrates a portion of the entire problem space in some embodiments where a particular constraint is relevant. In FIG. 50, the solver is in the state ($V_X=1$, $V_Y=1$, $V_A=1$) when the decisionCallback for $V_A=1$ occurs. DPL-R might generate a new clause $(\neg V_A + \neg V_X)$. This clause is already in conflict with the decisions the solver has made in the past. If the clause had been known at the beginning instead of being generated dynamically, the solver should have deduced that $V_A=0$ immediately after determining that $V_X=1$. The solver would never have been able to get into the state it currently is in.

The function returns the solver to a consistent internal state after dynamic clauses are added. The goal is to make the solver find the same solution that it would have found if all of the clauses had been generated a priori instead of on-demand.

Q. One-Variable and Two-Variable Dynamic Clauses

Figure 51:
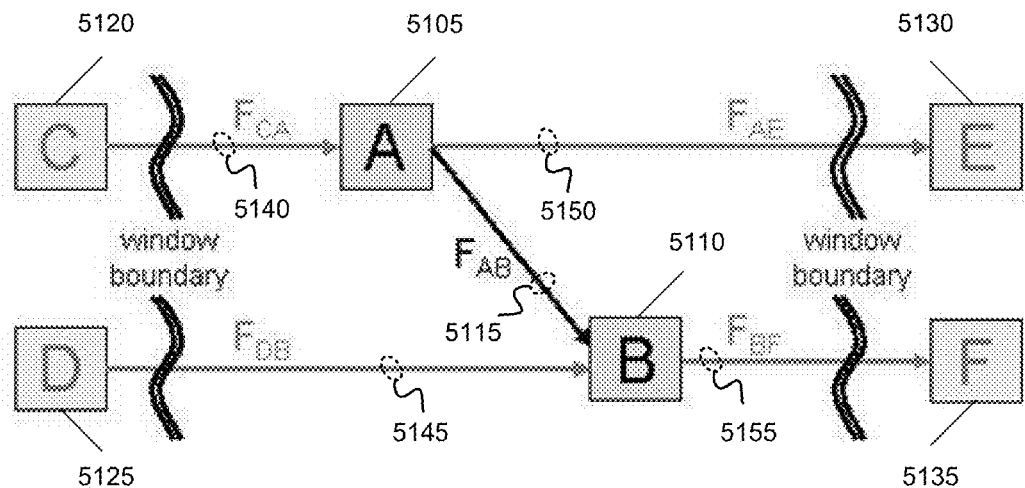
FIG. 51 conceptually illustrates a window that includes two cells, one intra-window fromto and several cells outside the window that are connected to the inside cells in some embodiments of the invention.

DPL-R creates two categories of dynamic clauses in some embodiments: intra-window and out-of-window. These categories depend on how many placement variables must be decided by the SAT solver before the dynamic clauses will be generated. FIG. 51 conceptually illustrates a window that includes two cells, A 5105 and B 5110, and one intra-window fromto $F_{AB}$ 5115. Cells C 5120, D 5125, E 5130, and F 5135 are outside the window but are connected to A 5105 and B 5110 by fromtos $F_{CA}$ 5140, $F_{DB}$ 5145, $F_{AE}$ 5150 and $F_{BF}$ 5155. Cells 5130-5135 are referred to as out-of-window fromtos.

The clauses related to fromto $F_{AB}$ are dependent on the placement of both endpoints of the fromto. This is reflected by the fact that all such clauses start with the prefix $(\neg V_A + \neg V_B + \ldots)$. That is, the solver must be exploring a subspace where both $V_A=1$ and $V_B=1$ in order for the clauses to be relevant.

In contrast, the clauses related to out-of-window fromtos such as $F_{CA}$ are only dependent on the placement of the in-window endpoint. The out-of-window endpoint is fixed in spacetime from the point of view of the current window. These clauses will contain only one placement variable in the prefix: $(\neg V_A + \ldots)$. They will be relevant when the solver is exploring the larger subspace where only $V_A=1$.

When the SAT solver assigns a placement variable $V_A=1$, DPL-R first considers all of cell A's out-of-window fromtos and generates dynamic clauses for them. Second, DPL-R looks at all of cell A's intra-window fromtos and checks if the solver is also in a subspace where the other endpoint of the fromto is placed. Only then will DPL-R create the dynamic clauses for the intra-window fromto. Since the solver only explores a small number of the SatSite possibilities for each SatCell, only a small fraction of the product space of space-time placements for each fromto is explored. This keeps the total number of constraints practical.

Figure 52:
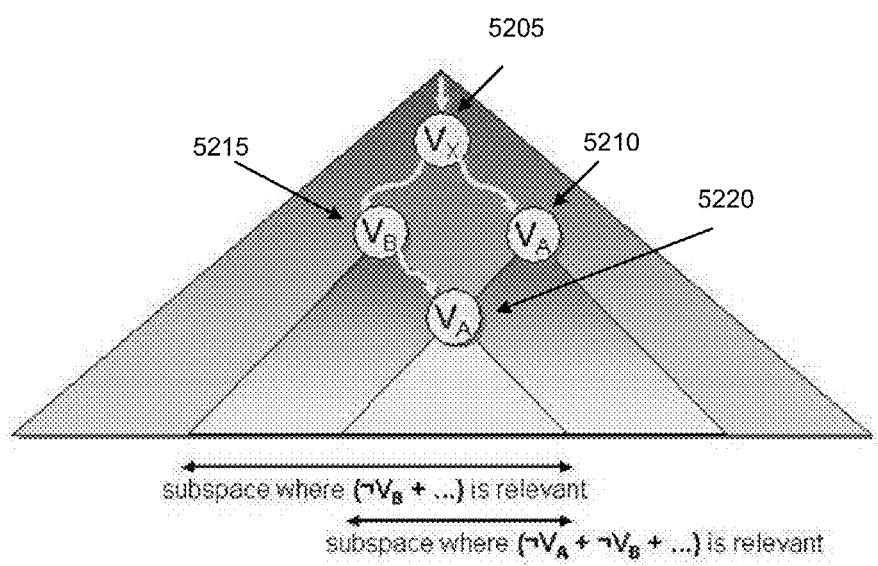
FIG. 52 conceptually illustrates two portions of the problem space in some embodiments of the invention where two different clauses are relevant.

The path that the SAT solver takes during its search for a satisfying solution can be visualized as a tree. It is normal for the solver to enter the same subspace multiple times but under different contexts. FIG. 52 conceptually illustrates two portions of the problem space in some embodiments where two different clauses are relevant. In the figure, the solver starts its search by assigning $V_X$ 5205. Assume that the solver takes the right branch next and assigns $V_A$ 5210. This causes the dynamic clauses for cell A's out-of-window fromtos to get generated. Assume that the solver next tries the left branch, undoing the assignment to $V_A$ and instead assigning $V_B$ 5215. DPL-R can now generate the dynamic clauses for cell B's out-of-window fromtos.

The dynamic clauses for the intra-window fromto $F_{AB}$ are not created yet because the solver is not yet in a state where both $V_A$ and $V_B$ are assigned. Only if the solver continues within the subspace of $V_B$ and eventually assigns $V_A$ 5220 will those clauses get generated.

DPL-R maintains a data structure to record the dynamic clauses that have already been generated so that they do not need to be generated again. When $V_A$ is assigned again, the out-of-window clauses for cell A are not generated a second time. Likewise, after creating the dynamic clauses for $F_{AB}$, that event will be recorded so the clauses will not be regenerated if the solver enters the same subspace intersection another time.

V. ELECTRONIC SYSTEM

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 53 conceptually illustrates an electronic system 5300 with which some embodiments of the invention are implemented. The electronic system 5300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 5300 includes a bus 5305, processing unit(s) 5310, a system memory 5320, a network 5325, a read-only memory 5330, a permanent storage device 5335, input devices 5340, and output devices 5345.

The bus 5305 collectively represents all system, peripheral, and chipset buses that communicatively connect the numerous internal devices of the electronic system 5300. For instance, the bus 5305 communicatively connects the processing unit(s) 5310 with the read-only memory 5330, the system memory 5320, and the permanent storage device 5335.

From these various memory units, the processing unit(s) 5310 retrieves instructions to execute and data to process in order to execute the processes of the invention. The processing unit(s) may be a single processor or a multi-core processor in different embodiments. The read-only-memory (ROM) 5330 stores static data and instructions that are needed by the processing unit(s) 5310 and other modules of the electronic system. The permanent storage device 5335, on the other hand, is a read-and-write memory device. This device is a non-volatile memory unit that stores instructions and data even when the electronic system 5300 is off. Some embodiments of the invention use a mass-storage device (such as a magnetic or optical disk and its corresponding disk drive) as the permanent storage device 5335.

Other embodiments use a removable storage device (such as a floppy disk, flash memory device, etc., and its corresponding disk drive) as the permanent storage device. Like the permanent storage device 5335, the system memory 5320 is a read-and-write memory device. However, unlike storage device 5335, the system memory 5320 is a volatile read-and-write memory, such a random access memory. The system memory 5320 stores some of the instructions and data that the processor needs at runtime. In some embodiments, the invention's processes are stored in the system memory 5320, the permanent storage device 5335, and/or the read-only memory 5330. For example, the various memory units include instructions for processing multimedia clips in accordance with some embodiments. From these various memory units, the processing unit(s) 5310 retrieves instructions to execute and data to process in order to execute the processes of some embodiments.

The bus 5305 also connects to the input and output devices 5340 and 5345. The input devices 5340 enable the user to communicate information and select commands to the electronic system. The input devices 5340 include alphanumeric keyboards and pointing devices (also called "cursor control devices"), cameras (e.g., webcams), microphones or similar devices for receiving voice commands, etc. The output devices 5345 display images generated by the electronic system or otherwise output data. The output devices 5345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 53, bus 5305 also couples electronic system 5300 to a network 5325 through a network adapter (not shown). In this manner, the computer can be a part of a network of computers (such as a local area network ("LAN"), a wide area network ("WAN"), or an Intranet, or a network of networks, such as the Internet. Any or all components of electronic system 5300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 12, 23, 28, 30, 31, 34, 35A, 35B, 36, 37A, 37B, 38A, 38B, and 39) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for placement of a plurality of cells of a user design on an integrated circuit (IC), the method comprising:
    sending a first placement of the plurality of cells on a plurality of sites on the IC to a satisfiability solver;
    by a computer, building a set of timing constraints for the first placement of the plurality of cells, the first placement violating at least one timing constraint in the set of timing constraints;
    sending the first placement and the set of timing constraints to a satisfiability solver; and
    receiving a second placement that satisfies the set of timing constraints for the plurality of cells from the satisfiability solver.

2. The method of claim 1, wherein when the satisfiability solver finds a placement that satisfies all timing constraints, the satisfiability solver does not attempt to find a more optimized placement.

3. The method of claim 1, wherein building the set of timing constraints comprises:
    identifying a set of source and destination cells;
    making a table lookup to determine a path between each corresponding pair of source and destination cells in the set of source and destination cells;
    determining a delay for a signal to travel through each determined path from the source cell to the corresponding destination cell; and
    building a timing constraint to ensure that a required time of the signal at an input of each destination cell is greater than or equal to an arrival time of the signal at an output of the corresponding source cell plus the determined delay for the signal to travel through the path between the source and destination cells.

4. The method of claim 1, wherein the set of timing constraints is a first set of timing constraints, the method further comprising:
    after receiving the placement that satisfies the first set of timing constraints, determining whether a set of user design goals for a set of user design clock domains are satisfied;
    increasing a target frequency of at least one user design clock domain when the set of user design goals for the set of user design clock domains are not satisfied;
    building a second set of timing constraints based on the increased target frequency;
    sending the second set of timing constraints to the satisfiability solver; and
    receiving a placement for the plurality of cells from the satisfiability solver that satisfies the second set of timing constraints built based on the increased target frequency.

5. The method of claim 4, wherein increasing the target frequency comprises increasing target frequencies of all user design clock domains in the set of user design clock domains by a same multiplier.

6. The method of claim 4, wherein increasing the target frequency comprises increasing target frequencies of each user design clock domain in the set of user design clock domains independent of the target frequency of other user design clock domains.

7. A method for placement of a plurality of cells of a user design on an integrated circuit (IC), the method comprising:
    by a computer, building a plurality of timing constraints for placement of the plurality of cells on a plurality of sites on the IC, wherein building the plurality of timing constraints comprises:
        making a table lookup to determine a path between each corresponding pair of source and destination cells in the plurality of cells;
        determining a delay for a signal to travel through each determined path from the source cell to the corresponding destination cell; and
        building a timing constraint to ensure that a required time of the signal at an input of the destination cell is greater than or equal to an arrival time of the signal at an output of the source cell plus the determined delay for the signal to travel through the path between the source and destination cells;
    sending the plurality of timing constraints to a satisfiability solver;
    when there is a placement solution that satisfies the plurality of timing constraints, receiving the placement solution as the placement for the plurality of cells; and
    when there is no placement solution that satisfies the plurality of timing constraints, receiving an identification of a set of constraints in the plurality of timing constraints that made the plurality of timing constraints unsatisfiable.

8. A non-transitory machine readable medium storing a program for placement of a plurality of cells of a user design on an integrated circuit (IC), the program executable by at least one processing unit, the program comprising:
    a set of instructions for building a set of timing constraints for placement of the plurality of cells on a plurality of sites on the IC;
    a set of instructions for sending the set of timing constraints to a satisfiability solver;
    a set of instructions for receiving a placement that satisfies the set of timing constraints for the plurality of cells from the satisfiability solver wherein the set of timing constraints is a first set of timing constraints;
    a set of instructions for determining after receiving the placement that satisfies the first set of timing constraints, whether a set of user design goals for a set of user design clock domains are satisfied;
    a set of instructions for increasing a target frequency of at least one user design clock domain when the set of user design goals for the set of user design clock domains are not satisfied;
    a set of instructions for building a second set of timing constraints based on the increased target frequency;
    a set of instructions for sending the second set of timing constraints to the satisfiability solver; and
    a set of instructions for receiving a placement for the plurality of cells from the satisfiability solver that satisfies the second set of timing constraints built based on the increased target frequency.

9. The non-transitory machine readable medium of claim 8, wherein when the satisfiability solver finds a placement that satisfies all timing constraints, the satisfiability solver identifies the placement without attempting to find a more optimized placement.

10. The non-transitory machine readable medium of claim 8, wherein the set of instructions for building the set of timing constraints comprises:
    a set of instructions for identifying a path between a set of source and destination cells;
    a set of instructions for making a table lookup to determine a path between each corresponding pair of source and destination cells in the set of source and destination cells;

a set of instructions for determining a delay for a signal to travel through each determined path from the source cell to the corresponding destination cell; and a set of instructions for building a timing constraint to ensure that a required time of the signal at an input of each destination cell is greater than or equal to an arrival time of the signal at an output of the corresponding source cell plus the determined delay for the signal to travel through the path between the source and destination cells.

11. The non-transitory machine readable medium of claim 8, wherein the set of instructions for increasing the target frequency comprises a set of instructions for increasing target frequencies of all user design clock domains by a same multiplier.

12. The non-transitory machine readable medium of claim 8, wherein the set of instructions for increasing the target frequency comprises a set of instructions for increasing target frequencies of each user design clock domain independent of the target frequency of other user design clock domains.

13. A non-transitory computer readable medium storing a program for placement of a plurality of cells of a user design on an integrated circuit (IC), the program executable by at least one processing unit, the program comprising:

a set of instructions for sending a first placement of the plurality of cells on a plurality of sites on the IC to a satisfiability solver;

a set of instructions for building a set of timing constraints for the first placement of the plurality of cells, the first placement violating at least one timing constraint in the set of timing constraints;

a set of instructions for sending the first placement and the set of timing constraints to a satisfiability solver; and a set of instructions for receiving a second placement that satisfies the set of timing constraints for the plurality of cells from the satisfiability solver.

14. The non-transitory computer readable medium of claim 13, wherein when the satisfiability solver finds a placement that satisfies all timing constraints, the satisfiability solver does not attempt to find a more optimized placement.

15. The non-transitory computer readable medium of claim 13, wherein the set of instructions for building the set of timing constraints comprises:

a set of instructions for identifying a set of source and destination cells;

a set of instructions for making a table lookup to determine a path between each corresponding pair of source and destination cells in the set of source and destination cells;

a set of instructions for determining a delay for a signal to travel through each determined path from the source cell to the corresponding destination cell; and a set of instructions for building a timing constraint to ensure that a required time of the signal at an input of each destination cell is greater than or equal to an arrival time of the signal at an output of the corresponding source cell plus the determined delay for the signal to travel through the path between the source and destination cells.

16. The non-transitory computer readable medium of claim 13, wherein the set of timing constraints is a first set of timing constraints, the program further comprising:

a set of instructions for determining, after receiving the placement that satisfies the first set of timing constraints, whether a set of user design goals for a set of user design clock domains are satisfied;

a set of instructions for increasing a target frequency of at least one user design clock domain when the set of user design goals for the set of user design clock domains are not satisfied;

a set of instructions for building a second set of timing constraints based on the increased target frequency;

a set of instructions for sending the second set of timing constraints to the satisfiability solver; and a set of instructions for receiving a placement for the plurality of cells from the satisfiability solver that satisfies the second set of timing constraints built based on the increased target frequency.

17. The non-transitory computer readable medium of claim 16, wherein the set of instructions for increasing target frequency comprises a set of instructions for increasing target frequencies of all user design clock domains in the set of user design clock domains by a same multiplier.

18. The non-transitory computer readable medium of claim 16, wherein the set of instructions for increasing the target frequency comprises a set of instructions for increasing target frequencies of each user design clock domain in the set of user design clock domains independent of the target frequency of other user design clock domains.

* * * * *